US012717547B2

(12) United States Patent
Bruguera

(10) Patent No.: US 12,717,547 B2
(45) Date of Patent: Aug. 25, 2026

(54) ON-THE-FLY CONVERSION

(71) Applicant: Arm Limited, Cambridge (GB)

(72) Inventor: Javier Diaz Bruguera, Santiago de Compostela (ES)

(73) Assignee: Arm Limited, Cambridge (GB)

( * ) Notice: Subject to any disclaimer, the term of this patent is extended or adjusted under 35 U.S.C. 154(b) by 1046 days.

(21) Appl. No.: 17/809,155

(22) Filed: Jun. 27, 2022

(65) Prior Publication Data

US 2023/0018056 A1 Jan. 19, 2023

(30) Foreign Application Priority Data

Jul. 2, 2021 (GB) ..................................... 2109612

(51) Int. Cl.
*G06F 7/552* (2006.01)

(52) U.S. Cl.
CPC .... *G06F 7/5525* (2013.01); *G06F 2207/5528* (2013.01)

(58) Field of Classification Search
CPC . G06F 7/552–5525; G06F 7/535–5375; G06F 2207/5525–5528; G06F 2207/5352
See application file for complete search history.

(56) References Cited

U.S. PATENT DOCUMENTS 4,939,686 A 7/1990 Fandrianto
6,109,777 A 8/2000 Jouppi et al.
7,243,119 B1 7/2007 Yamada
10,216,481 B2 2/2019 Bruguera
2004/0230630 A1 11/2004 Ebergen
2011/0231468 A1 9/2011 Amin et al.
2016/0147503 A1 5/2016 Burgess et al.
2017/0199723 A1 7/2017 Bruguera
2018/0121164 A1 5/2018 Sexton et al.
2018/0165064 A1 6/2018 Bruguera
2018/0364983 A1 12/2018 Bruguera
2020/0081688 A1 3/2020 Bruguera (Continued)

FOREIGN PATENT DOCUMENTS

EP 0717350 10/1996
JP H3-164932 7/1991

(Continued)

OTHER PUBLICATIONS

Examination Report for GB Application No. 2109612.8 dated Nov. 16, 2023, 3 pages.

(Continued)

*Primary Examiner* — Carlo Waje
(74) *Attorney, Agent, or Firm* — NIXON & VANDERHYE P.C.

(57) ABSTRACT

A data processing apparatus that converts a plurality of signed digits representing an input value in redundant representation comprises receiver circuitry to receive, at each of a plurality of iterations, a signed digit from the plurality of signed digits, and previous intermediate data from a previous iteration. Concatenation circuitry performs a concatenation of bits corresponding to the signed digit and bits of the previous intermediate data to produce updated intermediate data. Output circuitry provides the updated intermediate data as previous intermediate data of a next iteration. The previous intermediate data comprises S3[i] in non-redundant representation, which is at least part of the input value multiplied by 3 in non-redundant representation.

18 Claims, 26 Drawing Sheets

(56) References Cited

U.S. PATENT DOCUMENTS

2020/0293279 A1 9/2020 Bruguera
2020/0293281 A1 9/2020 Bruguera

FOREIGN PATENT DOCUMENTS

JP H9-091270 4/1997
WO 02/10994 2/2002

OTHER PUBLICATIONS

U.S. Appl. No. 18/574,276, filed Dec. 26, 2023, Bruguera.
Examination Report for GB Application No. 2109612.8 dated Feb. 21, 2024, 4 pages.
Office Action dated Sep. 10, 2025 for U.S. Appl. No. 17/809,137, 49 pages.
Sjoberg et al, "Real-Time Transport Protocol (RTP) Payload Format and File Storage Format for the Adaptive Multi-Rate (AMR) and Adaptive Multi-Rate Wideband (AMR-WB) Audio Codecs" https://web.archive.org/web/20191204133815/https://www.rfc-editor.org/rfc/inline-errata/rfc3267.html (Year: 2019), 39 pages.
Office Action dated Jul. 10, 2025 for U.S. Appl. No. 17/809,143, 31 pages.
D. Piso and J.D. Bruguera, "A New Rounding Method Based on Parallel Remainder Estimation for Goldschmidt and Newton-Raphson Algorithms" in 2014 17$^{th}$ Euromicro Conference on Digital System Design (DSD), Verona, Italy, 2014, 4 pages.
Hongge Ren, L.B. Hoang, Hsin-Chia Chen and B.W.Y. Wei, "Design of a 16-bit CMOS divider/square-root circuit" Proceedings of 27$^{th}$ Asilomar Conference on Signals, Systems and Computers, Pacific Grove, CA, USA, 1993, 5 pages.
H.R. Srinivas and K.K. Parhi, "A floating point radix 2 shared division/square root chip" In Proceedings of the 1995 International Conference on Computer Design: VLSI in Computers and Processors (ICCD '95), IEEE Computer Society, USA, 472-478, 1995, 7 pages.
A.J. Thakkar and A. Ejnioui, "Design and implementation of double precision floating point division and square root on FPGAs," 2006 IEEE Aerospace Conference, Big Sky, MT, USA, 2006, 7 pages.
V.A. Pedroni, "Circuit Design with VHDL," MIT Press, Cambridge, Mass, 2004, ISBN: 0-262-16224-5, 24 pages.
U.S. Appl. No. 17/809,137, filed Jun. 27, 2022, Bruguera.
U.S. Appl. No. 17/809,143, filed Jun. 27, 2022, Bruguera.
U.S. Appl. No. 17/809,152, filed Jun. 27, 2022, Bruguera.
Combined Search and Examination Report for GB Application No. 2109614.4 dated Apr. 6, 2022, 11 pages.
Search Report for GB Application No. 2109615.1 dated Apr. 7, 2022, 4 pages.
Combined Search and Examination Report for GB Application No. 2109607.8 dated Mar. 3, 2022, 12 pages.
Combined Search and Examination Report for GB Application No. 2109612.8 dated Mar. 25, 2022, 11 pages.
Examination Report for GB Application No. 2109612.8 dated Apr. 25, 2023, 3 pages.
Combined Search and Examination Report for GB Application No. 2109613.6 dated Mar. 25, 2022, 10 pages.
International Search Report and Written Opinion of the International Searching Authority for PCT/GB2022/051339 mailed Sep. 8, 2022, 14 pages.
Javier D. Bruguera, Radix-64 Floating-Point Divider, ARM Austin Design Center, 25th IEEE Symposium on Computer Arithmetic (ARITH 2018), Jun. 25, 2018, pp. 87-94.
Javier D. Bruguera, Low Latency Floating-Point Division and Square Root Unit, IEEE Transactions on Computers, vol. 69 Issue: 2, Oct. 16, 2019, pp. 274-287.
Louis B. Bushard, A Minimum Table Size Result for Higher Radix Nonrestoring Division, IEEE Transactions on Computers, vol. c-32, No. 6, Jun. 1983, pp. 521-526.
Milos D. Ercegovac and Tomas Lang, On-The-Fly Conversion of Redundant into Conventional Representations, IEEE Transactions on Computers, vol. c-36, No. 7 Jul. 1987, pp. 895-897.
Jan Fandrianto, Algorithm for High Speed Shared Radix 4 Division and Radix 4 Square-Root, Weitek Corporation, Sunnyvale, California, May 1987, pp. 73-79.
Jan Fandrianto, Algorithm for High Speed Shared Radix 8 Division and Radix 8 Square Root, Integrated Information Technology Inc., Santa Clara, California, Oct. 1989, pp. 68-75.
Arpita Jena and Siba Ku. Panda, FPGA-VHDL Implementation of Pipelined Square Root Circuit for VLSI Signal Processing Applications, International Journal of Computer Applications, vol. 142, No. 5, May 2016, pp. 20-24.
Peter Kornerup, Digit Selection for SRT Division and Square Root, IEEE Transactions on Computers, vol. 54, No. 3, Mar. 2005, pp. 294-303.
Alberto Nannarelli, Radix-16 Combined Division and Square Root Unit, 20th IEEE Symposium on Computer Arithmetic, 2011, pp. 169-176.
Stuart F. Oberman and Michael J. Flynn, An Analysis of Division Algorithms and Implementations, Technical Report: CSL-TR-95-675, Jul. 1995, Stanford University, Stanford, California.
Stuart F. Oberman and Michael J. Flynn, Division Algorithms and Implementations, IEEE Transactions on Computers, vol. 46, No. 8, Aug. 1997, pp. 833-854, Stanford University, Stanford, California.
Irvin Ortiz & Manuel Jimenez, Scalable Pipeline Insertion in Floating-point Division and Square Root Units, IEEE International Midwest Symposium on Circuits and Systems, 47th Edition, Jul. 25, 2004, pp. 225-228.
Peter Soderquist and Miriam Leeser, Area and Performance Tradeoffs in Floating-Point Divide and Square-Root Implementations, ACM Computing Surveys, vol. 28, No. 3, Sep. 1996, pp. 518-564.
Examination Report for GB Application No. 2109612.8 dated Aug. 1, 2023, 4 pages.
Examination Report for GB Application No. 2109607.8 dated Jul. 26, 2023, 6 pages.
Office Action for JP Application No. 2022-100743 issued Feb. 5, 2026 and English translation, 9 pages.
Office Action dated Oct. 10, 2025 for U.S. Appl. No. 17/809,152, 30 pages.
A. Nannarelli and T. Lang, "Low-power radix-8 divider," Proceedings International Conference on Computer Design. VLSI in Computers and Processors (Cat. No. 98CB36273), Austin, TX, USA, 1998, pp. 420-426, doi: 10.1109/ICCD.1998.727084. (Year: 1998).
W. Liu and A. Nannarelli, "Power Efficient Division and Square Root Unit," in IEEE Transactions on Computers, vol. 61, No. 8, pp. 1059-1070, Aug. 2012, doi: 10.1109/TC.2012.82. (Year: 2012)/.
Final Office Action dated Jan. 27, 2026 for U.S. Appl. No. 17/809,143, 12 pages.
Office Action for JP Application No. 2022-102771 dated Mar. 5, 2026 and English translation, 13 pages.
D.M. Russinoff, "Computation and Formal Verification of SRT Quotient and Square Root Digit Selection Tables" IEEE Transactions on Computers, vol. 62, Issue 5, Feb. 7, 2012, pp. 900-909.

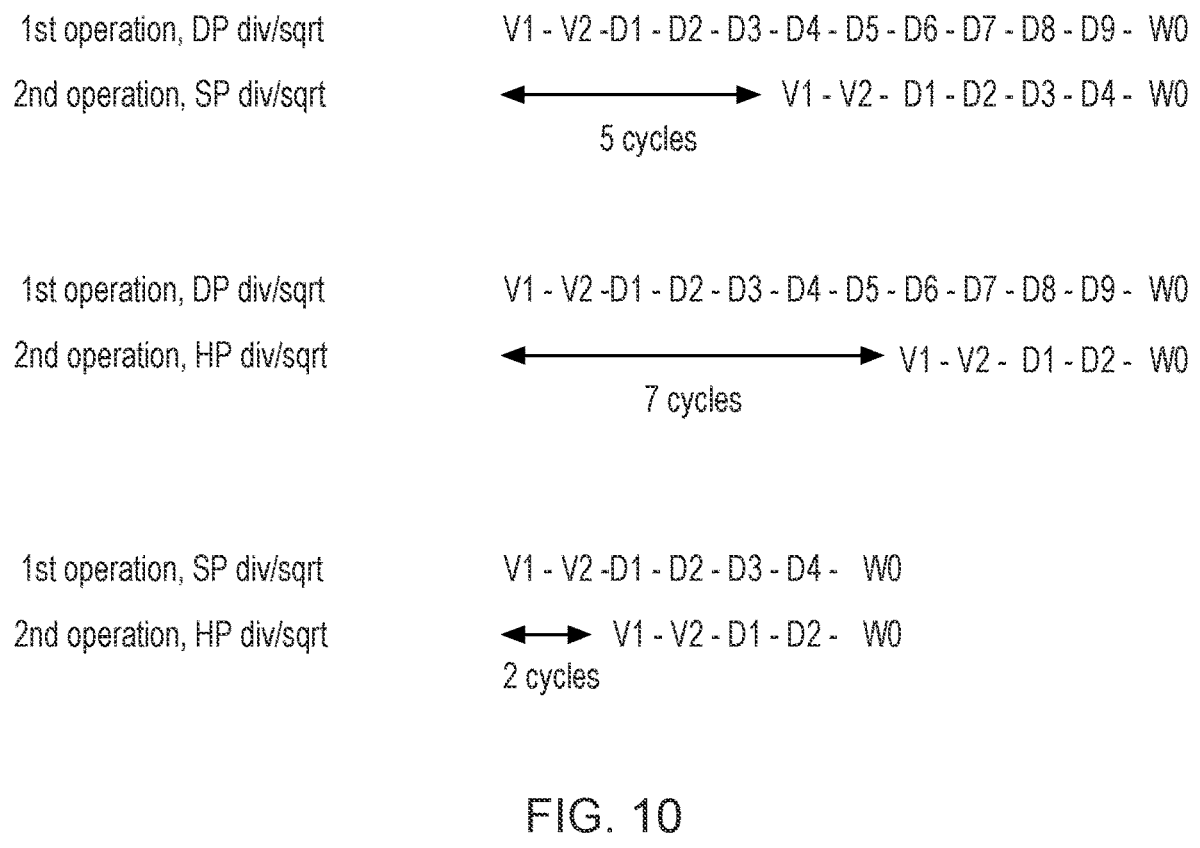

1st operation, DP div/sqrt — V1 - V2 -D1 - D2 - D3 - D4 - D5 - D6 - D7 - D8 - D9 - W0

2nd operation, SP div/sqrt — V1 - V2 - D1 - D2 - D3 - D4 - W0

5 cycles

1st operation, DP div/sqrt — V1 - V2 -D1 - D2 - D3 - D4 - D5 - D6 - D7 - D8 - D9 - W0

2nd operation, HP div/sqrt — V1 - V2 - D1 - D2 - W0

7 cycles

1st operation, SP div/sqrt — V1 - V2 -D1 - D2 - D3 - D4 - W0

2nd operation, HP div/sqrt — V1 - V2 - D1 - D2 - W0

2 cycles

FIG. 10

| $s_{i+1}$ | $S[i+1]$ | $SM[i+1]$ |
|---|---|---|
| +4 | {S[i], 100} | {S[i], 011} |
| +3 | {S[i], 011} | {S[i], 010} |
| +2 | {S[i], 010} | {S[i], 001} |
| +1 | {S[i], 001} | {S[i], 000} |
| 0 | {S[i], 000} | {SM[i], 111} |
| −1 | {SM[i], 111} | {SM[i], 110} |
| −2 | {SM[i], 110} | {SM[i], 101} |
| −3 | {SM[i], 101} | {SM[i], 100} |
| −4 | {SM[i], 100} | {SM[i], 011} |

FIG. 11

| $i$ | $s_i$ | $S[i]$ | $SM[i]$ |
|---|---|---|---|
| 0 | - | 1 | 0 |
| 1 | −1 | 0.111 | 0.110 |
| 2 | 1 | 0.111 001 | 0.111 000 |
| 3 | −2 | 0.111 000 110 | 0.111 000 101 |
| 4 | −4 | 0.111 000 101 100 | 0.111 000 101 011 |
| 5 | 2 | 0.111 000 101 100 010 | 0.111 000 101 100 001 |
| 6 | 0 | 0.111 000 101 100 010 000 | 0.111 000 101 100 001 111 |
| 7 | −1 | 0.111 000 101 100 001 111 111 | 0.111 000 101 100 001 111 110 |

FIG. 12

| $s_{j+1}$ | $3 \times s_{j+1}$ | equivalent to | digit concatenated | carry to previous digit | change on previous root |
|---|---|---|---|---|---|
| +4 | +12 | 8 + 4 | +4 | +1 | increment |
| +3 | +9 | 8 + 1 | +1 | +1 | increment |
| +2 | +6 | +6 | +6 | 0 | – |
| +1 | +3 | +3 | +3 | 0 | – |
| 0 | 0 | 0 | 0 | 0 | – |
| − 1 | − 3 | − 3 | − 3 | 0 | – |
| − 2 | − 6 | − 6 | − 6 | 0 | – |
| − 3 | − 9 | − 8 − 1 | − 1 | − 1 | decrement |
| − 4 | − 12 | − 8 − 4 | − 4 | − 1 | decrement |

FIG. 13

| i | $S_i$ | $3S_i$ | $3S_i$ mod 8 | $S3_{[i]}$ | $S3M_{[i]}$ |
|---|---|---|---|---|---|
| 0 | - | - | - | 11 | 10 |
| 1 | -1 | -3 | -3 | 10.101 | 10.100 |
| 2 | 1 | 3 | 3 | 10.101 011 | 10.101 010 |
| 3 | -2 | -6 | -6 | 10.101 010 010 | 10.101 010 001 |
| 4 | -4 | -12 | -4 | 10.101 010 000 100 | 10.101 010 000 011 |
| 5 | 2 | 6 | 6 | 10.101 010 000 100 110 | 10.101 010 000 100 101 |
| 6 | 0 | 0 | 0 | 10.101 010 000 100 110 000 | 10.101 010 000 100 101 111 |
| 7 | -1 | -3 | -3 | 10.101 010 000 100 101 111 101 | 10.101 000 000 100 101 111 100 |

FIG. 14

| $s_i$ | S3_inc[i] | S3_dec[i] | S3M_inc[i] | S3M_dec[i] |
|---|---|---|---|---|
| −4 | AUXM [i] | AUXM [i] | AUXM [i] | AUXM [i] |
| −3 | AUX [i] | AUXM [i] | AUXM [i] | AUXM [i] |
| −2 | AUXM [i] | AUXM [i] | AUXM [i] | AUXM [i] |
| −1 | AUXM [i] | AUXM [i] | AUXM [i] | AUXM [i] |
| 0 | AUX [i] | AUXM [i] | AUX [i] | AUXM [i] |
| +1 | AUX [i] | AUX [i] | AUX [i] | AUX [i] |
| +2 | AUX [i] | AUX [i] | AUX [i] | AUX [i] |
| +3 | AUX [i] | AUX [i] | AUX [i] | AUXM [i] |
| +4 | AUX [i] | AUX [i] | AUX [i] | AUX [i] |

FIG. 16

| row | divisor estimate | comparison constants ×64 | | | | | | | |
|---|---|---|---|---|---|---|---|---|---|
| | | +4 | +3 | +2 | +1 | 0 | −1 | −2 | −3 |
| 0 | 1.00000 | 115 | 82 | 50 | 16 | -16 | -48 | -81 | -112 |
| 1 | 1.00001 | 118 | 84 | 50 | 16 | -16 | -50 | -83 | -116 |
| 2 | 1.00010 | 121 | 86 | 52 | 16 | -16 | -52 | -86 | -120 |
| 3 | 1.00011 | 125 | 90 | 54 | 18 | -18 | -54 | -88 | -124 |
| 4 | 1.00100 | 128 | 92 | 54 | 18 | -18 | -54 | -90 | -127 |
| 5 | 1.00101 | 132 | 94 | 56 | 18 | -18 | -56 | -94 | -131 |
| 6 | 1.00110 | 135 | 96 | 58 | 18 | -18 | -58 | -96 | -134 |
| 7 | 1.00111 | 139 | 100 | 60 | 20 | -20 | -60 | -98 | -138 |
| 8 | 1.01000 | 142 | 102 | 60 | 20 | -20 | -60 | -100 | -141 |
| 9 | 1.01001 | 146 | 104 | 62 | 20 | -20 | -62 | -104 | -144 |
| 10 | 1.01010 | 150 | 106 | 64 | 20 | -20 | -64 | -106 | -148 |
| 11 | 1.01011 | 152 | 108 | 64 | 20 | -20 | -64 | -108 | -152 |
| 12 | 1.01100 | 156 | 112 | 66 | 22 | -22 | -66 | -112 | -156 |
| 13 | 1.01101 | 160 | 114 | 68 | 22 | -22 | -68 | -114 | -158 |
| 14 | 1.01110 | 164 | 116 | 70 | 24 | -24 | -70 | -116 | -162 |
| 15 | 1.01111 | 166 | 118 | 70 | 24 | -24 | -70 | -118 | -166 |
| 16 | 1.10000 | 170 | 120 | 72 | 24 | -24 | -72 | -120 | -170 |
| 17 | 1.10001 | 173 | 124 | 73 | 24 | -24 | -72 | -124 | -172 |
| 18 | 1.10010 | 176 | 126 | 76 | 24 | -24 | -76 | -124 | -176 |
| 19 | 1.10011 | 180 | 128 | 76 | 24 | -24 | -76 | -128 | -180 |
| 20 | 1.10100 | 184 | 132 | 78 | 24 | -24 | -78 | -132 | -184 |
| 21 | 1.10101 | 188 | 134 | 80 | 28 | -28 | -80 | -134 | -188 |
| 22 | 1.10110 | 190 | 136 | 82 | 28 | -28 | -82 | -136 | -190 |
| 23 | 1.10111 | 194 | 138 | 82 | 28 | -28 | -82 | -138 | -194 |
| 24 | 1.11000 | 198 | 140 | 84 | 28 | -28 | -84 | -140 | -198 |
| 25 | 1.11001 | 200 | 142 | 84 | 28 | -28 | -84 | -142 | -200 |
| 26 | 1.11010 | 204 | 146 | 86 | 28 | -28 | -86 | -146 | -204 |
| 27 | 1.11011 | 208 | 148 | 88 | 28 | -28 | -88 | -148 | -208 |
| 28 | 1.11100 | 212 | 152 | 90 | 28 | -28 | -90 | -152 | -212 |
| 29 | 1.11101 | 214 | 152 | 90 | 28 | -28 | -90 | -152 | -214 |
| 30 | 1.11110 | 218 | 154 | 94 | 28 | -28 | -94 | -154 | -218 |
| 31 | 1.11111 | 222 | 158 | 94 | 32 | -32 | -94 | -158 | -222 |

FIG. 17

| row | partial root estimate ($\widehat{R[i]}$) | comparison constants ×64 | | | | | | | |
|---|---|---|---|---|---|---|---|---|---|
| | | +4 | +3 | +2 | +1 | 0 | −1 | −2 | −3 |
| 0 | 0.100000 | 226 | 161 | 97 | 32 | -32 | -97 | -161 | -226 |
| 1 | 0.100001 | 231 | 165 | 99 | 33 | -33 | -99 | -165 | -231 |
| 2 | 0.100010 | 238 | 170 | 102 | 34 | -34 | -102 | -170 | -238 |
| 3 | 0.100011 | 245 | 175 | 105 | 35 | -35 | -105 | -175 | -245 |
| 4 | 0.100100 | 252 | 180 | 108 | 36 | -36 | -108 | -180 | -252 |
| 5 | 0.100101 | 259 | 185 | 112 | 37 | -37 | -112 | -185 | -259 |
| 6 | 0.100110 | 266 | 190 | 114 | 38 | -38 | -114 | -190 | -266 |
| 7 | 0.100111 | 273 | 195 | 117 | 39 | -39 | -117 | -195 | -273 |
| 8 | 0.101000 | 280 | 200 | 120 | 40 | -40 | -120 | -200 | -280 |
| 9 | 0.101001 | 287 | 205 | 123 | 41 | -41 | -123 | -205 | -287 |
| 10 | 0.101010 | 294 | 210 | 128 | 42 | -42 | -128 | -210 | -294 |
| 11 | 0.101011 | 301 | 215 | 129 | 43 | -43 | -129 | -215 | -301 |
| 12 | 0.101100 | 308 | 220 | 132 | 44 | -44 | -132 | -220 | -308 |
| 13 | 0.101101 | 315 | 225 | 135 | 45 | -45 | -135 | -225 | -315 |
| 14 | 0.101110 | 322 | 230 | 138 | 48 | -48 | -138 | -230 | -322 |
| 15 | 0.101111 | 329 | 235 | 141 | 48 | -48 | -141 | -235 | -329 |
| 16 | 0.110000 | 336 | 240 | 144 | 48 | -48 | -144 | -240 | -336 |
| 17 | 0.110001 | 343 | 245 | 147 | 49 | -49 | -147 | -245 | -343 |
| 18 | 0.110010 | 350 | 250 | 150 | 50 | -50 | -150 | -250 | -350 |
| 19 | 0.110011 | 357 | 255 | 153 | 51 | -51 | -153 | -255 | -357 |
| 20 | 0.110100 | 364 | 260 | 156 | 52 | -52 | -156 | -260 | -364 |
| 21 | 0.110101 | 371 | 265 | 160 | 53 | -53 | -160 | -265 | -371 |
| 22 | 0.110110 | 378 | 270 | 162 | 54 | -54 | -162 | -270 | -378 |
| 23 | 0.110111 | 385 | 275 | 165 | 55 | -55 | -165 | -275 | -385 |
| 24 | 0.111000 | 392 | 280 | 168 | 56 | -56 | -168 | -280 | -392 |
| 25 | 0.111001 | 398 | 285 | 171 | 57 | -57 | -171 | -285 | -398 |
| 26 | 0.111010 | 406 | 290 | 174 | 58 | -58 | -174 | -290 | -406 |
| 27 | 0.111011 | 413 | 295 | 177 | 59 | -59 | -177 | -295 | -413 |
| 28 | 0.111100 | 420 | 300 | 180 | 60 | -60 | -180 | -300 | -420 |
| 29 | 0.111101 | 427 | 305 | 183 | 61 | -61 | -183 | -305 | -427 |
| 30 | 0.111110 | 434 | 310 | 186 | 62 | -62 | -186 | -310 | -434 |
| 31 | 0.111111 | 441 | 315 | 189 | 64 | -64 | -189 | -315 | -441 |
| 32 | 1.000000 | 447 | 319 | 191 | 64 | -64 | -191 | -319 | -447 |

FIG. 18

| row | partial root estimate | comparison constants × 64 | | | | | | | |
|---|---|---|---|---|---|---|---|---|---|
| | ($\widehat{R[i]}$) | +4 | +3 | +2 | +1 | 0 | −1 | −2 | −3 |
| 0 | 0.100000 | +2 | +1 | +1 | 0 | 0 | -1 | -1 | -2 |
| 1 | 0.100001 | +7 | +5 | +3 | +1 | -1 | -3 | -5 | -7 |
| 2 | 0.100010 | **-2** | +10 | +6 | +2 | -2 | -6 | -10 | **+2** |
| 3 | 0.100011 | +5 | **-1** | +9 | +3 | -3 | -9 | **+1** | -5 |
| 4 | 0.100100 | **-4** | +4 | +12 | +4 | -4 | -12 | -4 | -12 |
| 5 | 0.100101 | +3 | +9 | 0 | +5 | -5 | 0 | -9 | -3 |
| 6 | 0.100110 | +10 | **-2** | +2 | +6 | -6 | -2 | **+2** | -10 |
| 7 | 0.100111 | +1 | +3 | +5 | +7 | -7 | -5 | -3 | -1 |
| 8 | 0.101000 | +8 | +8 | +8 | +8 | -8 | -8 | -8 | -8 |
| 9 | 0.101001 | **-1** | **-3** | +11 | +9 | -9 | -11 | **+3** | **+1** |
| 10 | 0.101010 | +6 | +2 | 0 | +10 | -10 | 0 | -2 | -6 |
| 11 | 0.101011 | **-3** | +7 | +1 | +11 | -11 | -1 | -7 | **+3** |
| 12 | 0.101100 | +4 | **-4** | +4 | +12 | -12 | -4 | **+4** | -4 |
| 13 | 0.101101 | **-5** | +1 | +7 | +13 | -13 | -7 | -1 | -11 |
| 14 | 0.101110 | +2 | +6 | +10 | 0 | 0 | -10 | -6 | -2 |
| 15 | 0.101111 | +9 | +11 | +13 | 0 | 0 | -13 | -11 | -9 |
| 16 | 0.110000 | 0 | 0 | 0 | 0 | 0 | 0 | 0 | 0 |
| 17 | 0.110001 | +7 | +5 | +3 | +1 | -1 | -3 | -5 | -7 |
| 18 | 0.110010 | **-2** | +10 | +6 | +2 | -2 | -6 | -10 | **+2** |
| 19 | 0.110011 | +5 | **-1** | +9 | +3 | -3 | -9 | **+1** | -5 |
| 20 | 0.110100 | **-4** | +4 | +12 | +4 | -4 | -12 | -4 | **+4** |
| 21 | 0.110101 | +3 | +9 | 0 | +5 | -5 | 0 | -9 | -3 |
| 22 | 0.110110 | +10 | **-2** | +2 | +6 | -6 | -2 | **+2** | -10 |
| 23 | 0.110111 | +1 | +3 | +5 | +7 | -7 | -5 | -3 | -1 |
| 24 | 0.111000 | +8 | +8 | +8 | +8 | -8 | -8 | -8 | -8 |
| 25 | 0.111001 | **-2** | +13 | +11 | +9 | -9 | -11 | -13 | **+2** |
| 26 | 0.111010 | +6 | +2 | +14 | +10 | -10 | -14 | -2 | -6 |
| 27 | 0.111011 | **-3** | +7 | +1 | +11 | -11 | -1 | -7 | **+3** |
| 28 | 0.111100 | +4 | **-4** | +4 | +12 | -12 | -4 | **+4** | -4 |
| 29 | 0.111101 | +11 | +1 | +7 | +13 | -13 | -7 | -1 | -11 |
| 30 | 0.111110 | +2 | +6 | +10 | +14 | -14 | -10 | -6 | -2 |
| 31 | 0.111111 | +9 | +11 | +13 | 0 | 0 | -13 | -11 | -9 |
| 32 | 1.000000 | – | – | – | – | – | – | – | – |

FIG. 19

Table 10: Division and offset LUT

| address | division LUT | | | | | |
|---|---|---|---|---|---|---|
| | +4 (8b) | +3 (7b) | (+2,-1) (6b) | (+1,0) (5b) | -2 (8b) | -3 (8b) |
| 01_00000 | 73 | 29 | 19 | 08 | 51 | 70 |
| 01_00001 | 76 | 2a | 19 | 08 | 53 | 74 |
| 01_00010 | 79 | 2b | 1a | 08 | 56 | 78 |
| 01_00011 | 7d | 2d | 1b | 09 | 58 | 7c |
| 01_00100 | 80 | 2e | 1b | 09 | 5a | 7f |
| 01_00101 | 84 | 2f | 1c | 09 | 5e | 83 |
| 01_00110 | 87 | 30 | 1d | 09 | 60 | 86 |
| 01_00111 | 8b | 32 | 1e | 0a | 62 | 8a |
| 01_01000 | 8e | 33 | 1e | 0a | 64 | 8d |
| 01_01001 | 92 | 34 | 1f | 0a | 68 | 90 |
| 01_01010 | 96 | 35 | 20 | 0a | 6a | 94 |
| 01_01011 | 98 | 36 | 20 | 0a | 6c | 98 |
| 01_01100 | 9c | 38 | 21 | 0b | 70 | 9c |
| 01_01101 | a0 | 39 | 22 | 0b | 72 | 9e |
| 01_01110 | a4 | 3a | 23 | 0c | 74 | a2 |
| 01_01111 | a6 | 3b | 23 | 0c | 76 | a6 |
| 01_10000 | aa | 3c | 24 | 0c | 78 | aa |
| 01_10001 | ad | 3e | 24 | 0c | 7c | ac |
| 01_10010 | b0 | 3f | 26 | 0c | 7c | b0 |
| 01_10011 | b4 | 40 | 26 | 0c | 80 | b4 |
| 01_10100 | b8 | 42 | 27 | 0c | 84 | b8 |
| 01_10101 | bc | 43 | 28 | 0e | 86 | bc |
| 01_10110 | be | 44 | 29 | 0e | 88 | be |
| 01_10111 | c2 | 45 | 29 | 0e | 8a | c2 |
| 01_11000 | c6 | 46 | 2a | 0e | 8c | c6 |
| 01_11001 | c8 | 47 | 2a | 0e | 8e | c8 |
| 01_11010 | cc | 49 | 2b | 0e | 92 | cc |
| 01_11011 | d0 | 4a | 2c | 0e | 94 | d0 |
| 01_11100 | d4 | 4c | 2d | 0e | 98 | d4 |
| 01_11101 | d6 | 4c | 2d | 0e | 98 | d6 |
| 01_11110 | da | 4d | 2f | 0e | 9a | da |
| 01_11111 | de | 4f | 2f | 10 | 9e | de |
| 10_00000 | de | 4f | 2f | 10 | 9e | de |

FIG. 20

Table 10: Division and offset LUT

| | offset LUT | | | |
|---|---|---|---|---|
| sign (2b) | (+4,-3) (4b) | (+3,-2) (4b) | (+2,-1) (4b) | (+1,0) (4b) |
| 0 | 2 | 1 | 1 | 0 |
| 0 | 7 | 5 | 3 | 1 |
| 2 | e | a | 6 | 2 |
| 1 | 5 | f | 9 | 3 |
| 2 | c | 4 | c | 4 |
| 0 | 3 | 9 | 0 | 5 |
| 1 | a | e | 2 | 6 |
| 0 | 1 | 3 | 5 | 7 |
| 0 | 8 | 8 | 8 | 8 |
| 3 | f | d | b | 9 |
| 0 | 6 | 2 | 0 | a |
| 2 | d | 7 | 1 | b |
| 1 | 4 | c | 4 | c |
| 2 | b | 1 | 7 | d |
| 0 | 2 | 6 | a | 0 |
| 0 | 9 | b | d | 0 |
| 0 | 0 | 0 | 0 | 0 |
| 0 | 7 | 5 | 3 | 1 |
| 2 | e | a | 6 | 2 |
| 1 | 5 | f | 9 | 3 |
| 2 | c | 4 | c | 4 |
| 0 | 3 | 9 | 0 | 5 |
| 1 | a | e | 2 | 6 |
| 0 | 1 | 3 | 5 | 7 |
| 0 | 8 | 8 | 8 | 8 |
| 1 | e | d | b | 9 |
| 2 | 6 | 2 | e | a |
| 0 | d | 7 | 1 | b |
| 2 | 4 | c | 4 | c |
| 0 | b | 1 | 7 | d |
| 0 | 2 | 6 | a | e |
| 0 | 9 | 9 | d | 0 |
| 0 | f | f | f | 0 |

FIG. 20 (continued)

ON-THE-FLY CONVERSION

CROSS-REFERENCE TO RELATED APPLICATIONS

This application claims priority pursuant to 35 U.S.C. 119(a) to United Kingdom Patent Application No. 2109612.8, filed Jul. 2, 2021, which application is incorporated herein by reference in its entirety.

Digit recurrence algorithms can be used to perform processing operations such as divide or square root. Digit recurrence uses an iterative algorithm to perform the computation. In each iteration, a next digit for the result value is produced. Each digit is represented using a number of bits. For a radix-r implementation of the digit recurrence algorithm, each digit has $\log_2(r)$ bits. For example, an implementation using a radix of 4 would represent each digit with 2 bits and so at each iteration 2 further bits of the result would be generated, so producing a result value with a certain number of bits may take a number of iterations. In implementations that use a higher radix, a result of a given size can be produced in fewer iterations to improve performance, but the circuitry for performing a single iteration becomes more complex. There can be a challenge in meeting competing demands of performance, circuit area and power consumption when designing circuitry to perform such digit recurrence methods.

At least some examples provide a data processing apparatus to convert a plurality of signed digits representing an input value in redundant representation, the data processing apparatus comprising: receiver circuitry to receive, at each of a plurality of iterations, a signed digit from the plurality of signed digits, and previous intermediate data from a previous iteration; concatenation circuitry to perform a concatenation of bits corresponding to the signed digit and bits of the previous intermediate data to produce updated intermediate data; and output circuitry to provide the updated intermediate data as previous intermediate data of a next iteration, wherein the previous intermediate data comprises S3[i] in non-redundant representation, which is at least part of the input value multiplied by 3 in non-redundant representation.

At least some examples provide a data processing method of converting a plurality of signed digits representing an input value in redundant representation, comprising steps of: receiving, at each of a plurality of iterations, a signed digit from the plurality of signed digits, and previous intermediate data from a previous iteration; concatenating bits corresponding to the signed digit and bits of the previous intermediate data to produce updated intermediate data; and providing the updated intermediate data as previous intermediate data of a next iteration, wherein the previous intermediate data comprises S3[i] in non-redundant representation, which is at least part of the input value multiplied by 3 in non-redundant representation.

At least some examples provide a computer-readable medium to store computer-readable code for fabrication of a data processing apparatus to convert a plurality of signed digits representing an input value in redundant representation, the data processing apparatus comprising: receiver circuitry to receive, at each of a plurality of iterations, a signed digit from the plurality of signed digits, and previous intermediate data from a previous iteration; concatenation circuitry to perform a concatenation of bits corresponding to the signed digit and bits of the previous intermediate data to produce updated intermediate data; and output circuitry to provide the updated intermediate data as previous intermediate data of a next iteration, wherein the previous intermediate data comprises S3[i] in non-redundant representation, which is at least part of the input value multiplied by 3 in non-redundant representation.

Further aspects, features and advantages of the present technique will be apparent from the following description of examples, which is to be read in conjunction with the accompanying drawings, in which:

FIG. 1 schematically illustrates an example of a data processing operation having divide/square root processing circuitry;

FIG. 2 schematically illustrates an example of splitting a higher-radix digit-recurrence square root or divide operation into multiple lower-radix sub-iterations performed in the same processing cycle;

FIG. 10 illustrates pipelining of successive divide or square root operations, with a second operation being forbidden to start a predetermined number of cycles after a first operation when the second operation uses a lower precision floating-point representation than the first operation;

FIG. 11 illustrates on-the-fly conversion;

FIG. 12 shows a worked example of the on-the-fly conversion;

FIG. 13 illustrates on-the-fly conversion for a 3×digit;

FIG. 14 illustrates a worked example of 3× on-the-fly conversion;

FIG. 16 illustrates selection to rebuild a partial root value;

FIG. 17 illustrates comparison constants for a radix-8 sub-iteration of a divide operation;

FIG. 18 illustrates comparison constants for a radix-8 sub-iteration of a square root operation;

FIG. 19 shows offsets representing an offset of the square root comparison constants relative to the divide comparison constants;

FIG. 20 shows division and offset lookup tables for determining comparison constants for divide and square root operations;

Square Root Processing

Figure 1:
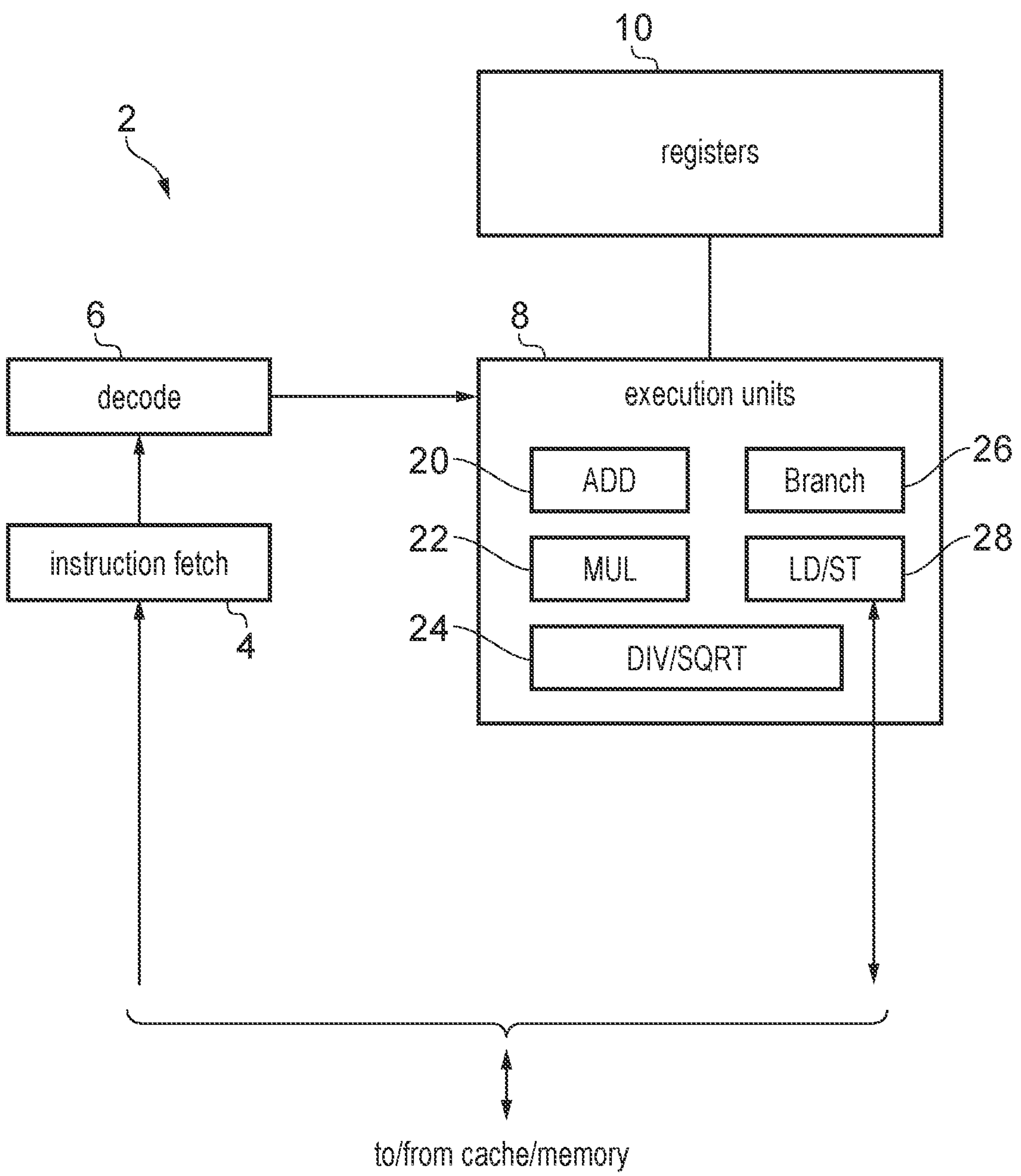

Square root processing circuitry may perform a given radix-r iteration of a radix-r square root operation, by performing two or more radix-n sub-iterations in a same processing cycle, where $n<r$. This can offer a better compromise between performance and circuit overhead, compared to an implementation which does not sub-divide the radix-r iteration into sub-iterations of lower radix. Since the overall operation performed in one cycle is a higher radix operation with radix r then this means that $\log_2(r)$ bits of the result can be generated per processing cycle, which may offer higher performance than if a smaller radix was used, but by breaking the radix-r iteration into several radix-n sub-iterations in the same processing cycle, where for each sub-iteration n is less than r, the overall size of the circuitry can be lower than if the radix-r iteration was performed as a single operation, because the number of alternative options available for selection as the next digit in each sub-iteration with radix n is less than the number of alternative options for radix-r digits that would be required if the radix-r iteration of the square root operation was performed as a unitary operation. However, splitting the radix-r iteration a number of smaller-radix sub-iterations may create a timing challenge in being able to fit those radix-n sub-iterations into a single processing cycle.

For a given radix-n sub-iteration, the square root processing circuitry may comprise digit selection circuitry to select, based on a previous remainder estimate, a next radix-n result digit for a square root result; remainder update circuitry to adjust a previous remainder value, based on a remainder adjustment value depending on the next radix-n result digit selected by the digit selection circuitry, to generate an updated remainder value; remainder estimate circuitry to generate an updated remainder estimate indicative of an estimate of a portion of the updated remainder value; and output signal paths to supply the updated remainder value and the updated remainder estimate for use as the previous remainder value and the previous remainder estimate in a subsequent radix-n sub-iteration of the given radix-r iteration or a first radix-n sub-iteration of a further radix-r iteration of the radix-r square root operation. As multiple sub-iterations are being performed per cycle, multiple instances of the digit selection circuitry, the remainder update circuitry, the remainder estimate circuitry and the output signal paths can be provided for the respective radix-n sub-iterations within the same radix-r iteration of the square root operation.

In a final radix-n sub-iteration of the given radix-r iteration, the remainder estimate circuitry may generate the updated remainder estimate in parallel with the remainder update circuitry generating the updated remainder value. This is counter-intuitive since, as the updated remainder estimate represents a portion of the updated remainder value, one may expect that the remainder value would need to be available first and then the remainder estimate calculated sequentially. However, the inventor recognised that it is possible, in an implementation which splits a higher-radix iteration into a number of smaller-radix sub-iterations, to generate the updated remainder estimate for the final sub-iteration in parallel with the remainder update circuitry generating the updated remainder value for that final sub-iteration of a given radix-r iteration. This means that the delay associated with calculation of the remainder estimate for the final radix-n sub-iteration can at least partially be removed from the critical timing path through the square root processing circuitry, to reduce the overall time taken to perform a given radix-r iteration of the square root operation, and hence improve overall performance.

The remainder update circuitry may generate the updated remainder value in a redundant representation. For example the remainder value may be represented as two terms which together represent the numeric value of the updated remainder value, but there may be more than one combination of values of the first term and the second term which can represent the same numeric value. Generating the updated remainder value in a redundant representation can be useful because it can avoid the computation of the updated remainder value needing to propagate carries from one bit to another. Hence, the remainder update circuitry may comprise carry-save adding circuitry.

However, for the purpose of selecting the next radix-n result digit for the square root result, the digit selection circuitry may perform digit selection using a representation of the remainder in a non-redundant representation, and so the remainder estimate circuitry can generate an updated remainder estimate in a non-redundant representation which is indicative of an estimate of at least a portion of the updated remainder value (where the non-redundant representation means that the estimate can be represented with a single term, and for any given numeric value of the updated remainder estimate, there is a single bit pattern (and no other) of the non-redundant representation that corresponds to that numeric value). The updated remainder estimate may have fewer bits than the updated remainder value (more particularly, the updated remainder estimate may have fewer bits than the number of bits in a single term of the redundantly represented remainder value which may comprise two redundant terms) as the full precision of the updated remainder value may not be needed for the digit selection, and limiting the number of bits in the estimate reduces the delay in calculating the non-redundant remainder estimate. For example the updated remainder estimate may represent an estimate of a most significant portion of the updated remainder value as lower bits may not significantly affect the accuracy of the digit selection.

Hence, computation of the remainder estimate in the non-redundant representation may use carry-propagate adding circuitry which may propagate carries from one bit position to another, and this may be slower than a carry-save adder. Therefore, in typical approaches, the carry-propagate adding circuitry used for the remainder estimate may greatly slow down the overall processing of a particular iteration of the square root operation.

However, the inventor recognised that in an approach where the radix-r square root iteration is split into multiple smaller sub-iterations of radix-n performed within the same processing cycle, the updated remainder estimate for the final radix-n sub-iteration may be computed in parallel with the calculation of the updated remainder value, because information provided as an input to the remainder update circuitry in the final radix-n sub-iteration and/or other information from earlier sub-iterations within the given radix-r iteration can be used to compute the updated remainder estimate for the final radix-n sub-iteration, avoiding the need to wait for the updated remainder value in the final radix-n sub-iteration to become available before starting computation of the updated remainder estimate for the final radix-n sub-iteration. This provides a relatively significant gain in performance due to the removal from the critical timing path of the relatively slow carry-propagate addition for calculating the updated remainder estimate in the final radix-n sub-iteration of a given radix-r iteration.

In the remainder update, a previous remainder value is updated based on a remainder adjustment value which takes a value which depends on the next result digit selected by the digit selection circuitry. The remainder estimate circuitry in the final radix-n sub-iteration may use this remainder adjustment value and the previous remainder estimate to generate the updated remainder estimate for the final radix-n sub-iteration. As the remainder adjustment value is used as an input to the remainder estimate circuitry in the final radix-n sub-iteration, this avoids needing to wait for updated remainder value, so that the updated remainder estimate can be available faster.

The remainder estimate circuitry may exploit the fact that the final radix-n sub-iteration follows at least one earlier sub-iteration being performed within the same cycle so that some information computed in that earlier sub-iteration may be used by the remainder estimate circuitry in the final sub-iteration to compute the updated remainder estimate sooner than if the remainder estimate was calculated sequentially after the updated remainder value is obtained.

For example, in a preceding radix-n sub-iteration of the given radix-r iteration other than the final radix-n sub-iteration, the remainder estimate circuitry may calculate at least one additional bit of the updated remainder estimate which is unnecessary for selecting the next radix-n result digit in the final radix-n sub-iteration of the given radix-r iteration, and in the final radix-n sub-iteration of the given radix-r iteration, the remainder estimate circuitry may determine the updated remainder estimate using that at least one additional bit determined in the preceding radix-n sub-iteration. By calculating more bits than needed for the updated remainder estimate in the preceding radix-n sub-iteration, the additional bit(s) may be used to compute the updated remainder estimate earlier in the final radix-n sub-iteration because the additional bit(s) computed in the preceding sub-iteration allow the updated remainder estimate in the final sub-iteration to be calculated without waiting for the updated remainder value to be available.

In a first radix-n sub-iteration of the given radix-r iteration, the remainder estimate circuitry can determine the updated remainder estimate based on the updated remainder value generated by the remainder update circuitry in the first radix-n sub-iteration. Hence, it is not essential for the updated remainder estimate to be calculated in parallel with the updated remainder value in all of the sub-iterations. For the first sub-iteration of a given radix-r iteration, there may not be sufficient information available to be able to calculate the remainder estimate until the updated remainder value is available in redundant form. However, since multiple radix-n sub-iterations are being overlapped within the same processing cycle then there is freedom for circuit designers to vary the relative timing at which portions of a subsequent sub-iteration start relative to portions of an earlier sub-iteration and information from earlier sub-iterations may be used to compute parameters in later sub-iterations making it feasible to parallelise the calculation of the updated remainder value and the updated remainder estimate at least for the final sub-iteration.

In implementations where there are at least three sub-iterations performed within the same cycle to implement a given radix-r iteration of the square root operation, it is also possible for the updated remainder estimate to be calculated in parallel with the updated remainder value for one or more intermediate sub-iterations between the first sub-iteration and the final sub-iteration.

The square root processing circuitry comprises, for the given radix-n sub-iteration, one or more instances of replicated circuitry, each instance of replicated circuitry comprising: two or more replicated circuit units to determine, in parallel with selection of the next radix-n result digit by the digit selection circuitry, two or more candidate output values corresponding to different result digits which are capable of being selected as the next radix-n result digit by the digit selection circuitry; and selection circuitry to select one of a plurality of candidate output values in response to the digit selection circuitry indicating which of the different result digits is selected as the next radix-n result digit, the plurality of candidate output values including at least the two or more candidate output values generated by the two or more replicated circuit units. With this approach, performance can be faster because it is not necessary to wait for the next radix-n result digit to actually be selected by the digit selection circuitry before starting the calculations for generating the candidate output values.

Note that the number of candidate output values available for selection by the selection circuitry may be greater than the number of candidate output values generated by the two or more replicated circuit units. For example, one of the possible result digits available for selection may be equal to zero, and in some cases it may not be necessary to explicitly compute a candidate output value for a result digit of zero because the candidate output value to be selected if the next result digit is zero could be identical to an input value provided to the sub-iteration. Hence, the selection circuitry may take as an input a candidate output value that is not explicitly generated by one of the replicated circuit units, as well as the candidate output values generated by the two or more replicated circuit units.

Providing replicated circuit units to speculatively calculate multiple candidate output values ahead of the time when the next result digit is known can be good for performance, but the number of replicated circuit units required increases with increasing radix and so to support higher radix operations then this may increase circuit area costs and power consumption.

One technique for limiting the circuit area and power cost may be to provide at least one of the two or more replicated circuit units as a shared circuit unit which is shared between both a positive result digit having a given magnitude and a negative result digit having the same given magnitude. The shared circuit unit may output a shared candidate output value to the selection circuitry on a shared signal path, and the selection circuitry may select the shared candidate output value from the shared signal path when the next radix-n result digit is any of the positive and negative result digits having that given magnitude. Hence, this avoids the need to provide two separate replicated circuit units for the positive and negative result digits respectively, which share the same magnitude. This can reduce the total number of replicated circuit units required and therefore save circuit area and reduce power consumption.

For at least one instance of the replicated circuitry, the shared circuit unit, which provides an output shared between the positive and negative result digits of the same magnitude, may select based on a sign of the previous remainder estimate a value to be output as the shared candidate output value on the shared signal path. Hence, while a common signal path is shared between the two result digit values having the same magnitude but different sign, the actual numeric value output on that shared signal path may vary depending on the sign of the previous remainder estimate.

For at least one instance of the replicated circuitry, the shared circuit unit may comprise shared adding circuitry to determine the shared candidate output value for the positive and negative result digits having the given magnitude. The technique of providing a shared circuit unit for generating the shared candidate output value for both the positive and negative digits of the same magnitude can be particularly useful where that circuit unit includes adding circuitry because the adding circuitry can be relatively costly in terms of circuit area.

For a radix-n sub-iteration, one would normally expect that the number of candidate output values available for selection by the selection circuitry should be n+1. However, by sharing a shared circuit unit between the positive and negative result digits having the same magnitude, the total number of candidate output values available for selection by the selection circuitry can be reduced to n/2+1, which can greatly reduce circuit area as this means the number of replicated circuit units provided can be reduced.

There may be several instances of the replicated circuitry within the square root processing circuitry. Various parts of the square root processing circuitry can each use this approach where replicated circuit units speculatively determine candidate output values for multiple possible result digits and then once the next result digit has been selected the correct candidate output value can be selected by the selection circuitry.

For example, the remainder update circuitry could comprise one of such instances of replicated circuitry. If the remainder update circuitry uses the speculative replication and selection approach then the candidate output values being selected by the selection circuitry may be candidate updated remainder values.

Similarly, the remainder estimate circuitry could also use this speculative replication and comprise one of the instances of replicated circuitry described above. Where the remainder estimate circuitry comprises the replicated circuitry, the candidate output values may be candidate updated remainder estimates.

Another part of the digit-recurrence method may be to perform on-the-fly conversion. For a square root operation, the adjustment of the previous remainder value to generate the updated remainder value may depend not only on the remainder adjustment value (selected based on the next result digit), but may also depend on a partial root value which is a numeric value corresponding to a previously selected sequence of result digits. As the result digits may be selected by the digit selection circuitry as signed digits, then to provide the partial root value in a non-redundant representation which can be used by the remainder update circuitry to adjust the previous remainder value to generate the updated remainder value, on-the-fly conversion circuitry may be provided to convert the partial root value into a non-redundant representation. As described below, it is possible to do the on-the-fly conversion in a manner which does not require addition but can be done simply be concatenating the previous partial root value and some extra bits selected based on the latest radix-n result digit.

Hence, the on-the-fly conversion circuitry (for generating, in a non-redundant representation, a partial root value indicative of a numeric value corresponding to a previously selected sequence of radix-n result digits) may also comprise an instance of the replicated circuitry discussed above, so that the replicated circuit units generate a number of candidate partial root values and the candidate output values available for selection by the selection circuitry comprise a number of candidate values for the partial root value.

Hence, regardless of which portion of the square root processing circuitry implements the replication, the replication can help to improve performance, and if implemented the sharing of a replicated circuit unit for the positive and negative result digits of the same magnitude can help to reduce the whole circuit scale.

While some implementations can implement the replicated circuitry at only one or a subset of the above components of the square root processing circuitry while other components do not use the replicated approach, performance can be greatest if each of the remainder update circuitry, remainder estimate circuitry and on-the-fly conversion circuitry provides an instance of the replicated circuitry.

In general, where a given radix-r iteration is split into a number of back-to-back or overlapped radix-n sub-iterations in a same processing cycle, the value of r may correspond to the product of the respective values of n for each of the sub-iterations used in one cycle.

In a specific example discussed below, r=64 and n=8 for each of the sub-iterations, so that there are two radix-8 sub-iterations in each radix-64 iteration. This approach can provide a good balance between performance (radix 64 means 6 bits can be generated per processing cycle) and circuit area and timing complexity (using radix 8 for the sub-iterations means that only two sub-iterations are needed, which imposes less timing pressure compared to implementations using three or more sub-iterations, while increasing radix beyond 64 may make it less feasible to manage the circuit scale while meeting timings). Therefore, r=64 and n=8 can be a particularly useful combination.

Nevertheless, other options are also possible. For example, it would be possible to perform a radix-64 iteration of the square root operation as three sub-iterations each with radix-4 (since 64=4×4×4).

Implementing each of the sub-iterations with the same radix n can be useful because it may be more efficient in terms of overall circuit area and simpler in terms of design complexity to use the same radix at each sub-iteration.

Nevertheless, it would also be possible for different sub-iterations within the same radix-r iteration to use different radices. For example a radix-64 iteration of a digit-recurrence square root operation could be split into one radix-4 sub-iteration, one radix-8 sub-iteration, and one radix-2 sub-iteration. Therefore, it is not essential for n to be equal for each of the sub-iterations.

The technique discussed above can be implemented in square root processing circuitry of different designs. In one example the square root processing circuitry may be iterative square root processing circuitry, for which the output signal paths may supply the updated remainder value and the updated remainder estimate generated in the final radix-n sub-iteration from an output of the iterative square root processing circuitry to an input of the same iterative square root processing circuitry, for use as the previous remainder value and the previous remainder estimate in the first radix-n sub-iteration of a further radix-r iteration of the square root operation. Hence, to perform the square root operation as a whole, multiple passes through the iterative square root processing circuitry would be performed across multiple processing cycles, where the outputs of the iterative square root processing circuitry in one cycle is fed back as inputs to the same unit in a subsequent cycle.

However, as discussed in more detail below, the square root processing circuitry could also be part of a pipelined square root processing unit which comprises a number of square root iteration pipeline stages, each stage comprising a respective instance of the square root processing circuitry discussed above. In this case the output signal paths of a given pipeline stage may supply the updated remainder value and the updated remainder estimate generated in the final radix-n sub-iteration of the given radix-r iteration from an output of the square root processing circuitry in one square root iteration pipeline stage to an input of the square root processing circuitry (a different instance of the square root processing circuitry) in a subsequent square root iteration pipeline stage, for processing of a subsequent radix-r iteration in the next processing cycle. This approach can help to improve the overall throughput of square root operations as it becomes possible to pipeline multiple square root operations with respect to each other so that while an earlier square root operation is being processed at a later stage of the pipeline square root processing unit, a later square root operation may be at an earlier pipeline stage having an earlier radix-r iteration being performed.

Combined Divide/Square Root Processing Circuitry

Commercial processor micro-architectures typically are provided with separate circuit logic for divide operations and square root operations respectively, so that these operations are performed in completely separate circuit logic units and there is no sharing of the data path used to calculate the divide result compared to the data path used to calculate the square root result. This may be simpler to build as there is no need for extra complexity in the square root operation to impact on timings in the divide operation. However, it may be desirable to increase the radix used for the divide and square root operations to improve performance by allowing a greater number of bits of the divide or square root result to be calculated per cycle. For example, with a radix-64 divide or square root operation, which is not currently available on commercial processors, 6 bits of the result can be calculated per cycle. However, the increased radix means that more complex circuitry is needed compared to implementations needing a lower radix. Having separate divide and square root processing circuitry when operating at higher radix may therefore increase the circuit scale and hence the power consumption of the processor.

In examples described below, combined divide/square root processing circuitry is provided to perform, in response to a divide instruction, a given radix-64 iteration of a radix-64 divide operation, and in response to a square root instruction, a given radix-64 iteration of a radix-64 square root operation. The combined divide/square root processing circuitry has shared circuitry to generate at least one output value for the given radix-64 iteration on a same data path used for both the radix-64 divide operation and the radix-64 square root operation. For example, the at least one output value could include any one or more of: an updated remainder value, a selected result digit, an updated remainder estimate and/or an on-the-fly converted partial result value. By using a shared circuit with the same data path being used for outputs of both divide and square root operations, the total amount of circuitry can be reduced compared to an implementation with split divide and square root units. This is particularly useful for radix-64 operations given the increased circuit scale required for radix 64 compared to lower radix operations supported by commercial processor micro-architectures.

The combined divide/square root processing circuitry may perform a same number of radix-64 iterations per processing cycle for both the radix-64 divide operation and the radix-64 square root operation. This can help to increase the extent to which circuitry can be shared between the square root and divide operations, to limit the overall circuit area of the combined divide/square root processing circuitry.

For both the radix-64 divide operation and the radix-64 square root operation, the combined divide/square root processing circuitry may perform the given radix-64 iteration by performing one or more radix-m sub-iterations in a same processing cycle, where $m \leq 64$.

In some examples m=64 and in this case the radix-64 iteration may be performed as a single unitary operation generating the 6 bits of the next result digit in one go, without splitting the radix-64 iteration into separate sub-iterations. This approach may be faster but may need additional circuit logic to accommodate a greater number of candidate result digits since with a radix-64 iteration performed as a single operation the possible result digits may extend from −32 to +32.

However, in some examples m<64, so that the combined divide/square root processing circuitry may perform the given radix-64 iteration by performing multiple radix-m sub-iterations in the same processing cycle. For example, m in the specific example shown below equals 8 so that there are two radix radix-8 sub-iterations in each radix-64 iteration. Another option could be for m=4 so that there are three radix-4 sub-iterations in one radix-64 iteration per processing cycle. The sub-iteration radix m could take different values among the different sub-iterations, as mentioned above for the square root processing circuitry example, although it may be more efficient in terms of circuit implementation if m is the same in each sub-iteration.

Hence, the term "radix-m sub-iteration" is used to refer either to the radix-64 iteration as a whole if there is no sub-division into multiple sub-iterations of smaller radix, or to an individual sub-iteration of smaller radix if such sub-division is implemented.

There may be different portions of the combined divide/square root processing circuitry, which may function as the shared circuitry mentioned above.

In one example, the shared circuitry comprises shared digit selection circuitry to select, in a given radix-m sub-iteration, a next radix-m digit for a divide result or a square root result, based on comparison of a previous remainder estimate with a set of comparison constants. In implementations where m=64 and so there is no splitting of the radix-64 iteration into multiple sub-iterations, the previous remainder estimate used for the digit selection may come from the previous radix-64 iteration. On the other hand, if m<64 so that the radix-64 iteration is split into multiple radix-m sub-iterations, then for the first radix-m sub-iteration of the given radix-64 iteration, the previous remainder estimate may come from the final radix-m sub-iteration of the previous radix-64 iteration, while for a later radix-m sub-iteration other than the first radix-m sub-iteration of the given radix-64 iteration, the shared digit selection circuitry may select the next radix-m digit based on a previous remainder estimate calculated in an earlier radix-m sub-iteration of the given radix-64 iteration.

Hence, shared digit selection circuitry can be provided to save circuit area compared to separate circuitry for selecting result digits for divide and square root operations respectively. For example, the shared digit selection circuitry may comprise a same set of comparator circuits used to perform the comparison between the previous remainder estimate and the comparison constants for both the divide and square root operations.

While the comparator circuits used may be the same when performing both the divide and the square root operations, the shared digit selection circuitry may nevertheless use different sets of comparison constants for the radix-64 divide operation and the radix-64 square root operation respectively. A set of comparison constants can be selected based on the operation type.

However, one issue is that the comparison constants for the divide operation may not be the same size as the comparison constants for the square root operation. It has been found by error analysis that the divide operation may not need as many bits in the comparison constants as the comparison constants used for the square root operation, to provide sufficient accuracy of digit selection. Hence, one may expect the divide comparison constants to have fewer bits than the square root comparison constants. However, to facilitate sharing of circuitry, the comparison constants compared with the previous remainder estimate for the radix-64 divide operation may have at least one least significant bit set to 0 to pad them to a same width as the comparison constants compared with a previous remainder estimate for the radix-64 square root operation. By extending the comparison constants for division to a same bit width as those used for square root operation by placing at least one zero in the least significant bit positions, this allows the same comparators in the digit selection circuitry and the same data path for the remainder estimates to be used for both square root and divide operations allowing reduced circuit area.

Another example of shared circuitry may be shared remainder update circuitry which adjusts, in a given radix-m sub-iteration, a previous remainder value based on a remainder adjustment value to generate an updated remainder value in a redundant representation. By using the redundant representation, the remainder update may be performed using a carry-save addition to avoid the increased delay of a carry-propagate addition. Hence, the shared circuitry may comprise shared carry-save adding circuitry to perform a carry-save addition to generate the updated remainder value. As the data path for the remainder value is shared between divide and square root operations this avoids the need to provide two separate carry-save adders for the divide and square root operations respectively.

However, the remainder adjustment value may be different for divide operations compared to square root operations. Hence, the shared remainder update circuitry may comprise selection circuitry to select, as the remainder adjustment value: a value derived from a divisor value, when performing the given radix-m sub-iteration as part of the radix-64 divide operation, and a value derived from a partial root value depending on a sequence of previously selected radix-m root digits, when performing the given radix-m sub-iteration as part of the radix-64 square root operation. Hence, with a small amount of additional logic in the selection circuitry, a shared data path can be used for both square root and divide operations when generating the remainder updates.

Another example of the shared circuitry may be shared remainder estimate circuitry to generate, in a given radix-m sub-iteration, an updated remainder estimate indicative of a non-redundant estimate of a portion of an updated remainder value generated in a redundant representation in the given radix-m sub-iteration of the radix-64 divide operation or the radix-64 square root operation. For example, the shared remainder estimate circuitry may comprise carry-propagate adding circuitry to perform carry-propagate addition to generate the non-redundant estimate, so by sharing this between the divide and square root operations it is not necessary to provide two separate carry-propagate adders.

In an implementation where m is less than 64, in a final radix-m sub-iteration of the given radix-64 iteration, the shared remainder estimate circuitry may generate the updated remainder estimate in parallel with shared remainder update circuitry generating the updated remainder value. This improves performance by reducing the latency of the critical timing path, for the same reasons as discussed above for the square root processing circuitry.

Another example of the shared circuitry may be shared on-the-fly conversion circuitry to perform, in a given radix-m sub-iteration, on-the-fly conversion to generate a partial result value in a non-redundant representation. Again, the on-the-fly conversion circuitry may require relatively complex hardware circuit logic, and so by avoiding duplicating this for divide and square root operations a greater amount of circuit area can be saved.

However, one issue is that in typical schemes the on-the-fly conversion circuitry is performed differently for divide operations compared to square root operations. The on-the-fly conversion circuitry may insert a value selected based on the next result digit into a partial result value, to generate the on-the-fly converted value representing the partial result corresponding to the sequence of result digits selected in that cycle and any earlier cycles. However, in typical schemes, the position at which the next digit is inserted into the partial result value during on-the-fly conversion has been different for divide and square root operations, with divide operations inserting the value derived from the next digit at a least significant bit position with a left shift being performed to shift up all the previously inserted bits to more significant bit positions. In contrast, due to the fact that the partial result value influences the digit selection and remainder update operations in the square root operation (and so it is more convenient if, in each processing cycle, the most significant bit of a partial root result value remains at a consistent bit position within the stored representation of the partial result), for the square root operation the value derived from the next result digit is inserted at a variable bit position within the partial result with a mask used to represent the position within the partial result value at which the next square root result digit is inserted. This mask may be adjusted between iterations or sub-iterations to gradually move the position at which the next result digit is to be inserted towards less significant bits of the partial result value.

Given these contrasting methods of maintaining the partial result value, one might think that it is difficult to have shared circuit logic for the on-the-fly conversion circuitry.

However, the inventor recognised that it is possible to provide shared on-the-fly conversion circuitry. In the given radix-n sub-iteration, the shared on-the-fly conversion circuitry selects a position for inserting a next digit into the partial result value based on a mask value, for both the radix-64 divide operation and the radix-64 square root operation. Hence, for the divide operation the shared on-the-fly conversion circuitry behaves unconventionally, as instead of shifting up all the digits and inserting the next digit at the least significant bit position, now for the radix-64 divide operation a mask is used to select the position at which a next digit is inserted into the partial result value for the divide operation. This allows the on-the-fly conversion for the divide operation to mirror that for the square root operation so that shared circuit logic and a shared data path can be used. This helps to improve overall circuit area efficiency.

As with the various circuit units of the square root processing circuitry described above, the shared circuitry in the shared divide/square root circuitry may comprise one or more instances of replicated circuitry, where each instance of replicated circuitry comprises: two or more replicated circuit units to determine, in parallel with selection of a next radix-m digit for a divide result or a square root result, two or more candidate output values corresponding to different digits which are capable of being selected as the next radix-m digit, and selection circuitry to select one of a plurality of candidate output values in response an indication of which of the different digits was selected as the next radix-m digit, the plurality of candidate output values including at least the two or more candidate output values generated by the two or more replicated circuit units. This helps to improve performance for the same reasons as discussed above for the square root example. Again, at least one of the replicated circuit units may be a shared circuit unit shared between positive and negative digits of equal magnitude to reduce the overall number of replicated circuit units needed to handle a radix-m sub-iteration. Various components of the combined divide/square root circuitry may use such replicated circuitry, e.g. any one or more of the remainder update circuitry, remainder estimate circuitry and on-the-fly conversion circuitry.

As with the square root processing circuitry mentioned earlier, for the combined divide/square root processing circuitry this can be either implemented as an iterative divide/square root processing circuitry where the outputs of one radix-64 iteration are input to the same iterative divide/square root processing circuitry for use in a further radix-64 iteration of the divide or square root operation, or as a pipelined divide/square root processing unit having a number of pipeline stages each with a respective instance of the combined divide/square root processing circuitry, with signal paths providing outputs generated in one stage as inputs to the next stage in the pipeline.

Divide/Square-Root Pipeline

It is common for many programs to require arithmetic operations to be performed on operands represented in a floating-point format. The IEEE-754 technical standard defines various formats for floating-point representation, for example half precision (HP), single precision (SP) and double precision (DP) (other formats are also available). The particular floating-point precision used for the operands and result of a divide or square root operation may control how many bits need to be generated for the result, which may have an impact on the number of iterations needed for a digit-recurrence divide or square root operation.

Traditionally, the circuit unit for performing a digit-recurrence divide or square root operation capable of generating results with floating-point levels of precision has been implemented as an iterative circuit unit so that the circuit logic provided in hardware corresponds to a single iteration of the digit-recurrence divide or square root operation, and the outputs of one iteration are fed back as inputs to exactly the same circuit logic unit which just performed the previous iteration, ready for that same circuit unit to perform the next iteration.

In contrast, in examples discussed below, a divide/square-root pipeline is provided which comprises a number of divide/square-root iteration pipeline stages, which each can perform a respective iteration of a digit-recurrence divide or square root operation. Signal paths are provided to supply outputs generated by one pipeline stage in one iteration as inputs to a subsequent pipeline stage of the divide/square-root pipeline for performing a subsequent iteration of a digit-recurrence divide or square root operation. The divide/square-root pipeline is capable of performing the digit-recurrence divide or square root operation on a floating-point operand to generate a floating-point result.

Hence, while supporting the level of precision needed for floating-point formats, the divide or square root operation is implemented in a pipelined manner rather than as an iterative unit. This means that for processing of a single divide or square root operation the respective iterations are performed by different pipeline stages with the outputs from one pipeline stage being input to the next pipeline stage so that the operation moves down the pipeline until it reaches the end and the result can be output.

This approach can be seen as counter intuitive because, although pipelining of instructions in general is known, the sheer complexity of divide/square root operations compared to other forms of arithmetic has meant that the overall circuit area of a single circuit unit for performing a single iteration of the digit-recurrence divide or square root operation has been relatively high and so one would think that expanding an iterative unit into a pipeline comprising a sufficient number of stages for generating the result precision needed for floating-point processing would greatly increase the overall circuit area required for the divide/square-root unit, by a factor corresponding to the maximum number of iterations needed for the divide or square root operation.

However, the inventor recognised that in practice, processor micro-architectures having iterative divide/square-root processing circuitry may actually provide a number of parallel divide/square-root units to increase the overall bandwidth available so that there could for example be multiple divide functional units and/or multiple square root functional units so that two or more divide or square root operations can be processed simultaneously. With the pipelined approach, the need to duplicate the whole divide/square-root unit is eliminated because it is possible to process multiple operations in a pipelined manner where the divide/square-root pipeline can perform a first digit-recurrence divide or square-root operation and a second digit-recurrence divide or square-root operation with a later divide/square-root iteration pipeline stage of the divide/square-root pipeline performing a later iteration of the first digit-recurrence divide or square-root operation in parallel with an earlier divide/square-root iteration pipeline stage performing an earlier iteration for the second digit-recurrence divide/square-root operation.

Hence, although the pipeline would appear to greatly increase the circuit logic, in practice compared to commercial processors with multiple parallel divide/square-root units the extra circuitry may not be so significant, especially as various techniques discussed in this application for reducing the circuit area can be applied such as using shared data paths for the divide and square root operations and reducing the number of replicated circuit units by sharing the same replicated circuit unit for positive and negative digits of the same magnitude as discussed earlier.

Hence, overall the pipeline may be competitive in terms of circuit area and may help to improve performance because with the pipelined processing of operations a greater throughput may be possible as back to back divide or square root operations can be scheduled with fewer cycles between them because the pipelining can avoid the iterative circuit unit being blocked for the total number of cycles taken to perform the digit-recurrence divide or square root operation.

It is possible for the pipeline to only implement one of the divide or square root operations so that the divide/square-root pipeline may be capable of performing one of the divide or square root operations, but not both.

However, the pipeline can be particularly useful for cases where combined divide/square-root processing circuitry is provided with a shared data path used for both operations. Hence, each divide/square-root iteration pipeline stage comprises combined divide/square root processing circuitry to perform a given iteration of a digit-recurrence divide operation in response to a divide instruction and to perform a given iteration of a digit-recurrence square root operation in response to a square root instruction. The combined divide/square root processing circuitry comprises shared circuitry to generate at least one output value on a same data path used for both the given iteration of the digit-recurrence divide operation and the given iteration of the digit-recurrence square root operation. Providing combined divide/square root processing circuitry helps to limit the overall area cost of expanding a single iterative unit into a pipeline (since the area budget previously provided for separate divide and square root units is available for implementing the pipeline) and helps to make the pipeline competitive with current micro-architectures in terms of circuit area. As mentioned earlier, where combined divide/square root circuitry is used, it can be useful for the divide/square-root pipeline to perform a same number of iterations per processing cycle, with a same radix, for both the digit-recurrence divide operation and the digit-recurrence square root operation as this facilitates greater sharing of shared circuit units.

For a given result precision, the divide/square-root pipeline may process the digit-recurrence divide operation in the same number of processing cycles as the digit-recurrence square root operation. This helps with simplifying control of circuit timings in the pipeline and with facilitating sharing of common circuit logic between the divide and square root operations.

Various floating-point formats could be supported for the operand(s) input to a divide or square root operation and the floating-point result generated in the divide or square root operation. For example the operand(s) and result may be a half precision (HP), single precision (SP) or double precision (DP) floating point value. The divide/square-root pipeline may support at least one of these formats, or could also support other types of floating point format. However, it is particularly useful if the divide/square-root pipeline supports at least one of SP and DP floating point values. Programs written with DP floating-point precision can be particularly common and so in some cases it can be useful for the divide/square-root pipeline to support operations where the result is in DP floating-point representation. The pipeline stages of the divide/square-root pipeline may be used to process the significand of the floating-point operand to generate a significand of the floating-point result. There may be separate circuit logic to process the exponents of the floating point values. The exponent processing logic may be simpler than the logic for generating the significand and can use any known technique for generating the exponent of a divide/square-root result.

In some examples the divide/square-root pipeline may support at least two different result precisions for the digit-recurrence divide or square root operation. For example the divide/square-root pipeline may support any two or more of HP, SP and DP floating-point values.

For floating-point result precisions of lower precision, the divide/square-root pipeline may perform the divide or square root operation in fewer processing cycles than when generating a result with a higher precision (since fewer bits need to be generated for the result, fewer iterations of the digit-recurrence method are needed). The apparatus may have control circuitry to control the divide/square-root pipeline to cause at least one divide/square-root iteration pipeline stage, which is used to perform at least one iteration of the digit-recurrence divide or square root operation when generating a result with a higher precision, to be bypassed when performing the digit-recurrence divide or square root operation to generate a result with a lower precision. This improves performance by allowing the result of the operation to be available earlier when fewer bits need to be calculated.

However, allowing some stages of the pipeline to be bypassed in this way may create the possibility that if a lower-precision operation is performed after a higher-precision operation in a pipelined manner, both operations may collide when reaching a post-processing stage at which a post-processing operation can be performed on the output of a final iteration of the digit-recurrence divide or square root operation. For example, the post-processing stage may perform rounding of a result of the divide or square root operation to provide a rounded floating-point result, and/or denormal (subnormal) result handling by right-shifting to produce a result according to the IEEE standard (when the result of the divide or square root operation is less than the smallest number capable of being represented as a normal floating-point number). To ensure that the post-processing operation only receives the outputs of the final iteration for a single operation per cycle, the control circuitry may prevent a lower-precision digit-recurrence divide/square-root operation performed to generate a result with a lower precision from starting a predetermined number of cycles after a higher-precision digit-recurrence divide/square-root operation performed to generate a result with a higher precision, the predetermined number of cycles corresponding to a difference between a number of cycles taken to reach the at least one post-processing stage for the higher-precision digit-recurrence divide/square-root operation and a number of cycles taken to reach the at least one post-processing stage for the lower-precision digit-recurrence divide/square-root operation. Hence, depending on the difference in precision between the earlier higher-precision operation and the later lower-precision operation, there may be a certain number of cycles at which the lower-precision operation is forbidden from starting after the higher-precision operation to avoid collision. The predetermined number of cycles may differ for different pairs of precision formats.

Each divide/square-root iteration pipeline stage may comprise: digit selection circuitry to select a next result digit for a partial result value of the digit recurrence divide or square root operation, based on a comparison between a previous remainder value and a set of comparison constants; and remainder update circuitry to update the previous remainder value based on a remainder adjustment value and the next result digit selected by the digit selection circuitry. Each pipeline stage may also have other elements such as remainder estimate circuitry for generating a non-redundant estimate of a portion of the updated remainder value generated by the remainder update circuitry in a redundant representation. Also each pipeline stage could have on-the-fly conversion circuitry for maintaining, on-the-fly, a none-redundant version of a partial result value which corresponds to the previously selected sequence of result digits from all preceding iterations of the digit-recurrence method.

The divide/square-root iteration pipeline stages of the pipeline may all use a same set of comparison constants for each respective iteration that is performed within a same digit-recurrence divide or square root operation. It is possible that the comparison constants may vary from one operation to another, but within the respective iterations of the same operation, the same set of comparison constants can be used. Hence, the divide/square-root pipeline may perform a table lookup to obtain the set of comparison constants at a pre-processing stage of the divide/square-root pipeline prior to a first divide/square-root iteration pipeline stage of the divide/square-root pipeline, with the set of comparison constants being passed from stage to stage to avoid repeating the table lookup at each divide/square-root iteration pipeline stage within a same digit-recurrence divide or square-root operation. With this approach the timing for each individual pipeline stage can be shorter because it is not necessary to perform a table lookup at each stage and the overall amount of circuit logic needed at each stage can be reduced. There can be a set of flip-flops provided at each pipeline stage which simply captures the comparison constants received from the previous pipeline stage without needing to update those comparison constants. This greatly simplifies the pipeline and reduces the overall circuit area.

This approach may to be surprising because one may think that the comparison constants for a digit-recurrence divide or square root operation should not be the same for each iteration, as especially as in the first iteration of a typical divide/square root operation, a different set of comparison constants may be needed compared to the constants used in later stages. However, in examples discussed below the divide/square-root pipeline comprises at least one pre-processing stage to perform operand pre-processing prior to a first divide/square-root iteration pipeline stage of the divide/square-root pipeline, the operand pre-processing including selection of at least one initial result digit for a result of the digit-recurrence divide or square root operation. By selecting at least one initial result digit for the result of the divide or square root operation at the pre-processing stage so that that initial result digit is not selected within the main body of the pipeline, this means that a different set of selection criteria could be used for that result digit to avoid needing different comparison constants at different stages of the main iteration portion of the pipeline. This means that the remaining divide/square root iteration pipeline stages can each use the same set of comparison constants within the same divide or square root operation, to improve circuit timings and reduce circuit area as discussed above.

However, one issue in an implementation where the divide/square root pipeline supports both a digit-recurrence divide operation and a digit-recurrence square root operation (with combined divide/square root circuitry being provided as discussed above) is that the number of initial digits requiring a different set of comparison constants compared to subsequent iterations may differ for the divide and square root operations. For example by error analysis it has been found that, to get sufficient accuracy of digit selection, for the square root operation, when radix-8 is used for digit selection in a given iteration or sub-iteration, the selection of the first two square root digits may use different comparison constants to selection of remaining square root digits. If the radix used is a radix other than 8, the number of initial root digits which are selected using different comparison constants to remaining iterations may be a number other than two. Nevertheless, regardless of the radix, in general the square root operation may use different comparison constants for selecting a certain number of initial root digits, and then use the same set of comparison constants for subsequent iterations or sub-iterations after those initial root digits have been selected. In contrast, for the divide operation, the same comparison constants can be used for selection of all the result digits (irrespective of the radix used). However, for performance reasons it may be desired to select at least one result digit during the pre-processing stage, to reduce the number of subsequent pipeline stages needed for the divide operation and hence reduce latency. For example, in the radix-8 example described below, the first divide digit may be selected at the pre-processing stage.

Therefore, it is possible that the number of initial digits selected at the pre-processing stage may be different for square root and divide operations. For example, the at least one pre-processing stage may generate a greater number of initial result digits for the digit-recurrence square-root operation than for the digit-recurrence divide operation. While this may apparently introduce some asymmetry between the two operations, in practice this greatly helps to reduce the overall circuit area and improve performance for the pipeline because it means that, for the square root operation, comparison constants in remaining stages can simply be latched form one stage to the next without needing a separate table lookup at each pipeline stage.

However, as more initial result digits are generated for the square root operation than for the divide operation at the at least one pre-processing stage, this means that fewer remaining iterations are needed after the pre-processing stage for the square root operation compared to the divide operation, even when generating results of the same precision, and so the result of the square root operation may be available at an earlier divide/square-root iteration pipeline stage for the square root operation compared to the divide operation. To allow a shared pipeline to be used, the control circuitry may control the divide/square-root pipeline to cause at least one divide/square-root iteration pipeline stage, which is used to perform at least one iteration when the digit-recurrence divide operation is performed, to be wholly or partially skipped or to discard some bits of its result output, when performing the digit-recurrence square root operation. In some cases an entire pipeline stage of the pipeline could be skipped for the square root operation, while in other cases it may only be part of the bits generated in a given pipeline stage that need to be discarded, depending on the floating point precision being used and the radix used for the digit recurrence operation. For example in some cases where a given iteration of the digit recurrence method is split into multiple sub-iterations of smaller radix as in some of the example discussed above, it may be possible to skip only an individual sub-iteration within a given divide/square-root iteration pipeline stage, rather than skipping the entire stage, for some result precisions of the square root operation. Also, in some cases if the total number of bits required in a given result precision for the square root operation is not an exact multiple of the number of bits generated per iteration or sub-iteration then the truncation of the result could be obtained by performing a given iteration or sub-iteration fully but then discarding some bits of the result when other bits of the result digit generated in the last performed iteration or sub-iteration are still required.

Although this means that the result of the square root operation can sometimes be available earlier than the result of the divide operation when considering the main body of the pipeline, the overall number of cycles taken for the operation may still be the same for both the square root and divide operations. For example, even if the result of the square root operation could be available earlier, there could be at least one cycle when a value is passed unchanged to the next cycle, to allow the overall operation timing to mirror that of the divide operation. This can make scheduling of post-processing operations simpler to implement, for example, as the post-processing can then be at the same timing regardless of which operation is being performed.

Another complexity when using a combined divide/square root data path in the pipeline is in the maintenance of a partial result value which provides a representation of a numeric value corresponding to the previously selected sequence of result digits. If a shared data path is to be used it may be desirable to be able to insert the next result digit into the partial result value at a same bit position for both the divide and square root operations when performing a given iteration of the digit-recurrence method at a given pipeline stage of the pipeline. However, if the pre-processing stage generates a different number of initial result digits for the divide and square root operations, then this may make it more complex to use shared circuit logic at remaining pipeline stages as one would think that the position at which the next result digit is to be inserted in a given iteration could differ from iteration to iteration.

Therefore, when performing the digit-recurrence divide operation, the at least one pre-processing stage may provide the first divide/square-root iteration pipeline stage with a partial result value in which selected bit positions are set to dummy bit values, with those selected bit positions corresponding to bit positions at which the at least one pre-processing stage, when performing the digit-recurrence square root operation, would insert at least one additional result digit not generated for the digit-recurrence divide operation. This enables a given divide/square-root iteration pipeline stage of the divide/square-root pipeline to insert a next result digit into the partial result value at a same bit position for both the digit-recurrence divide operation and the digit-recurrence square root operation. The divide/square-root pipeline may comprises a post-processing stage to eliminate the dummy bit values from a final result value when performing the digit-recurrence divide operation.

This recognises that inserting additional dummy bit values into the partial result for the divide operation does not affect the overall result of the divide operation because the partial result value is not used for remainder update or digit selection operations in the divide operation. It is only for the square root operation that the partial result value is used to control remainder update and digit selection operations. For the divide operation the partial result value is simply being maintained "on the fly" to improve performance by not needing to convert a redundant representation of the result into a non-redundant format at the end of the pipeline, so it is not a problem for the partial result value to temporarily include some dummy bit values which are eliminated at a post-processing stage. By including the dummy bit values in the partial result value used for the divide operation, this allows the insertion of the next result digit to be at the same position for both operations improving the sharing of circuit logic for both operations.

The divide/square-root pipeline as discussed above can be used for a digit-recurrence divide or square root operation with any radix.

However, using a divide/square-root pipeline can be particularly useful for a radix-64 digit-recurrence divide or square root operation because the extra number of bits of the result generated per cycle in radix-64 operations compared to a lower radix helps to reduce the total number of pipeline stages needed in the pipeline, so that the pipeline can become competitive in terms of circuit area when compared with iterative implementations.

In one example, each divide/square-root iteration pipeline stage is configured to perform a respective radix-r iteration of a radix-r digit-recurrence divide or square root operation by performing a plurality of radix-n sub-iterations in a same processing cycle, where n<r. By splitting a higher radix iteration into multiple sub-iterations of lower radix this reduces the amount of circuitry in each pipeline stage so that the overall circuit area of the pipeline as a whole can be competitive with current iterative implementations while improving performance. In one particular example r=64 and n=8, although more generally radix-r iterations can be split into different combinations of lower radix sub-iterations as discussed earlier for the square root processing circuitry example.

On-the-Fly Conversion

A data processing apparatus to convert a plurality of signed digits representing an input value in redundant representation, the data processing apparatus comprising: receiver circuitry to receive, at each of a plurality of iterations, a signed digit from the plurality of signed digits, and previous intermediate data from a previous iteration; concatenation circuitry to perform a concatenation of bits corresponding to the signed digit and bits of the previous intermediate data to produce updated intermediate data; and output circuitry to provide the updated intermediate data as previous intermediate data of a next iteration, wherein the previous intermediate data comprises S3[i] in non-redundant representation, which is at least part of the input value multiplied by 3 in non-redundant representation.

In these examples, the individual digits are signed. The input value (which could be positive or negative) is therefore made up of individual digits, each of which is individually signed. In this way, a first digit of the input value could be positive and a second digit of the input value could be negative, for instance. This can be used to provide a form of representation known as redundant representation in which a pair of words are used to represent the input value. This is in contrast to non-redundant representation where the number is representing using a single word. Non-redundant representation and redundant representation are each best suited to particular types of operation and so conversion between the different forms of representation can be useful. The conversion is performed on-the-fly as each digit of the input value is received thereby avoiding a large latency that can be experienced if all the digits are converted at once after having all been received. The conversion process is achieved using concatenation of bits, which can be performed quickly. The bits that are concatenated are derived from the signed digit. A set of intermediate data is maintained between iterations and updated at each iteration. The concatenation that is performed depends on the current digit that has been newly received. In particular, the intermediate data includes S3[i] which is S[i] (the partial result) multiplied by three. The value of S3[i] is achieved without simply multiplying S[i] by three, which would be too time consuming to keep up with the arrival of new signed digits, not to mention energy intensive. Note that although the term 'iteration' is used here, the iterations being referred to could be the previously mentioned 'sub-iterations'.

In some examples, the previous intermediate data comprises S3[i−1]. In these examples, S3[i−1], which is the value of S3 from a previous iteration, is also maintained in the intermediate data. This value need not be calculated and can be carried over from the previous iteration. Providing such data makes it possible to make adjustments for when carries are performed during the conversion process.

In some examples, the previous intermediate data comprises S3M[i], which is the at least part of the input value multiplied by three and minus one in non-redundant representation. In other words, S3M[i]=(S[i]×3)−1. The value of SM3[i] is equivalent to the value of S3[i] minus one.

In some examples, the previous intermediate data comprises S3M[i−1]. In these examples, the value of S3M from a previous iteration is also maintained in the intermediate data. This value need not be calculated and can be carried over from the previous iteration. Providing such data makes it possible to make adjustments for when carries are performed during the conversion process.

In some examples, the concatenation performed by the concatenation circuitry comprises concatenations on each of S3[i], and S3M[i] to produce the updated intermediate data comprising S3[i+1], and S3M[i+1]. Each of the four values therefore has a concatenation performed, each iteration (or sub-iteration). The concatenation may be different for each of the four values.

In some examples, the bits corresponding to the unsigned digit are concatenated to one of S3[i] and S3M[i] to produce S3[i+1] and the other of S3[i] and S3M[i] to produce S3M[i]; and the one of S3[i] and S3M[i] is determined based on whether the unsigned digit is greater than 0 or less than 0. In these examples, whether the unsigned digit is greater than zero, zero, or less than zero affects whether S3[i] or S3M[i] are used to produce S3[i+1], with the other of S3[i] and S3M[i] being used to produce S3M[i+1].

In some examples, the data processing apparatus comprises adjustment circuitry configured to perform a selective adjustment on at least one of S3[i] and S3M[i] prior to the concatenation, based on a magnitude of the signed digit and on whether the signed digit is positive or negative. The selective adjustment can, for instance, be used to achieve carries between columns of the output value.

In some examples, the selective adjustment is performed when the magnitude of the signed digit multiplied by three exceeds a radix in which the signed digits are represented. The selective adjustment can be used to handle the situation in which the digit to be concatenated multiplied by three is greater than the radix being used for the conversion and thus, it is necessary to increment or decrement digits in other positions. By analogy to base 10, for instance, if one has the partial result S[i]=512 and it is desirable to add a digit to this number (a number of thousands) of 6 then this can be done to achieve the number S[i+1]=6512. However, if we are maintaining S3[i]=1536 and is desirable to add a digit to this number (a number of thousands) of 6 then it is necessary to add 3*6=18. However, this cannot be done by modifying a single position because the radix is 10 and 18 is greater than 10. Instead, we add 8 to the number of thousands to give 9536 and we then carry '1' as a number of ten thousands to give 19536.

In some examples, the data processing apparatus is configured to convert the plurality of signed digits representing the input value in redundant representation without the use of addition circuitry. In particular, the value of S3M[i] is not simply derived by taking S3[i] and subtracting one (e.g. using addition circuitry). By instead calculating these values using concatenation over i iterations (and concatenating different numbers for each of S3[i] and SM3[i]), it is possible to determine these numbers with a lower latency than is achieved by the using of addition circuitry to perform a subtraction of 1.

In some examples, the data processing apparatus comprises digit recurrence circuitry to perform a digit recurrence operation to produce the plurality of signed digits, wherein in each of the plurality of iterations, one of the plurality of signed digits is provided to the receiver circuitry. Digit recurrence circuitry can be used to provide the series of digits that make up the input value, with a subset of the digits being provided at iteration (or sub-iteration), e.g. each clock cycle.

In some examples, the digit recurrence circuitry is configured to operate in a square-root mode of operation in which the digit recurrence operation is a square-root operation. The digit recurrence algorithm for calculating square roots performs a multiplication of the partial root S—the multiplication depending on the digit being added. Since the partial root S changes at each iteration, this multiplication is performed every iteration. Multiplying by 0 always results in 0. Multiplying by 1 is simply the identity function. Meanwhile, multiplying by a power of two (2 or 4 for instance) can be achieved by performing bit shifts. Multiplying by −1, −2, and −4 can be similarly achieved by negating the result of multiplying by 1, 2, and 4 respectively. However, multiplication by 3 is significantly more complicated. Multiplication circuitry that performs an actual multiplication by 3 might take several processor cycles that would be too slow. Even an addition of X and 2× to determine 3× would require addition circuitry, which would also likely take too long to perform. Therefore, by maintaining a value of S3, which is achieved via concatenation, it is possible to perform square root digit recurrence efficiently.

In some examples, the digit recurrence circuitry is configured to operate in a division mode of operation in which the digit recurrence operation is a division operation; and the previous intermediate data comprises S[i], which is the at least part of the input value in non-redundant representation and SM[i], which is the at least part of the input value minus one in non-redundant representation, wherein after the plurality of iterations, the output circuitry is further configured to output S[i]. The same data processing apparatus that performs a conversion from the input value to the output value can therefore be used in both square-root operations and division operations. The calculation can also include the generation of S[i], which is the at least part of the input value converted into non-redundant representation, as well as SM[i], which is that value minus one.

In some examples, the concatenation circuitry is configured, in the division mode of operation, to suppress the generation of S3[i]. As previously explained, the value of S3 (and by extension, S3M) has particular relevance when performing square root digit recurrence. When performing digit recurrence division, multiplication of the partial root need not be performed for each iteration and therefore the generation of S3 and S3M need not take place. Power consumption can therefore be reduced by suppressing the generation of S3 and S3M in the division mode of operation.

In some examples, the digit recurrence operation has a radix of at least 8. For a radix of at least 8, the available digits include at least one if not both of +3 and −3. Consequently, during the square root digit recurrence algorithm, it may be necessary to multiply the partial root by either 3 or −3 depending on the most recent digit. As previously explained, multiplication by 3 can be time consuming and so by maintaining S3 and S3M via concatenation, it is possible to efficiently perform square root digit recurrence for a radix of 8 while meeting the timing constraints of the circuitry.

In some examples, possible values of the signed digit include at least one of: +3 and −3. As previously explained, the use of suck signed digits can necessitate multiplications by 3, which are more difficult to perform than multiplications involving powers of two.

Selection Constants

In some examples, there is provided a data processing apparatus to perform a digit-recurrence operation on an input value, comprising: receiver circuitry configured to receive a remainder value of a previous iteration of the digit-recurrence operation; and comparison circuitry configured to perform comparisons on most significant bits of the remainder value of the previous iteration of the digit-recurrence operation with each of a plurality of selection constants associated with available digits of a next digit of a result of the digit-recurrence operation, and to output the next digit of the result of the digit-recurrence operation based on the comparisons, wherein each of the selection constants is associated with one of the available digits and an input parameter; and storage circuitry configured to store a subset of the selection constants, the subset of the selection constants excluding an excluded selection constant from the selection constants, which is associated with an excluded digit from the available digits.

During the digit recurrence process, a comparison is performed between most significant bits of the remainder value of the previous iteration with a number of selection constants in order to determine the next digit of the digit recurrence operation, i.e. the next digit to be output. The number of selection constants corresponds with the product of the number of possible values of the most significant bits of the remainder value and the number of possible values that an output digit can have. For instance, if the six most significant bits of the remainder value are considered and there are eight possible values for each output digit then the selection constants table holds 8×32=256 values. Each value might also occupy several bits. In addition, it is usually necessary to provide multiple tables in order to handle both square root digit recurrence and division digit recurrence. The number of values to be stored is therefore large. In the above examples, at least some of the selection constants that would be required are not stored. That is, for the range of digit recurrence operations that are supported (based on the radix and the number of most significant bits considered) at least some of the selection constants that are required for the digit selection process are not stored anywhere in the data processing apparatus. Consequently, the amount of storage space required can be reduced. This leads to smaller, lower power circuitry.

In some examples, the data processing apparatus comprises conversion circuitry configured to generate the excluded selection constant from the selection constants stored in the storage circuitry. In these examples, the missing or omitted selection constants that are not stored in the data processing apparatus are instead inferred or generated from other selection constants that are stored in the data processing apparatus.

In some examples, the conversion circuitry is configured to generate the excluded selection constant by performing a selective inversion on a sign of one of the selection constants stored in the storage circuitry. In these examples, some of the omitted selection constants can be generated by taking another selection constant and inverting its sign. Inverting the sign of a number (e.g. by taking the twos complement) can be perform efficiently and so need not impact the time taken to perform the selection operation.

In some examples, the one of the selection constants is associated with a same input parameter and a different one of the available digits as the excluded selection constant. Two columns of a selection constant table can therefore be 'merged'. That is, for a given set of most significant bits of the remainder value, the selection constants for two different digits are the same (with the sign being varied according to which of the digits the selection constant is generated for). For instance, the selection constant for the remainder bits 0.100010 might be '2' for the possible output digits +4 and −3. However, for the digit +4, the selection constant might be negative (−2) and for the digit −3, the selection constant might be negative (+2). These two columns can therefore be merged into one, with rules as to whether the constant is positive or negative.

In some examples, the storage circuitry is configured to store, for the selection constants, an exception flag to indicate whether the selective inversion is to take place to generate the excluded selection constant. In these examples, whether or not the inversion is performed depends on a value of the exception flag. The inversion might also depend on other factors—e.g. depending on the digit for which the selection constant is being generated. For example, considering the previous example for the remainder bits 0.100010, the selection constant might be positive (+2) for one digit (+4) and negative (−2) for another digit (−3). However, the exception flag might override this (causing both digits to have the same selection constant) or might even invert it (−2 for the digit +4 and +2 for the digit +3).

In some examples, the digit-recurrence operation is a square-root digit-recurrence operation; and the input parameter is a partial root.

In some examples, the digit-recurrence operation is a division digit-recurrence operation; and the input parameter is a divisor.

In some examples, in a division-mode of operation, the digit-recurrence operation is a division digit-recurrence operation and the input parameter is a divisor; and in a square-root-mode of operation, the digit-recurrence operation is a square-root digit-recurrence operation and the input parameter is a partial root. Thus, in these examples, it is possible to use the apparatus to perform both division digit recurrence and square root digit recurrence depending on the mode of operation.

In some examples, in a division-mode of operation, the digit-recurrence operation is a division digit-recurrence operation and the input parameter is a divisor; in a square-root-mode of operation, the digit-recurrence operation is a square-root digit-recurrence operation and the input parameter is a partial root; and each of the selection constants are division digit-recurrence operation selection constants or each of the selection constants are square root digit digit-recurrence operation selection constants. Although such data processing apparatus' are capable of performing both division and square root digit recurrence, the selection constants that are stored are specific to one of these two modes of operation (division or square root). By storing selection constants that are specific to only one of the two modes of operation, it is possible to reduce the storage requirements of the data processing apparatus.

In some examples, each of the selection constants are division digit-recurrence operation selection constants. This is not to say that all of the selection constants for division digit recurrence are stored—merely that those constants that are stored are the division digit recurrence selection constants that may be used as part of a process for generating the square root digit recurrence selection constants.

In some examples, the conversion circuitry is configured to generate the excluded selection constant in the division-mode of operation by performing a selective inversion of a sign of one of the division digit-recurrence operation selection constants. That is, one of the division digit-recurrence constants is used and is inverted based on some criteria (e.g. the value of the digit for which the constant is associated).

In some examples, the conversion circuitry is configured to generate the excluded selection constant in the square-root-mode of operation by referencing one of the division digit-recurrence operation selection constants.

In some examples, the storage circuitry is configured to store a plurality of mappings between the excluded selection constant in the square-root mode of operation and the one of the division digit-recurrence operation selection constants.

The mapping is used to indicate which of the division digit-recurrence operation selection constants is to be used as a basis for creating the square-root digit-recurrence operation selection constant and/or how to modify one of the division digit-recurrence operation selection constants in order to generate a corresponding square-root digit-recurrence operation selection constant.

In some examples, the storage circuitry is configured to store, for the selection constants, an exception flag to indicate whether the selective inversion is to take place to generate the excluded selection constant. The exception flag could be part of a set of flags (or stored as part of a larger value) that indicates the circumstances under which the inversion occurs in order to generate the excluded selection constant.

In some examples, the digit-recurrence operation is in radix-8. For example, the digits available might be limited to {−4, −3, −2, −1, 0, 1, 2, 3, 4}.

Data Processing Apparatus Example

FIG. 1 illustrates an example of a data processing apparatus 2, e.g. a processor, which supports execution of instructions defined according to a particular instruction set architecture (ISA). The apparatus has instruction fetch circuitry 4 for fetching program instructions defined according to the architecture from an instruction cache or memory (not shown in FIG. 1). The fetched instructions are decoded by decode circuitry 6 to identify the operations to be performed. In response to a given instruction, the decode circuitry 6 generates control signals which control execution units 8 to perform the processing operations represented by that instruction. Operands for a given processing operation may be read from registers 10 and the results of processing the operation may be written back to the registers 10. The execution units 8 may include various types of execution unit including arithmetic units such as an adder 20, a multiplier 22 and a divide/square root unit 24. The execution units could also include other types of functional units such as a branch unit 26 for determining the outcome of branch instructions which may trigger a non-sequential change of program flow within the program being executed, and a load/store unit 28 for executing load instructions to load data from the cache or memory to registers 10 or executing store instructions to store data from the registers 10 to the cache or memory.

The subsequent examples illustrate circuit logic designs for the divide/square root execution unit 24 of the processing apparatus 2. When a divide instruction is decoded by decode stage 6, the decode stage 6 controls the divide/square root execution unit 24 to perform a divide operation according to a digit-recurrence method. When a square root instruction is decoded by the decode stage 6, the decode stage 6 controls the divide/square root execution unit 24 to perform a square root operation according to a digit-recurrence method.

While the subsequent examples focus on the divide/square root execution unit 24, it will be appreciated that the rest of the processing apparatus 2 may be built according to any known processor design techniques. It will be appreciated that FIG. 1 is a simplified representation of the components of a data processor, and in practice many other components may also be provided not shown in FIG. 1.

Theoretical Foundation of Digit-Recurrence Division and Square Root

Digit-recurrence is a class of iterative algorithms which compute a radix-r result digit $p_{i+1}$ and a remainder rem[i] every iteration. The remainder is used to obtain the next radix-r digit. The radix r is a power of 2 and each radix-r digit represents $\log_2(r)$ bits of the results. A digit-recurrence algorithm can be used for the calculation of division (x/d), and square root ($\sqrt{x}$).

The partial result before iteration i is defined as:

$$P[i] = \sum_{j=0}^{i} p_j \times r^{-j} \tag{1}$$

where digits can take values $p_i\Sigma\{-r/2, \ldots, -1, 0, +1, +r/2\}$. Each iteration is described by the following equations, $$p_{i+1} = SEL(\widehat{rem}[i], \hat{T}[i]) \tag{2}$$

$$rem[i+1] = r \times rem[i] - p_{i+1} \times F[i+1] \tag{3}$$

where $\widehat{rem}$[i] is an estimation of a few bits of the remainder rem[i] and $\hat{T}$[i] is an estimate of a few bits of the divisor d (in case of division) or the partial result S[i], respectively (S[i] being the partial result P[i] for the specific case of a square root operation). The number of bits in the estimation needed for the selection function SEL depends on the radix and the operation. Term F[i+1] is different for each operation, $$F[i+1] = \begin{cases} d & \text{if division} \\ 2 \times P[i] + p_{i+1} \times r^{-(i+1)} & \text{if square root} \end{cases} \tag{4}$$

For a fast iteration, the remainder is kept in carry-save or signed digit redundant representation. In implementations described below, a known approach is used for representing the remainder using a carry-save-like representation, where the remainder is represented with a positive word and a negative word (a non-redundant binary value corresponding to the remainder can then be obtained by subtracting the negative word from the positive word).

On the other hand, because of the algorithm convergence conditions and the multiplication times r in equation (3), the remainder will have several bits in the integer part; the number of integer bits depends on the radix, the digit set, and the operation.

Then, every iteration a radix-r digit of the result is obtained from the current remainder, and a new remainder is computed for the next iteration and the partial result is updated.

The selection function for selecting the next result digit comprises the comparison of the remainder estimate $\widehat{rem}$[i] with a set of r$\hat{T}$[i]-dependent selection constants, one constant per digit value. So, $$p_{i+1} = k \Leftrightarrow ct(k) \le \widehat{rem}[i] < ct(k+1) \tag{5}$$

where ct(k) and ct(k+1) are the selection constants for digit values k and k+1, respectively, with kΣ{−(r/2)+1, . . . , −1, 0, +1, . . . , +r/2}. It is not necessary to keep a selection constant for digit value k=−r/2 as it may be determined that the digit to be selected is k=−r/2 when $\widehat{rem}$[i]<ct(−(r/2)+1). The number of bits of rem[i] and T[i] needed for the estimations depends on the radix and the operation: the larger the radix, the larger the number of bits of the estimation.

The partial result is in radix-r signed-digit redundant representation and it is produced most-significant digit first (MSDF). It is converted to a non-redundant representation every iteration. The most efficient conversion technique is the well-known on-the-fly conversion. Basically, the on-the-fly conversion adds the digit $p_{i+1}$ to the partial result P[i] (see equation (1)); however, as the digit can be negative this addition can produce a carry propagation. To prevent this slow carry propagation another form of the result is kept, PM[i] with value, $$PM[i] = P[i] - r^{-i} \quad (6)$$

Using this second form the conversion algorithm in terms of concatenation is $$P[i+1] = \begin{cases} (P[i],\ p_{i+1}) & \text{if } p_{i+1} \ge 0 \\ (PM[i],\ r - |p_{i+1}|) & \text{if } p_{i+1} < 0 \end{cases} \quad (7)$$

$$PM[i+1] = \begin{cases} (P[i],\ p_{i+1} - 1) & \text{if } p_{i+1} > 0 \\ (PM[i],\ ((r-1) - |p_{i+1}|)) & \text{if } p_{i+1} \le 0 \end{cases} \quad (8)$$

This way, there are no arithmetic operation involved in the conversion, just a concatenation of a value to P[i] and PM[i], where the value being concatenated depends on the selected digit $p_{i+1}$.

The number of iterations of the digit-recurrence algorithm is $$it = \lceil n/\log_2(r) \rceil \quad (9)$$

n being the number of bits of the result, including the bits required for rounding. $\lceil \ldots \rceil$ represents the ceiling function so that $\lceil n/\log_2(r) \rceil$ is the smallest integer greater than or equal to $n/\log_2(r)$.

The number of cycles is directly related to the number of iterations and to the number of iterations performed per cycle. Then, considering m iterations per cycle, the number of cycles is $$\text{cycles} = \lceil it/m \rceil \quad (10)$$

Equations (1) to (10) can be particularized to any radix. In the next two sections these equations are particularized for r=8, and for division and square root. The higher radix r=64 is obtained by overlapping two radix-8 sub-iterations; then the sub-iteration radix is 8.

Radix-8 Division

The floating-point division of a dividend x and a divisor d produces a quotient q=x/d. For radix-8, the partial quotient (partial result) before iteration i and the digit obtained at iteration i are called Q[i] and $q_{i+1}$ respectively, then equation (1) can be rewritten as $$Q[i] = \sum_{j=1}^{i} q_j \times 8^{-j} \quad (11)$$

The digit calculation and the remainder update, taking into account that T[i]=d, are, $$q_{i+1} = SEL(\widehat{rem}(i),\ \hat{d}) \quad (12)$$

$$rem[i+1] = 8 \times rem[i] - q_{i+1} \times d \quad (13)$$

Note that F[i+1]=d, and the initial value for the remainder is rem[0]=x/8.

As for the selection function, it has been found that only the 10 most-significant bits of the remainder need to be assimilated to get a remainder estimation accurate enough for digit selection. As said before, the selection constants depend on the divisor as well. The 6 most-significant bits of the divisor are used to pick out the set of 8 selection constants for all the iterations of the current division. Different divisor values can pick out different sets. Note that the most-significant bit of the divisor is always 1, because the operands are normalized before selecting the constants. The selection constants are stored in a look-up table (LUT).

For this implementation, it has been determined that only the 10 most-significant bits (MSB) of the remainder, three integer bits and seven fractional bits, are required to select the next quotient digit with equation (12).

Radix-8 Square Root

The floating-point square root of the operand x produces a root $s=\sqrt{x}$. The partial root before iteration i and the digit obtained at iteration i are called S[i] and $s_{i+1}$ respectively (these correspond to P[i] and $p_{i+1}$ respectively in the general equations shown earlier), then for radix-8 equation (1) can be rewritten as $$S[i] = \sum_{j=0}^{i} s_j \times 8^{-j} \quad s_0 = 1 \quad (14)$$

The square root iteration is defined by equations $$s_{i+1} = SEL(\widehat{rem}[i],\ \hat{S}[i]) \quad [15]$$

$$rem[i+1] = 8 \times rem[i] - s_{i+1} \times (2 \times S[i] + s_{i+1} \times 8^{-(i+1)}) \text{ with} \quad (16)$$

$$d[i+1] = F[i+1] = 2 \times S[i] + s_{i+1} \times 8^{-(i+1)} \text{ then} \quad (17)$$

$$rem[i+1] = 8 \times rem[i] - s_{i+1} \times F[i+1] \quad (18)$$

(the notation d[i+1] is used in some instances below—this is the same value as F[i+1]).

The initial values for remainder and partial root are rem[0]=x−1 and S[0]=1.0, respectively.

The selection function comprises the comparison of the remainder estimate with a set of 8 partial-root-dependent selection constants, one constant per digit value. So, $$s_{i+1} = k \Leftrightarrow cte(k) \le \widehat{rem}[i] < cte(k+1) \quad (19)$$

cte(k) and cte(k+1) being the selection constants for digit values k and k+1, respectively, with kΣ{−3, −2, −1, 0, +1, +2, +3, +4}. Note that it is not necessary to keep a selection constant for digit value −4. It has been found that only the 11 most-significant bits of the remainder need to be assimilated to get a remainder estimation accurate enough for digit selection.

The selection constants depend on the partial root. The 7 most-significant bits of the partial root are used to pick out the set of 8 11-bit selection constants. Different partial-root values can pick different sets out. The partial root is in interval [0.5, 1]; note that the value S[i]=1 is possible until a non-zero digit is produced. Therefore taking into account that partial root has 1 integer bit (which is zero after the first non-zero and negative digit is produced) and 6 fractional bits, and that the minimum value of the partial root is 0.5, the selection constants can be stored in a 33×88-bit look-up table (LUT), with 32 entries for S[i]Σ[0.5, 1) and 1 entry for S[i]=1 (although as discussed below in some approaches an offset LUT can be used to reduce the size of the storage for square root comparison constants).

Naïve Implementation of Radix-64 Square Root With Two Radix-8 Iterations

Figure 2:
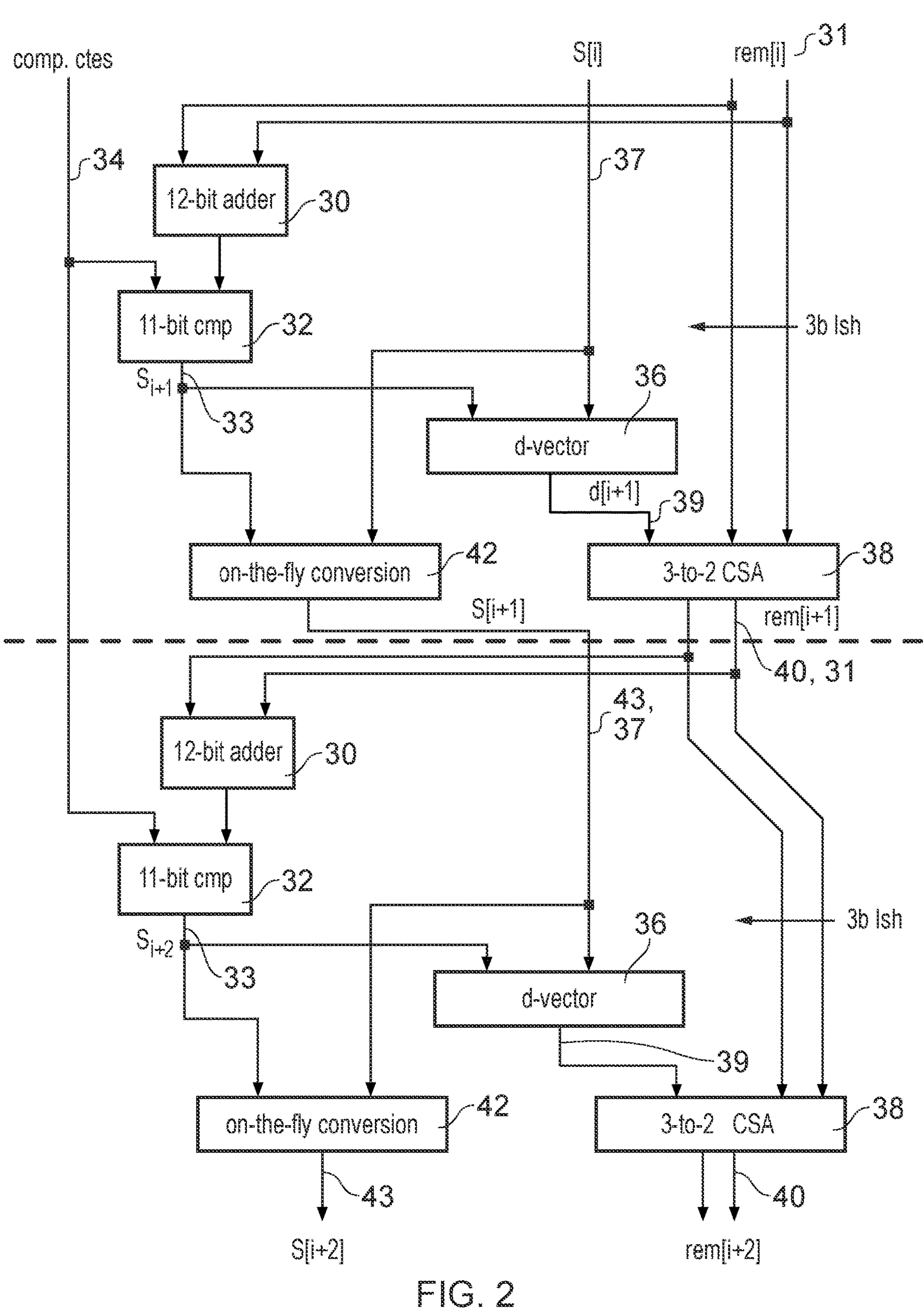

Every radix-8 iteration produces 3 bits of the result; then, two radix-8 iterations can be overlapped to obtain 6 result bits per cycle, which is equivalent to a radix-64 square root. The naive implementation is shown in FIG. 2. Two identical radix-8 sub-iterations are connected to get the radix-64 iteration. Note that only the most significant bits of the remainder are used to select the quotient digit; the 11-bit remainder estimate $\widetilde{rem}$[i] is obtained in 12-bit adder 30 and least significant bits of the remainder can be discarded for the purpose of generating the remainder estimate. Once the root digit has been obtained, the next remainder is calculated with equation (18) and the digit is concatenated to the actual partial root to get the next partial root.

Hence, in each sub-iteration:

- a carry-propagate adder 30 receives the remainder value rem[i] 31 generated in a previous sub-iteration, which is represented in a redundant representation. The carry-save adder 30 generates a non-redundant remainder estimate of a portion of most significant bits of the remainder value 31, by performing a carry-propagate addition of the upper bits of the two words of the remainder value 31 (e.g. if the representation with positive and negative words described above is used, the negative word is subtracted from the positive word).
- digit selection comparators 32 compare the remainder estimate with each of a set of comparison constants 34 to determine the next root digit 33.
- remainder adjustment value generation circuitry 36 generates a remainder adjustment value 39 which corresponds to the "d-vector" or d[i+1] term shown in equation 17 above. Hence, for the square-root operation the remainder adjustment value depends on the partial root value 37 received from the previous sub-iteration and on the next root digit 33 selected by digit selection comparators 32. It is noted that the term "d-vector" is used as a label for the d[i+1] term simply because the number of bits in the value is commensurate with a number of bits used for a vector operand in some implementations, but this term is not intended to imply that the "d-vector" is a single instruction multiple data (SIMD) vector operand comprising multiple independent data elements—the "d-vector" is a single data value rather than a vector of multiple independent data values.
- remainder update circuitry 38 (comprising a 3:2 carry-save adder) updates the previous remainder 31 received from the previous sub-iteration based on the remainder adjustment value 39, by adding the positive and negative words of the previous remainder 31 and the remainder adjustment value 39, to generate an updated remainder 40 (still in redundant representation) which is supplied to the next sub-iteration to become the previous remainder 31 for that sub-iteration. On the path between outputting the updated remainder 40 in one sub-iteration and inputting the previous remainder 31 to the carry-save adder in the remainder update circuitry 38 of the next sub-iteration, a 3-bit left shift is applied to represent the 8×rem[i] term of equation 18 above.
- on-the-fly conversion circuitry 42 inserts a value determined based on the selected root digit 33 into the partial root value 37 to generate an updated partial root value 43 which is output to become the partial root value 37 in a subsequent sub-iteration. The on-the-fly conversion can be done according to equations 6 to 8 above. Hence, although not shown in FIG. 2 for conciseness, the partial root value may be represented as two separate forms, P and PM, as explained earlier, to simplify the on-the-fly conversion which can then be done as a concatenation.

The updated remainder 40 and updated partial root value 43 from one sub-iteration become the previous remainder 31 and partial root value 37 for the next sub-iteration. Similarly, the updated remainder 40 and updated partial root value 43 from a final sub-iteration in one iteration become the previous remainder 31 and partial root value 37 for the first sub-iteration in the next iteration.

However, this naive implementation is too slow. To speed up the cycle several techniques, explained in the next section, have been used.

Radix-64 Square Root Iteration

Figure 3:
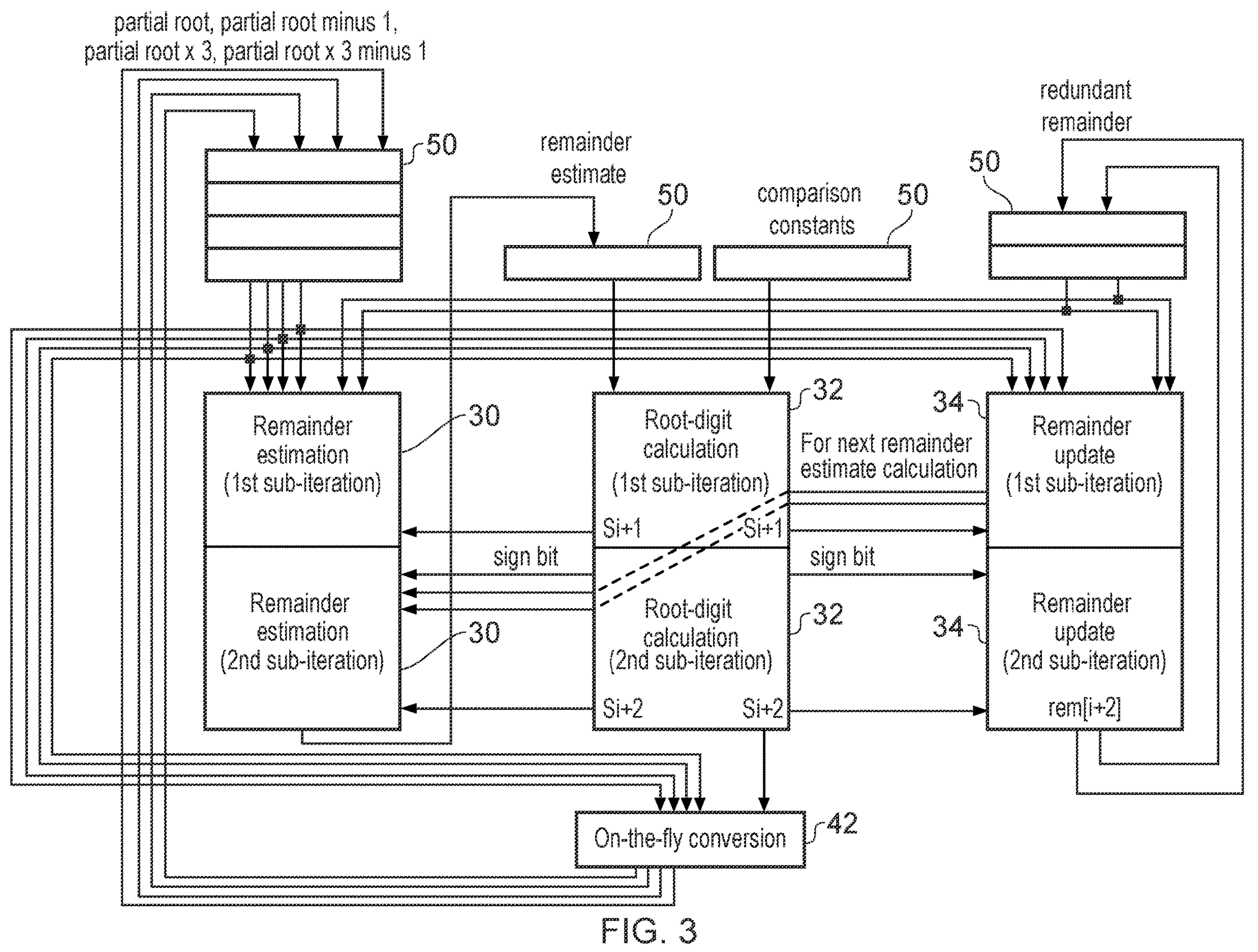
FIG. 3 illustrates circuitry for performing a given radix-r iteration of a square root operation.

FIG. 3 shows square root processing circuitry for implementing a digit iteration cycle, which corresponds to a single radix-64 square root iteration. In this example, the square root processing circuitry is an iterative unit where the outputs of one iteration are fed back as inputs to the same unit in a subsequent iteration, with flip-flops 50 latching the values passed from cycle to cycle. However, as discussed further below with respect to FIG. 9, the square root processing circuitry could also be used in a pipelined implementation.

The square root processing circuitry includes several parts: (1) remainder update circuitry 34, (2) digit selection circuitry (root-digit calculation) 32, (3) remainder estimate circuitry 30. The connections between these parts are also shown. In the following, each of these parts are explained in detail. The square root processing circuitry also includes on-the-fly conversion circuitry 42 which is discussed in more detail later. The on-the-fly partial root conversion keep two partial root forms, S[i] and SM[i], being SM[i] the partial root S[i] minus 1, $$SM[i] = S[i] - 8^{-i} \tag{20}$$

These two forms are used in several parts of the radix-64 iteration. In addition, $$S3[i] = 3 \times S[i]$$

$$S3M[i] = S3[i] - 8^{-i}$$

are also required for the on-the-fly partial root conversion, as will be discussed in more detail below with respect to FIGS. 13-16. The use of S3[i] and S3M[i] simplifies handling of multiplying by ±3 root digits.

As shown in FIG. 3, as the radix-64 iteration is split into two radix-8 sub-iterations, there are two instances of each of the remainder estimate circuitry 30, digit selection circuitry 32 and remainder update circuitry 34, corresponding to respective radix-8 sub-iterations, although as discussed further below there can be some overlap between the circuitry used for the respective sub-iterations. There can also be two instances of on-the-fly conversion circuitry 42 for performing on-the-fly conversion using the radix-8 root digit obtained in each radix-8 sub-iteration, although for conciseness in FIG. 3 this is shown as a single block.

Remainder Update

Figure 4:
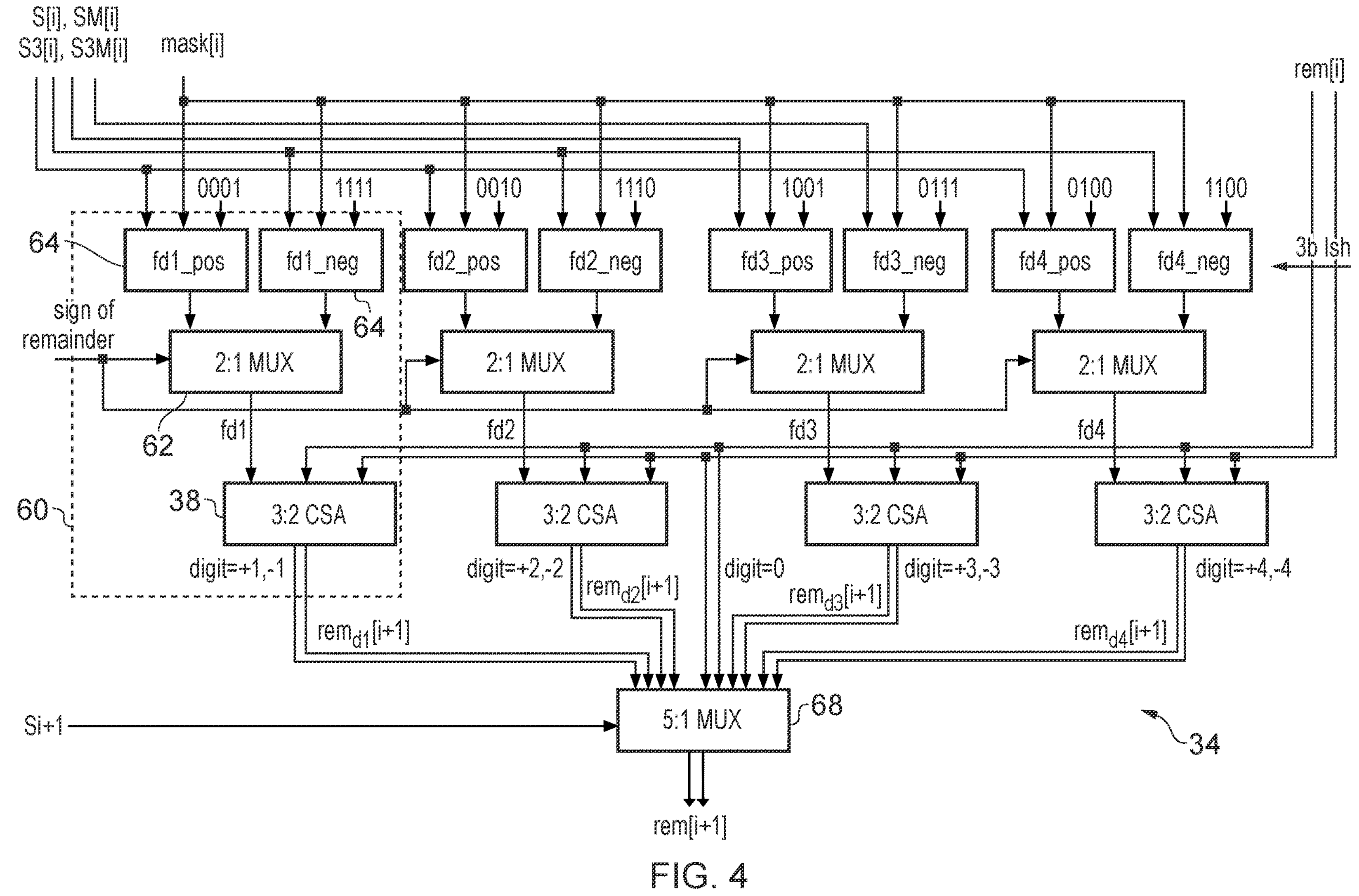
FIG. 4 illustrates remainder update circuitry.

FIG. 4 shows the remainder update circuitry 30 in more detail, for performing the remainder update in a single radix-8 sub-iteration (which could be either the first or second radix-8 sub-iteration within the radix-64 iteration). The remainder update for each iteration in the cycle (see equation 16) is done speculatively. That is, the updated remainder value rem[i+1] for every possible value of the root digit is calculated, and once the root digit $s_{i+1}$ is known the correct remainder is selected. Hence, the remainder update circuitry 30 has a number of replicated circuit units 60 which each produce a respective candidate output value for the updated remainder, corresponding to a different option for the next root digit $s_{i+1}$. There is no replicated circuit unit 60 provided for $s_{i+1}=0$ because in that case equation 18 above means that the updated remainder rem [i+1] can be obtained directly from the previous remainder value rem[i] without an addition. The sign of the previous remainder estimate is used to reduce the number of speculative remainders. If the remainder estimation is positive then the root digit can only be {+4, +3, +2, +1, 0}. On the other hand, if the remainder estimation is negative the root digit can only be {−4, −3, −2, −1, 0}.

Hence, each replicated circuit unit 60 has a carry-save adder 38, and a selection multiplexer 62 to select, depending on the sign of the previous remainder estimate received from a previous sub-iteration or iteration, between alternative values calculated in logic blocks 64 for positive and negative root digits of equivalent magnitude. This reduces the number of replicated units needed (4 replicated circuit units 60 now being enough corresponding to digits ±1, ±2, ±3, ±4 respectively instead of needing 8 to handle each positive/negative digit separately).

The replicated circuit units 60 compose vector d[i+1] (called F[i+1] sometimes) for all the root digit values other than 0, both positive and negative values:

$$d[i+1] = \begin{cases} 2 \times S[i] + s_{i+1} \times 8^{-(i+1)} & \text{if } s_{i+1} \geq 0 \\ 2 \times SM[i] + (2 \times 8 - |s_{i+1}|) \times 8^{-(i+1)} & \text{if } s_{i+1} < 0 \end{cases} \quad (21)$$

Note that while equation 21 shows an addition, this can in fact be implemented as a concatenation between 2*S[i] or 2*SM[i] and a pattern of bits 0001, 1111, 0010, 1110, 0100, 1100 as shown at the inputs to the logic 64 for forming the values of the remainder adjustment value needed for respective positive/negative digits of each magnitude 1, 2, 4.

Hence, in FIG. 4 the bits for the digit to be concatenated in the on-the-fly calculation of each possible d[i+1] vector is shown. The mask mask[i] signals the position where the root digit has to be concatenated (the mask being shifted by 3 bits between sub-iterations so that each successive radix-8 root digit is concatenated at a position 3 bits lower than the position at which the previous radix-8 root digit was inserted).

Blocks 64 labelled as fda_pos, and fda_neg, with x=1, 2, 3, 4, carry out the concatenation of 2*S[i] or 2*SM[i] with a value corresponding to a positive or negative digit with $|s_{i+1}=\alpha|$, respectively to represent the d-vector d[i+1] according to equation 21, and also evaluate $-\alpha \times d[i+1]$ (corresponding to the term $-s_{i+1} \times F[i+1]$ in equation 18 above), to produce d-vectors fd1, fd2, fd3, fd4.

Note that in the recurrence d[i+1] is multiplied by $s_{i+1}$. To prevent a 3× multiplication the case with $s_{i+1}=\pm 3$ is treated differently: 3×d[i+1] is built by block fd3_pos or fd3_neg directly using 3×S[i] as:

$$3 \times d[i+1] = 2 \times (3 \times S[i]) + (3 \times s_{i+1}) \times 8^{-(i+1)} \quad (22)$$

In this case we concatenate $|3 \times s_{i+1}|=9$ which needs 4 bits to be represented. This does not mean any problem because the 1-bit left-shift of 3×S[i] leaves room for the additional bit. Then, $$3 \times d[i+1] = \begin{cases} 2 \times S3[i] + 9 \times 8^{-(i+1)} & \text{if } s_{i+1} = +3 \\ 2 \times S3M[i] + 7 \times 8^{-(i+1)} & \text{if } s_{i+1} = -3 \end{cases} \quad (23)$$

Maintenance of S3[i] and S3M[i] is discussed further below with respect to FIGS. 14 and 15. For the $s_{i+1}=\pm 3$ candidate values, the bit pattern to concatenate is indicated as 1001 for $s_{i+1}=+3$ and 0111 for $s_{i+1}=-3$. Again, the mask signals the position at which to insert the concatenated bits.

The remainder estimate sign is used to select the positive or negative d[i+1] set before the 3-to-2 carry-save adders 38. This way, consequently, only 5 speculative remainders are computed instead of 9.

The inverse of the remainder estimation sign is placed in the least-significant bit of the speculative remainder carry word, so if the remainder estimation sign is 1, then the least significant bit of the speculative remainder carry word is 0 and if the remainder estimation sign is 0, then the least significant bit of the speculative remainder carry word is 1. This is because if the digit is positive (remainder estimate sign is 0) we need to subtract the term $s_{i+1} \times F[i+1]$, as shown in equation (18). The subtraction means we have to compute the 2's complement of $s_{i+1} \times F[i+1]$. The 2's complement is obtained by bit-complementing the term $s_{i+1} \times$ F[i+1] and adding 1. For example, the 2's complement of 11100010 is 00011101+1=00011110. Therefore, the term is bit-complemented in the fd1_pos, fd2_pos, fd3_pos and fd4_pos modules in FIG. 4, and the "+1" is added by changing the least-significant bit of the carry word, which by definition is 0, to 1. This way we don't need an additional adder to finish the calculation of 2's complement. If digit is negative (remainder estimate sign is 1) the operation in equation (18) is an addition, so we don't need to do the 2's complement, so the least-significant bit of the carry word is kept to 0. Hence, in summary, the inverse of the remainder estimate sign is placed in the least-significant bit of the carry word.

Among these speculative remainders provided by replicated circuit units 60, there is no equivalent to blocks fda_pos, and fda_neg for digit $s_{i+1}=0$, as it does not need additional hardware, just an additional input in the multiplexer 68 which acts as selection circuitry for selecting the correct candidate output value once the next root digit $s_{i+1}$ has been determined by the digit selection circuitry 32.

Each carry-save adder 38 performs a carry save addition of 3 terms: 2 terms being the positive word and negative words of the redundantly represented previous remainder rem[i], and the third term being the $-s_{i+1}\times F[i+1]$ term from equation (18) that is represented by fd1-fd4. The output of each carry-save adder 38 is a candidate value for selecting as the updated remainder rem[i+1], which is still in redundant representation and so comprises two terms, a positive and negative word. There is no carry-save adder 38 for the case of root digit=0 as in that case the candidate value is simply equal to 8*rem[i] and so no addition is required. A 5:1 multiplexer 68 acting as selecting circuitry selects between the candidate output values depending on the root digit $s_{i+1}$ selected by root digit selection circuitry 32, to provide the updated remainder rem[i+1].

Remainder Estimate

Figure 5:
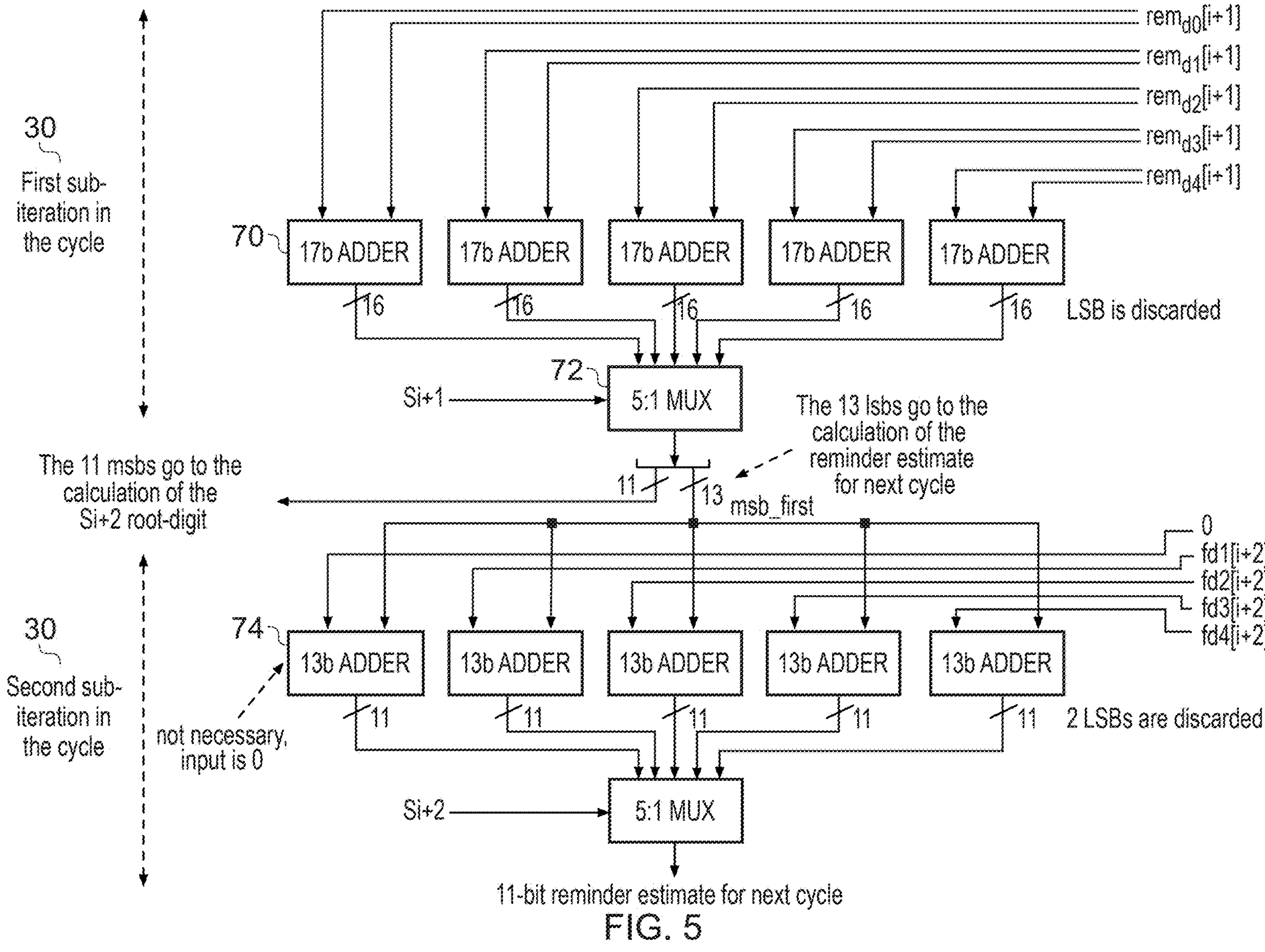
FIG. 5 illustrates remainder estimate circuitry.

FIG. 5 shows the remainder estimate circuitry 30 for the first and second sub-iterations. The remainder estimation is the early speculative calculation of the 11 most-significant bits of the remainder to be used in the root-digit selection. This allows to get a better timing because the remainder estimation is removed from the critical path going through the root-digit calculation.

Two different situations are shown:

1. Remainder estimation in the first sub-iteration, for producing the remainder estimate used for digit selection in the second sub-iteration in the cycle. This is done during the first iteration, based on the speculative remainders obtained by the remainder update circuitry 34 of the first sub-iteration as shown in FIG. 4. Thus, five carry-propagate adders 70 add the most-significant bits of the sum and carry words of the speculative remainders ($rem_{d4}$[i+1] to $rem_{d1}$[i+1], and rem[i]) obtained by the remainder update circuitry 34 of the first sub-iteration. When the root-digit $s_{i+1}$ is known the proper remainder estimate for root digit selection in the second sub-iteration in the cycle is selected by multiplexer 72. Hence, this is another instance of replicated circuitry including replicated circuit units 70 and selection circuitry 72.
2. Remainder estimation in the second sub-iteration, for producing the remainder estimate used for digit selection in the first sub-iteration of the next cycle (the value output by the remainder estimate circuitry 30 in the second iteration can be flopped in flip-flops 50 ready for use in the next cycle as shown in FIG. 3). The remainder estimate generated by the remainder estimate circuitry 30 in the second sub-iteration is the assimilation of the most-significant bits of 8×rem[i+2], which can be derived from rem[i] input as the previous remainder value in the first sub-iteration as follows (based on substituting rem[i+1] in the relation of rem [i+2] to rem[i+1] using equation 18 with another instance of equation 18 relating rem[i+1] to rem[i]):

$$\begin{aligned}8\times rem[i+2] &= 8\times(64\times rem[i]-8\times s_{i+1}\times d[i+1]-s_{i+1}\times d[i+2]) \quad (24)\\ &= 8\times 64\times rem[i]-8\times 8\times s_{i+1}\times d[i+1]-\\ &\quad 8\times s_{i+2}\times d[i+2]\end{aligned}$$

The is computed during the first and second iteration in the cycle as, $$\text{msb\_first} = 64\times(8\times \text{rem}[i]-s_{i+1}\times d[i+1]) \text{ and} \quad (25)$$

$$\text{msb\_rem}[i+2] = \text{msb\_first}-8\times s_{i+2}\times d[i+2] \quad (26)$$

where equation (25) is evaluated during the first sub-iteration and equation (26) in the second sub-iteration. Both equations are evaluated speculatively for the five remainder candidates.

Note that the difference between equations (18) and (25) is the 64× factor, which is a 6-bit left-shift. Then both equations can be evaluated in the same logic if a 17-bit adder is used instead of two 12-bit adders: the 11 most-significant bits are the remainder estimation computed in the first sub-iteration for use in digit selection in the second sub-iteration in the cycle and the 13 least-significant bits are used to complete the remainder estimation calculation during the second sub-iteration, to obtain the remainder estimate to be used for digit selection in the first sub-iteration of the next cycle in equation (26).

Hence, with this approach, the adders 70 in the first sub-iteration calculate some additional (least significant) bits which are not actually needed in the remainder estimate to be used for digit selection in the second sub-iteration, but by computing these additional bits, this enables the term msb_first shown above to be calculated in the first sub-iteration and reduces the overall circuit area compared to if a separate adder calculated these bits in the second sub-iteration.

The adders 74 in the remainder estimate circuitry for the second sub-iteration evaluate equation 26, which depends on msb_first and the d-vectors 0, fd1[i+2] to fd4[i+2], which correspond to term $8\times s_{i+2}\times d[i+2]$ in the equation with $s_{i+2}=0$, $s_{i+2}=\pm1$ to $s_{i+2}=\pm4$, respectively. These vectors are produced as part of the remainder update circuitry 34 in the second sub-iteration in the cycle (see fd1 to fd4 in FIG. 4). This approach means that there is no need to wait for the carry-save adders 38 in the remainder update circuitry 34 of the second sub-iteration to perform their additions before starting the additions by carry-propagate adders 74 in the remainder estimate circuitry 30 for the second sub-iteration. Instead, calculation of the updated remainder estimate in the second sub-iteration can be performed in parallel with the remainder update in the second sub-iteration, to remove latency from the critical timing path. This improves performance.

Root Digit Selection

Figure 6:
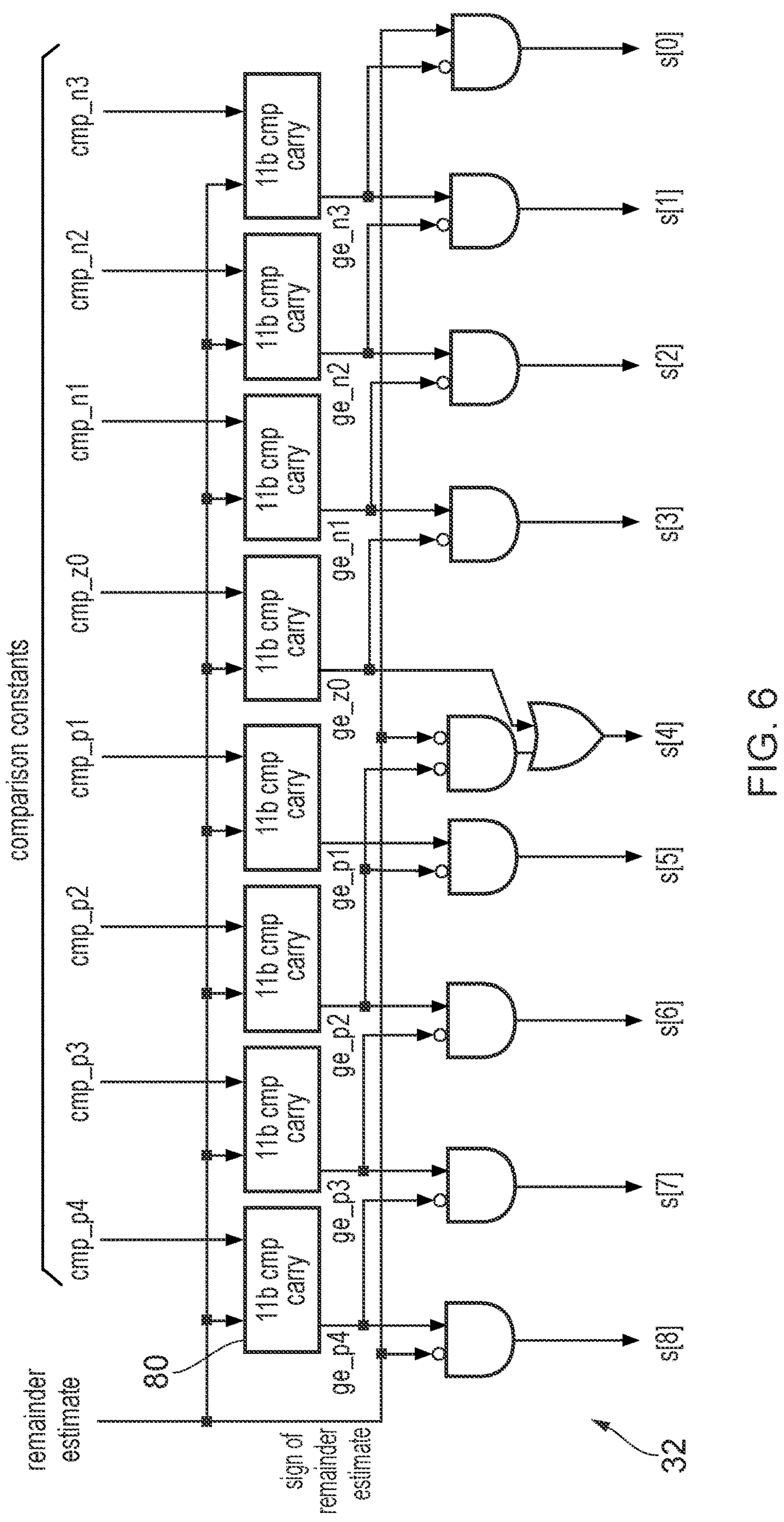
FIG. 6 illustrates digit selection circuitry.

FIG. 6 shows the root-digit calculation performed by digit selection circuitry 32 (which could be either the first or second radix-8 sub-iteration within the radix-64 iteration). The root-digit calculation has been outlined previously: the remainder estimate is compared with each of the 8 comparison constants, and the digit is selected according equation (19). The root-digit is stored as 1-hot 9-bit vector s[i], i=8, . . . , 0 with s[i]=1 if digit=i−4; for example if the root digit is −1 then s[3]=1 and the 9-bit vector is s={0,0,0,0,0, 1,0,0,0}.

This is shown in FIG. 6. There is a set of 11-bit comparators 80 to compare the remainder estimate with each comparison constant; the carry output of each comparator, ge-outputs, is set to 1 if the remainder estimate is larger of equal than the comparison constant. Then, the ge-ouputs and the sign of the remainder estimate are input to the a set of nand and or gates to produce each bit of the 1-hot 9-bit s vector.

The selection constants required for the root selection are derived from values stored in look-up table (LUT). The selection constants for each radix-8 iteration depend on the partial root value before that sub-iteration in such a way that each sub-iteration uses a different set of comparison constants. However, it has been derived that the same of set of selection constants can be used for every sub-iteration except the first two sub-iterations. As explained further below with respect to the pipelined example of FIG. 9, the selection of the first few root digits can be done at a pre-processing stage to avoid the main iteration cycles needing to do a separate LUT lookup as this allows the same selection constants to be used for each iteration.

Putting it Together

Figure 7:
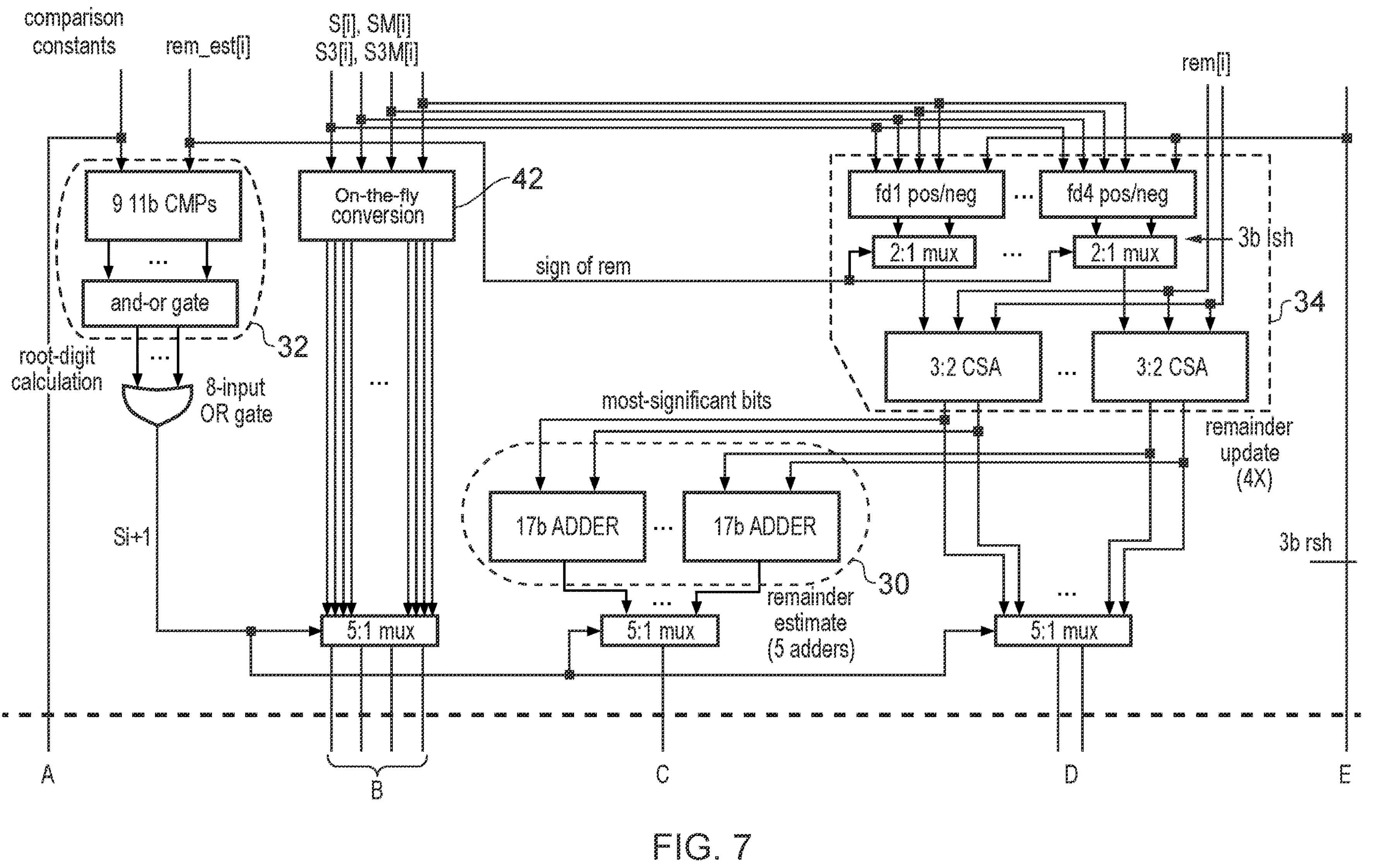
FIG. 7 illustrates in more detail square root processing circuitry for performing a given radix-64 iteration of a square root operation by performing two radix-8 sub-iterations in the same processing cycle.
Figure 7:
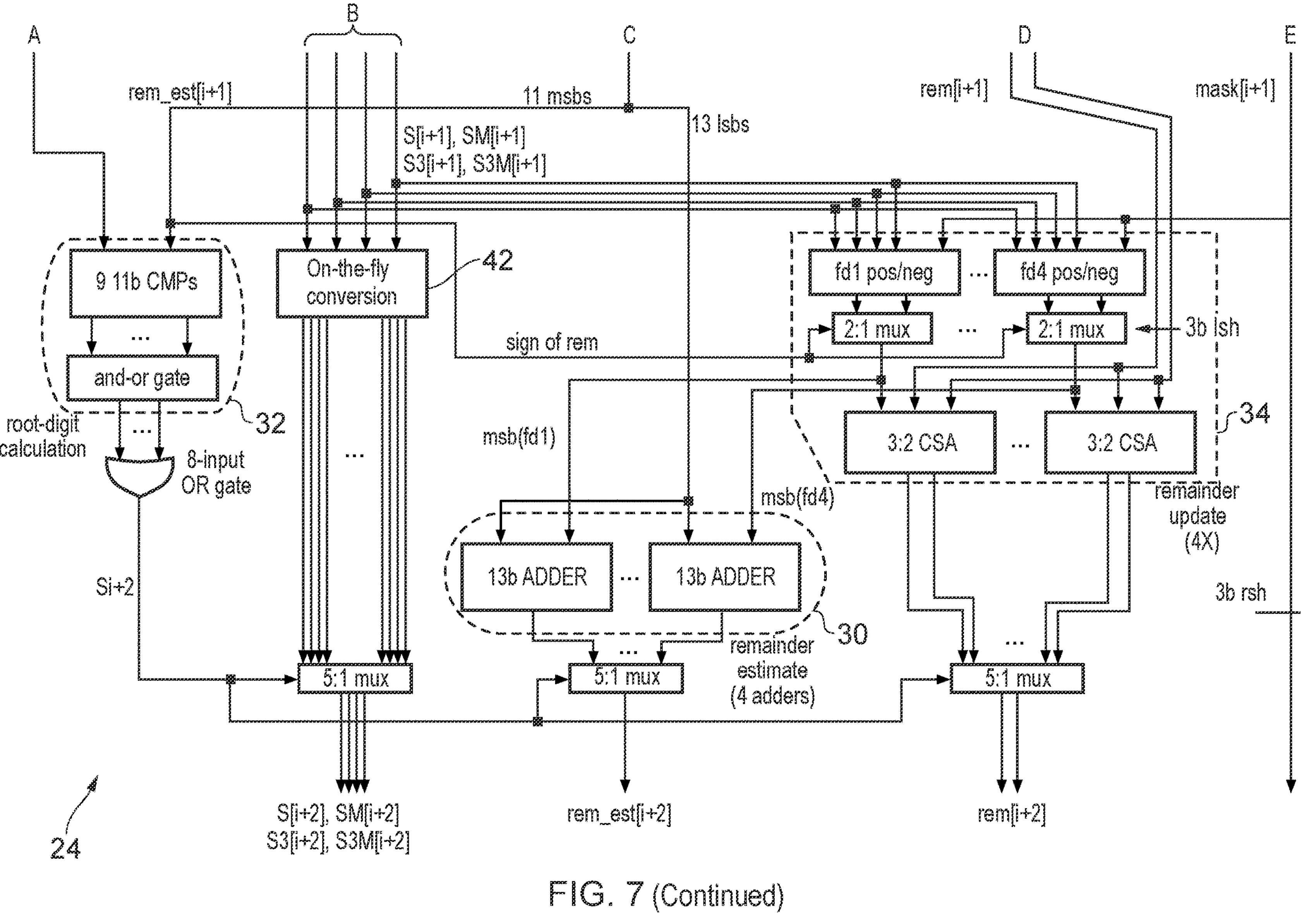

A block diagram of the digit-recurrence square root processing cycle is shown in FIG. 7. The different parts (remainder update circuitry 34, remainder estimate circuitry 30, root-digit selection circuitry 32, and on-the-fly root conversion 42), are identified with dotted lines. In addition, the relation among these parts is also shown in the figure.

As shown in more detail earlier, several parts of the cycle logic use speculation and replication to meet the timing constraints. Hence, replication is used in several places, obtaining a speculative result for each digit value. In most of the cases, the replication is reduced by using the sign of the remainder to have the same logic for a positive digit value and its negative counterpart; this way, the logic is replicated 5 times instead of 9 times, getting a significant area reduction. The correct value is selected among the 9 or 5 speculative values once the root-digit is known.

In some parts, as in the remainder update in the first and second sub-iterations and in the remainder estimate in the second sub-iteration, the logic is replicated only four times but the selection is done in a 5-to-1 mux. This is because one of the inputs to the mux is one of the inputs to the replicated logic (so does not need a replicated circuit unit to calculate a new value for a speculative candidate value).

Hence, FIG. 7 shows an example of square root processing circuitry which can be used for the divide/square root unit 24 of FIG. 1. In some examples, the divide/square root unit 24 could also comprise a separate instance of divide processing circuitry, which performs divide operations in response to divide instructions, without sharing of circuitry and data paths between the square root processing circuitry and the divide processing circuitry.

However, as explained further below with respect to FIG. 8, in some examples the techniques described above for the square root processing circuitry can be used in a combined divide/square root processing circuitry which can also perform divide operations—in this case the combined divide/square root processing circuitry also acts as the "square root processing circuitry" mentioned earlier.

Figure 8:
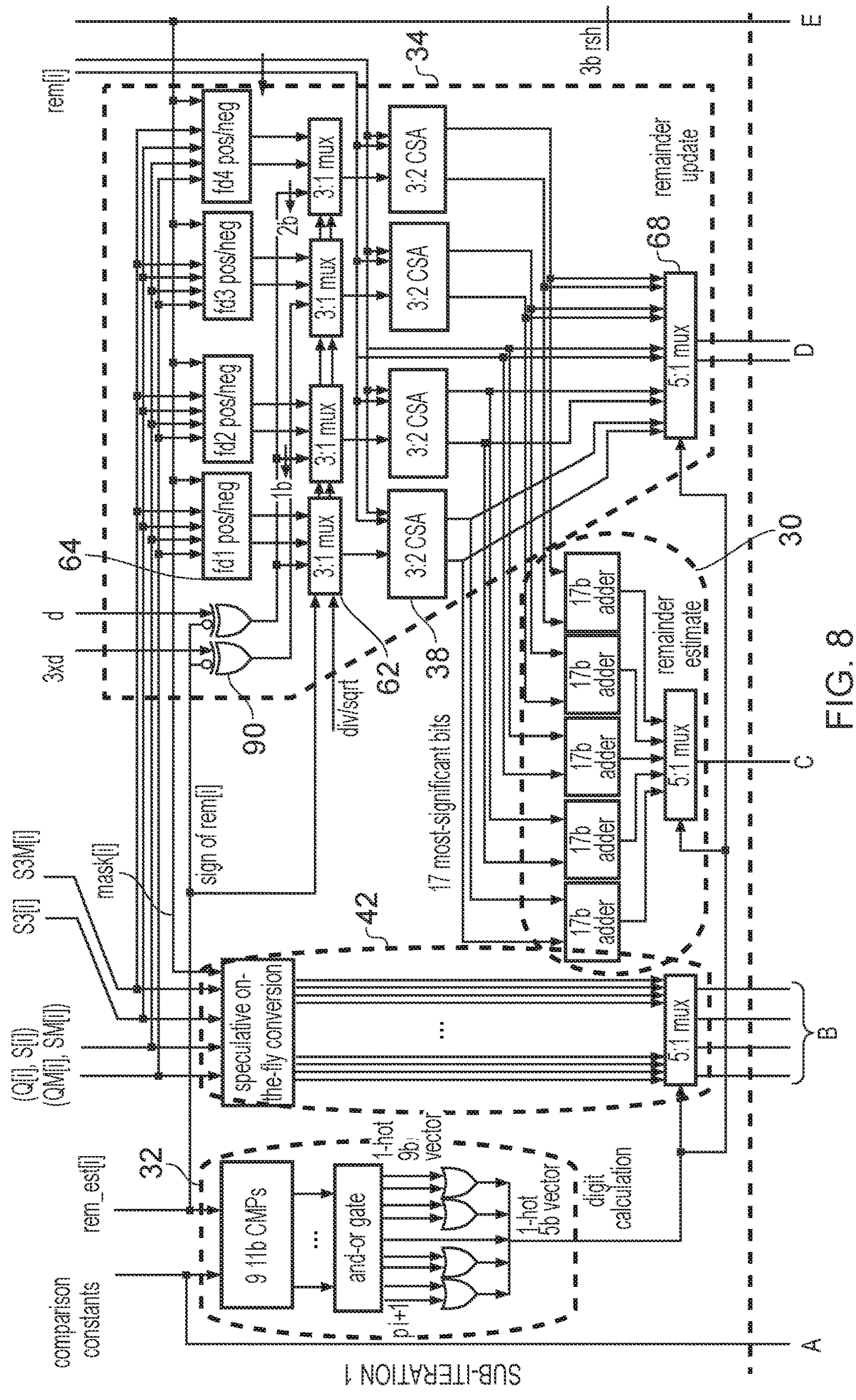
FIG. 8 illustrates combined divide/square root processing circuitry which can perform both divide and square root operations, with shared circuitry generating at least one output value on a same data path used for both the divide and square root operations.
Figure 8:
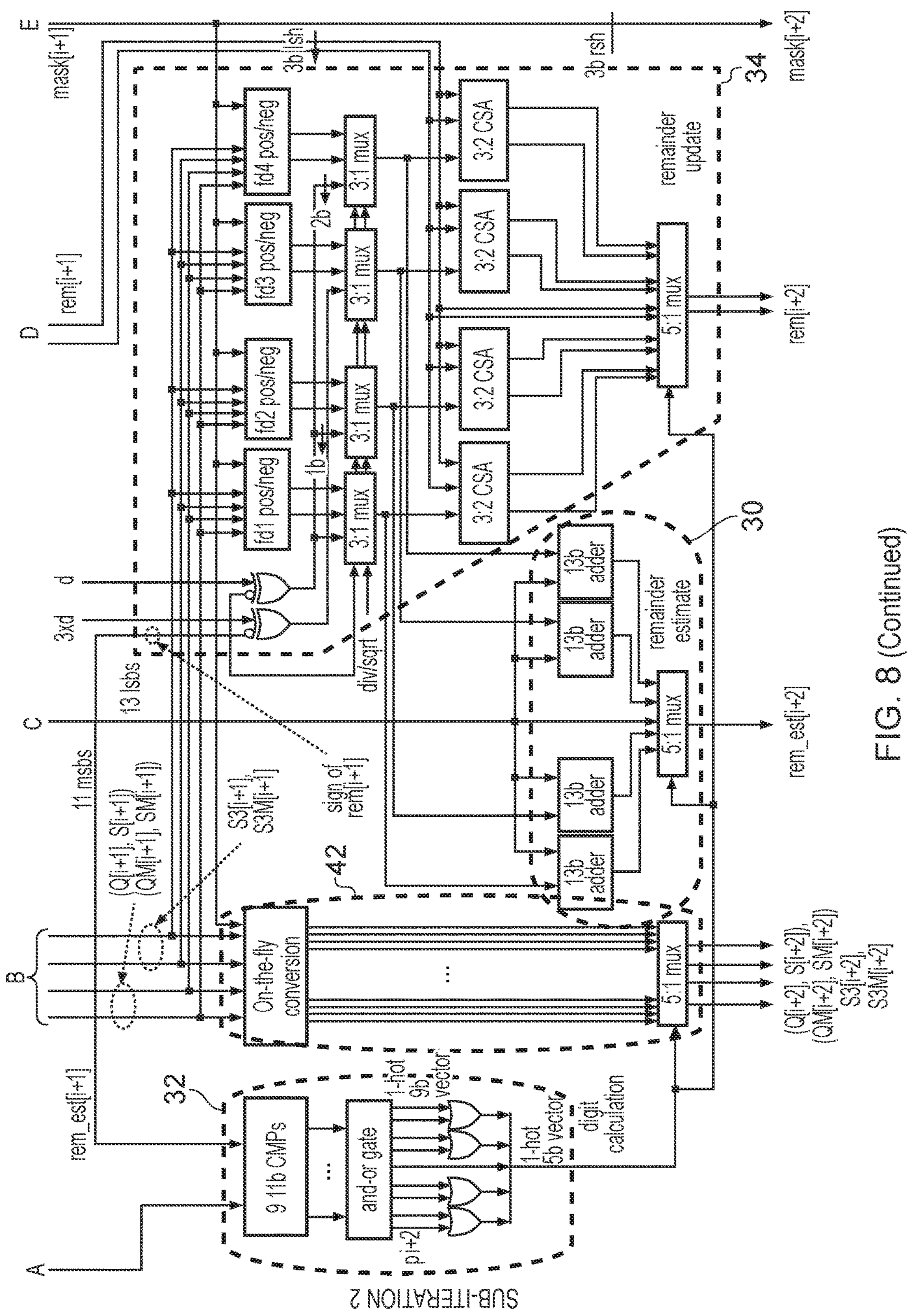

Radix-64 Combined Divide/Square Root Processing Circuitry for Shared Division and Square Root Iteration FIG. 8 shows an example of combined divide/square root processing circuitry for performing radix-64 divide/square-root iteration, which can be provided as part of the divide/square root unit 24 of FIG. 1. The combined divide/square root processing circuitry uses shared circuitry and a shared data path to perform both divide and square root operations, both with the same radix 64. A same number of radix 64 iterations is performed per cycle for both divide and square root operations (in this example, a single radix-64 iteration of the digit recurrence method is performed per cycle, for both divide and square root operations). As for the square root example above, in this example, the radix-64 iteration is divided into two overlapped radix-8 sub-iterations. The combined divide/square-root processing circuitry receives, as an input, a signal "div/sqrt" which indicates whether the current operation is a divide operation or a square root operation. This signal can be controlled by the instruction decoder 6 based on whether the instruction being processed is a divide instruction or a square root instruction.

The combined divide/square root processing circuitry includes all the components described earlier with respect to FIGS. 3 to 7 for the square root example, and so performs square root operations in the same way as described earlier. Much of this circuitry can also be reused for divide operations, so that the data paths for generating the updated remainder rem[i+1], rem[i+2], remainder estimate rem_est [i+1], rem_est[i+2], and partial result value S[i], SM[i] for the square root operation are also used for generating corresponding values for the divide operation (the notation Q[i], QM[i] is used for the partial result value when a divide operation is performed, but it is on the same data path as the partial root value S[i], SM[i] generated for the square root operation).

FIG. 8 shows the microarchitecture of the radix-64 divide/square root iteration. The two radix-8 sub-iterations forming the radix-64 iteration are separated: the first sub-iteration on the top and the second sub-iteration on the bottom. The two iterations are very similar although there are some differences which will be addressed later on.

As noted in equations (1) and (3) above, the result after an iteration i is defined by a partial result P[i], (which can be a partial quotient Q[i] or partial root S[i]), and a remainder rem[i]. Then, each iteration comprises several steps.

1. Digit Selection

A new result digit is produced from the remainder and the divisor (in division) or the partial root (in square root) using low-precision estimations instead the full-precision values (see equation (2)). Hence, the combined divide/square-root unit 24 includes, for each radix-8 sub-iteration, shared digit selection circuitry 32 which selects a next radix-8 digit for the divide/square-root result, based on comparison of the previous remainder estimate rem_est[i], rem_est[i+1] with a set of comparison constants. The remainder estimation wordlength is different in division and square root.

As already described above for the square root example in FIG. 6, the digit selection is done by comparing the remainder estimate with a set of 8 selection constants. This set depends on the most-significant bits of the divisor or partial root. The comparison constant set are stored in a look-up table (LUT) addressed with the most-significant bits of the divisor or partial square root (as described further below). The error analysis of radix-8 division and square root algorithms shows that the number of bits of the comparison constants and the remainder estimate is different in the two operations, 11 bits in square root and 10 bits in division. However, both operations can be placed in the same logic if a 11-bit remainder estimate is used for both division and square root. In this case, the comparison constants for division are extended to 11 bits by placing a 0 in the least-significant bit position. This way the remainder estimation logic 30 and digit selection circuitry 32 in the first and second sub-iterations are shared between division and square root.

Hence, the comparisons for digit selection are performed with a same set of comparators 80 for both divide and square root operations. The operation of the digit selection circuitry 32 is the same for both divide and square root operation (as described earlier with respect to FIG. 6 for square root) other than receiving a different set of comparison constants to compare against the 11-bit remainder estimate.

2. Remainder Update

The so produced result digit is used to update the remainder and partial result (equations (1) and (3)). Hence, shared remainder update circuitry 34 is provided in each sub-iteration to adjust, in a given radix-8 sub-iteration, a previous remainder value rem[i], rem[i+1] based on a remainder adjustment value, to generate an updated remainder value rem[i+1], rem[i+2] in a redundant representation.

As for the square root example discussed earlier in FIG. 4, replicated circuit units are provided to generate candidate remainder values for different possible values of the selected result digit (with sharing of circuitry between positive/negative digits of the same magnitude as discussed earlier to reduce the amount of replication needed), and then a 5:1 multiplexer 68 selects one of the candidate values depending on the next result digit selected by digit selection circuitry 32. The carry-save adders 38 and fd calculating units 64 are the same as in FIG. 4.

However, as shown in equation (4) the remainder adjustment value (F[i+1] term), which is used in the remainder update, is different for division and square root. In case of square root F[i+1] is obtained by concatenating the root digit $s_{i+1}$ to the shifted partial root; which means F[i+1] is computed every iteration by fd calculating units 64. However, in case of division F [i+1] is the divisor d which does not change between iterations.

Therefore, XOR gates 90 are added to generate the $-p_{i+1}\times d$ term of equation (3) that arises when a divide operation as performed (when F[i+1]=d as shown in equation 4). One XOR gate XORs the divisor d with the inverse of the sign of the previous remainder estimate rem_est[i], rem_est[i+1] to provide the multiplication by −1. In other words, as in case of division the remainder update uses multiples of +d or −d; then, in case of a positive remainder the divisor is complemented to get a negative multiple of the divisor. For the replicated units which calculate candidate remainder values corresponding to root digits of ±2 and ±4, a 1-bit or 2-bit left shift is applied on the path out of the XOR gate to represent the multiplication by $p_{i+1}$ required in equation (3). As for square root, a separate representation of 3 times the divisor, 3×d, is used to avoid needing to do a 3× multiplication (in order to have a fast iteration, multiple 3×d is pre-computed before the iterations), so a second XOR gate similarly XORs 3×d with the inverse of the sign of the previous remainder estimate, to provide an input to the replicated circuit unit which is calculating the candidate remainder for ±3 root digits.

The 2-to-1 multiplexers 62 shown in FIG. 4 for the square root example are replaced with a set of 3-to-1 multiplexers 62 in FIG. 8, to select the proper F[i+1] value for division or square root. When the operation type signal div/sqrt indicates that a divide operation is performed, each 3:1 multiplexer 62 selects the corresponding value received from XOR gates 90 based on the divisor. When the operation type signal div/sqrt indicates that a square root operation is performed, the relevant one of the d-vector values produced by fd1-fd4 calculating blocks 64 is selected based on the sign of the previous remainder estimate, as explained earlier for FIG. 4. Hence, the 3:1 multiplexers 62 function as selection circuitry to select, as the remainder adjustment value, either a value derived from the divisor value d when performing a given radix-8 sub-iteration as part of a radix-64 divide operation, or a value derived from a partial root value which depends on a previously selected sequence of radix-8 root digits, when performing the given radix-8 sub-iteration as part of a radix-64 square root operation. The sharing of the carry save adders 38 and 5:1 multiplexer 68 between both operations provides a saving in circuit area.

3. Remainder Estimate

The remainder estimate is obtained to be used for digit calculation in the next sub-iteration. Hence, there is shared remainder estimate circuitry 30 which generates, in a given radix-8 sub-iteration, an updated remainder estimate rem_est[i+1], rem_est[i+2] which is a non-redundant estimate of a portion of the updated remainder value rem[i+1], rem[i+2] generated in a redundant representation by the remainder update circuitry 34 in the given radix-8 sub-iteration. The remainder estimate circuitry 30 is the same as described earlier in FIG. 5 for square root operations. Again, in the second radix-8 sub-iteration, the remainder estimate circuitry 30 determines the updated remainder estimate rem_est[i+2] in parallel with the remainder update circuitry 34 generating the updated remainder value rem[i+2].

4. On-the-Fly Conversion

The partial result P[i] (quotient Q or root S), is converted from the signed-digit redundant representation to a traditional binary non-redundant representation using the on-the-fly conversion (equations (7) and (8)). In typical on-the-fly conversion schemes, the fact that the partial root is used in the next digit selection and in the remainder update for square root operations, but the partial quotient is not for divide operations, has driven to different partial quotient update and partial root update methods. This difference is shown below (digit $\overline{\alpha}$ means the value is $-\alpha$):

| Division | Square root |
|---|---|
| 2. | 1. |
| $2.\overline{2}$ | 1.0 |
| $2.\overline{2}0$ | $1.0\overline{1}$ |
| $2.\overline{2}01$ | $1.0\overline{1}2$ |
| $2.\overline{2}014$ | $1.0\overline{1}2\overline{3}$ |

In case of division, every time a new digit (3 bits in radix-8) is produced, in typical schemes the actual partial quotient is left-shifted and the new digit is placed as the three least-significant bits; this way the actual partial quotient is always in the left-significant part. Previously inserted bits are shifted to the left to more significant bit positions. On the other hand, in case of square root the new root-digit is concatenated to the actual partial root in such a way the most significant bit of the partial root is always at the most-significant part of the stored data value, and a mask mask[i], mask[i+1] is used to keep record of the position where next digit has to be concatenated as described earlier for square root operations.

To share the on-the-fly conversion logic between division and square root, it has been decided to perform the partial quotient update as it is done for the partial root update; that is, concatenating the new quotient-digits using a mask to indicate the position where the digit has to be concatenated. This is unconventional, but means that increased sharing of data paths and circuit logic is possible.

Hence, in the first sub-iteration the shared on-the-fly conversion circuitry 42 selects a position for inserting a next digit into the partial result value Q[i], QM[i], S[i], SM[i] based on the mask mask[i], for both the divide operation and the square root operation. Similarly, in the second sub-iteration the shared on-the-fly conversion circuitry 42 selects a position for inserting a next digit into the partial result value Q[i+1], QM[i+1], S[i+1], SM[i+1] based on the mask mask[i+1], for both the divide operation and the square root operation. The mask is right shifted by 3 bits per sub-iteration so that each result digit is inserted 3 bits to the right of the previous one.

As for the square root example described earlier for FIG. 7, the combined divide/square-root processing circuitry could be used either in an iterative unit where the outputs labelled "i+2" generated in one iteration are fed back as inputs labelled "i" for the next iteration of the square root or divide operation, or in a pipelined unit as discussed further below with respect to FIG. 9.

Divide/Square-Root Pipeline

The long latency of the traditional division and square root implementations and the complexity of each of its stages, with separated logic for division and square root, prevent the use of pipelined floating-point division and square units in commercial processors. Instead commercial processors have iterative units where part of the logic is used over several cycles, resulting in low bandwidth designs. In typical schemes, the iterative logic is composed of two separated pieces, the division iteration and the square root iteration, with very few, if any, shared logic between both operations. To increase the bandwidth several iterative div/sqrt units operating in parallel are placed. For example, one design has two iterative floating-point div/sqrt units doing double, single and half-precision operations, and two other smaller iterative units doing single and half-precision operations; this way the double-precision div/sqrt bandwidth is doubled, whereas the bandwidth of the single and half-precision division and square root is multiplied by four with respect to the configuration with just a div/sqrt iterative unit.

Figure 9:
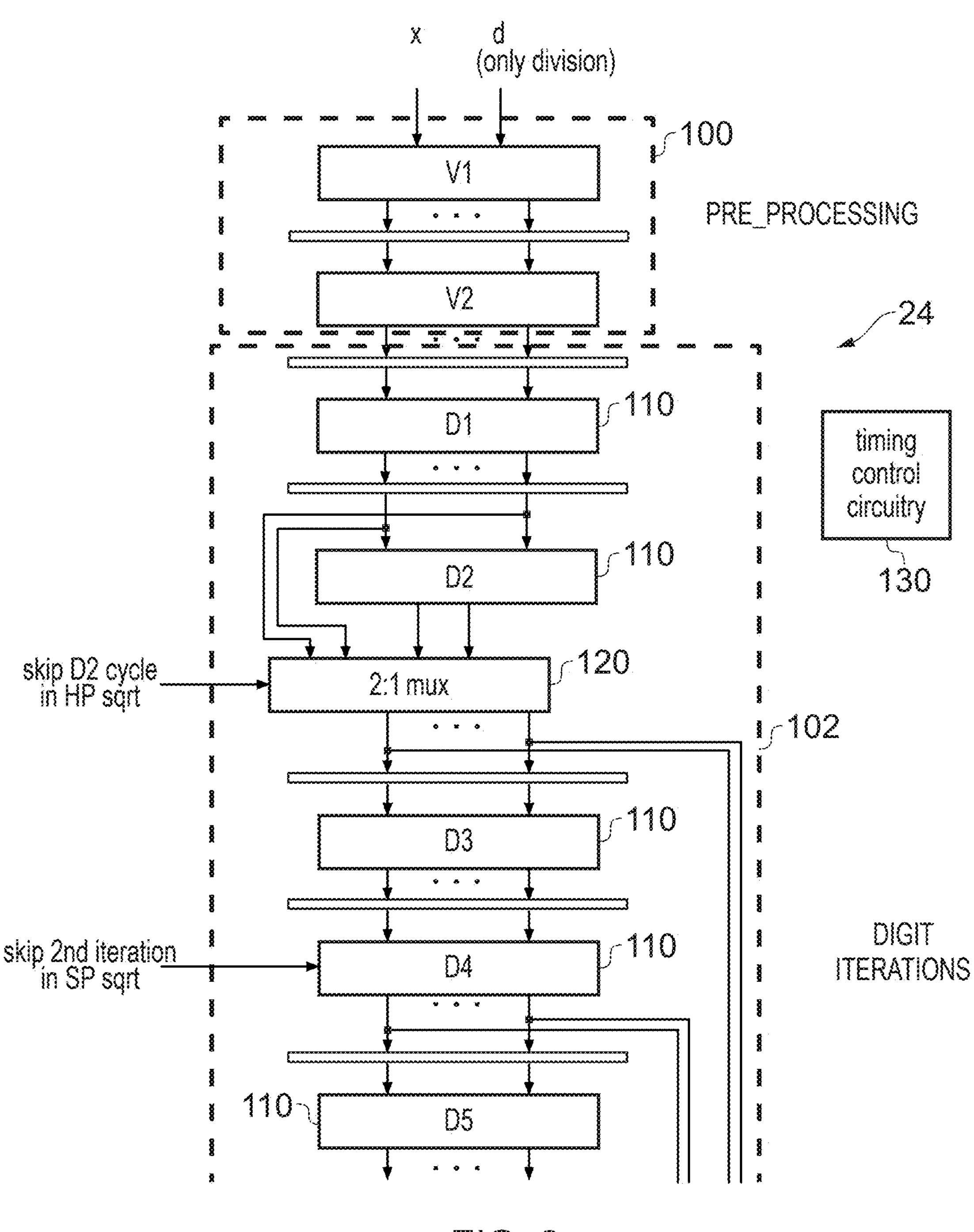
FIG. 9 shows an example of a divide/square root pipeline.
Figure 9:
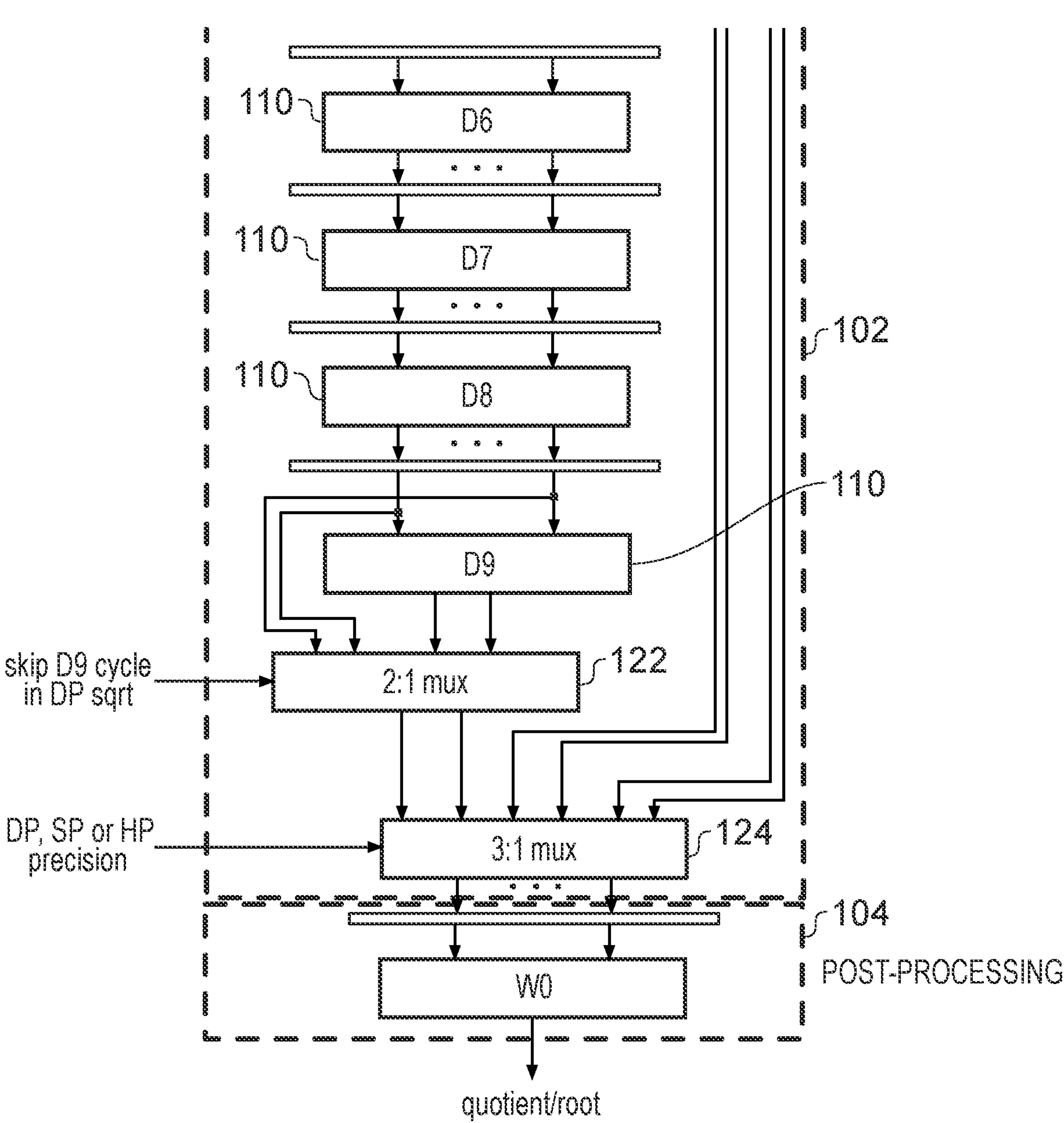

In the approach shown in FIG. 9, instead a single pipelined div/sqrt unit 24 is provided. To overcome the setbacks preventing the use of such an unit, we have developed low-latency division and square root implementations and a common stage for division and square root, in addition to some other logic shared between both operations. Low-latency is achieved by implementing radix-64 digit-recurrence division and square root algorithms with two radix-8 iterations per cycle; such algorithm produces 6 bits of the result per cycle as explained earlier. On the other hand, having the same algorithm for division and square root, together with a careful stage design allows to reduce the area requirements. Consequently, we have been able to design a pipelined floating-point div/sqrt unit for double, single and half-precision with a relative small area. Compared to the alternative configuration discussed above with two double/single/half precision units and two single/half precision units, bandwidth is improved significantly for double and single precision and more moderately for half precision, but the circuit area of the pipelined unit can be smaller than the total area of the alternative configuration. Hence, the pipeline unit allows to combine low latency with a high bandwidth to obtain a high performance div/sqrt unit 24.

As shown in FIG. 9, the pipelined unit 24 includes pre-processing circuitry 100, a main body 102 of the pipeline for performing the digit-recurrence iterations, and post-processing circuitry 104. The pre-processing and post-processing logic is mostly shared between division and square root, and the iterative part, the digit iterations, is unrolled into several pipelined radix-64 shared stages 110.

The pre-processing circuitry 100 performs various pre-processing operations including operand unpacking, operands normalization (if required) and initialization (e.g. looking up comparison constants and selecting one or more initial result digits).

The main body 102 of the pipeline performs the digit iterations, which is the iterative part of the digit-recurrence algorithm. The main body 102 of the pipeline comprises a number of divide/square-root pipeline stages 100, each of which includes an instance of the combined divide/square-root processing circuitry shown in FIG. 8. Hence, each pipeline stage 110 in the main body 102 performs a single iteration of a radix-64 digit-recurrence floating-point division operation, $q=x/d$, or radix-64 digit-recurrence square root operation, $s=\sqrt{x}$. To get an energy and timing efficient implementation of the division/square root, the radix-64 iteration is obtained by overlapping two simpler radix-8 iterations as described earlier.

Post-processing circuitry 104 comprises rounding logic and right-shift in case of a subnormal result (in division only).

The pipelined unit deals with three different floating-point precisions: double precision, single precision and half precision (DP, SP, and HP), respectively, which lead to different latency of a division or square root operation for different precision operations. Nevertheless, for a given precision, the latency is the same for both divide and square root, to simply scheduling of timings for the post-processing stage.

More detailed discussion of the pipeline is discussed below, which focuses on processing of the significand of the input operands x, d to generate a result. It will be appreciated that the exponent of the input operands x, d are also processed—this can be done according to any known technique. For example, for divide the result exponent may correspond to the difference between true exponents of the input operands x, d, adjusted for any right shift at the post-processing stage required for subnormal handling. For square root operations the result exponent may correspond to half the true exponent of the input operand x, again adjusted for any normalisation being applied. Here "true exponent" refers to the effective power of 2 represented by the exponent of the floating-point number (having removed any exponent bias applied according to the floating point precision being used).

Pre-Processing (V1, V2)

The pre-processing circuitry 100 performs pre-processing, which includes the unpacking of floating-point operands to extract the sign, significand and exponent, determination of special conditions (subnormals, zero, . . . ), normalization of operands (e.g. handling subnormals), and Look-up Table (LUT) addressing to get the selection constants required in the digit selection. In case of division with two subnormal operands, both operands are normalized in the same cycle.

In addition, the first radix-8 digit is obtained. In floating-point division the first digit can take only values {+1, +2}, and it is the integer digit of the quotient. In floating-point square root the first radix-8 digit can take values {−4, −3, −2, −1, 0} and its calculation is easily merged with the initialization of the remainder and partial root.

In case of square root, the second digit is obtained as well. As said before, the LUT stores the selection constants required for the digit selection. However, in square root the selection constants for each radix-8 iteration depend on the partial root value before that iteration, in such a way that each iteration uses a different set of comparison constants. This impose a hard limitation in the timing and area because the iteration logic should include a LUT and it should be read every time a new iteration starts. However, it has been derived (by error analysis) that, in radix-8 square root, the same of set of selection constants can be used for every iteration except the first two iterations (giving sufficient accuracy in the result even if the same set of selection constants is used after the first two iterations). Therefore, the second root digit is obtained in this stage and afterwards the LUT is read and the so obtained set of selection constants is flopped to be used for digit selection in the remaining iterations.

Some other actions are carried out in case of division. To save an iteration in single precision the quotient q is forced to be in qΣ[1,2). Note that q<1 only if x<d. This situation is detected in the pre-processing and the dividend if 1-bit left-shifted in such a way that q=2×x/d and qΣ[1,2). Of course, the mantissa is the same than in x/d but the exponent needs to be decremented. Finally, 3× d=2×d+d is computed to be used in the radix-8 iterations, to avoid needing a 3× multiple to be computed in each iteration, which saves time.

Pre-processing stage is split into two cycles, V1 and V2, so that operands unpacking, classification and normalization, and first root digit (in square root) are done in V1. Whereas in V2 the following actions are carried out: second root digit calculation (square root), first quotient digit calculation (division), x and d comparison and conditional shifting of the quotient (division), 3×d calculation (division), and LUT addressing to get the comparison constants for the rest of the iterations (division and square root).

First Divide Digit Selection and First Two Square Root Digit Selections

The following provides more information on how to select the first radix-8 divide result digit and the first two radix-8 square root result digits at the pre-processing circuitry 100.

Context

- Radix-64 divide and square root
- Each radix-64 iteration is made up of two radix-8 iterations
- DIVISION:
  - First iteration is done before the iterative part
  - Reason for this:
    - before the iterative part the constant look-up table (LUT) is addressed to get comparison constants required for the quotient-digit selection in every radix-8 iteration.
      - The LUT is addressed with the most-significant bits of the divisor
    - All the iterations use the same set of comparison constants.
    - The first radix-8 quotient-digit can only take values +2 or +1; that means the first iteration is much simpler than the rest of iterations
    - In the same cycle where the LUT is addressed there is time for performing the first divide iteration
    - Thanks to having the first iteration in the LUT cycle the final latency could be reduced by 1 cycle for some precisions
- SQUARE ROOT:
  - The LUT is addressed with the most-significant bits of the partial root
  - First and second iterations are done before the iterative part
  - Reason for this:
    - The radix-8 square root algorithm requires different comparison constant set for the first iteration, for the second iteration and for the remaining iterations
    - To have a common square root iteration logic in the iterative part of the square root calculation and to prevent having the LUT addressing in the iteration logic it has been decided to carry out the first and second iterations before the iterative part
    - First iteration is done in the very first cycle V1, together with the operand unpacking and the determination of special operands
    - Second iteration is done in the same cycle V2 as the LUT addressing to get the comparison constants for the remaining iterations. This cycle is before the iterative part of the algorithm Division: First Radix-8 Digit (at V2)

- The first radix-8 divide digit is selected using the same set of constants as the rest of iterations, so the constants for this first digit selection and the digit selection in subsequent iterations are obtained from the LUT.
- In this cycle
  - the LUT is addressed,
  - the constant for digit=+2 is used in to carry out the first iteration
  - the set of comparison constants is flopped to be used in remaining iterations.
- Then, the first iteration uses the same set of constants as the rest of iterations but, because of the restricted digit values, only the constant for digit=+2 is needed.

Square Root: First Radix-8 Digit (at V1)

- For the radix-8 iteration the idea is the same, but it is not the same logic as in the radix-4 case:
  - Partial root is 1 (initial value)
  - First radix-8 digit can take values −4, −3, −2, −1, or 0
  - Given the partial root, the comparison constants for these 5 digit-values are known, and wired in the first-digit selection logic (only 4 values need to be stored). Hence, no LUT addressing is needed for this.
  - These 4 values are (comparison cte*64—i.e. the values quoted below are 64 times the actual stored constants):
    - constant for digit=0: −64
    - constant for digit=−1: −176
    - constant for digit=−2: −272
    - constant for digit=−3: −352.

Square Root: Second Radix-8 Digit (at V2)

- The range of values for partial root after first iteration is limited, only 5 values are possible (a different partial-root value for each value of the first digit):
  - First digit=0⇒next partial root is 1.00_000
  - First digit=−1⇒next partial root is 0.11_000
  - First digit=−2⇒next partial root is 0.10_000
  - First digit=−3⇒next partial root is 0.01_000
  - First digit=−4⇒next partial root is 0.00_000
- A small LUT is used to store these 5 comparison-constants set
- The size of this LUT is 5×88
  - 5 rows
  - 8 bit/row to store the eight 11-bit comparison constants
  - Addressed with partial root shown above
  - Values stored in the LUT (again, the constant values shown are comparison cte*64, 64 times greater than the stored values):
    - partial root is 1.00_000⇒461, 326, 191, 61, −62, −192, −317, −442 partial root is 0.11_000⇒406, 281, 171, 61, −62, −172, −277, −377 partial root is 0.10_000⇒351, 241, 141, 46, −47, −142, −232, −322 partial root is 0.01_000⇒291, 206, 121, 41, −42, −122, −192, −267 partial root is 0.00_000⇒236, 161, 96, 31, −32, −97, −152, −212 the order of the constants above is constant for digit=+4, digit=+3, digit=+2, digit=+1, digit=0, for digit=−1, for digit=−2, for digit=−3.

This explains the initial digit selection for the pre-processing circuitry. Digit selection in subsequent stages is as described earlier in FIG. 6, with reference to the comparison constants shown in the LUT described further below in FIGS. 17-20.

Digit Iterations in Pipelined Divide/Square-Root Unit

For a generic radix r and calling n to the number of bits of the result, the number of iterations is, $$it = \left\lceil \frac{n}{\log_2 r} \right\rceil \quad (27)$$

Let's particularize for radix-64 (r=64), the two operations (division and square root), and the three floating-point precision (DS, SP, and HP). The number of fractional bits for every precision is 52, 23, and 10, respectively. One radix-64 iteration is carried every cycle; as said before, to obtain an affordable implementation the radix-64 iteration is obtained by overlapping two simpler radix-8 iterations per cycle. However, the number of iterations is still that of a radix-64 algorithm.

The first digit, which produces the integer bit of the final quotient, is selected in pre-processing. In addition, the quotient if forced to be in [1; 2), then only the guard bit is needed for rounding, the rounding bit is not used. Then, n=53, 24, 11 for double, single, and half-precision, respectively. This includes the fractional and the guard bits. Then, the number of iterations for the three precision are, $$it\_div\_dp = \left\lceil \frac{53}{6} \right\rceil = 9 \quad (28)$$
$$it\_div\_sp = \left\lceil \frac{24}{6} \right\rceil = 4$$
$$it\_div\_hp = \left\lceil \frac{11}{6} \right\rceil = 2$$

In DP and HP, the iterations produce one more bit than the target number of result bits, 54 in double precision and 12 in half-precision. This additional bit must be discarded from the quotient and incorporated to the remainder before rounding.

As the input operand is in [0:25; 1) the result in [0:5; 1); therefore, the result has to be left-shifted to get the final floating-point result in [1; 2). As in division, only one additional bit, the guard bit, is need for rounding. Thus, the number of bits of the root the algorithm has to produce is 54, 25, and 12 for DP, SP and HP respectively. This includes the integer bit, the fractional bits and the guard bit.

On the other hand, the first two radix-8 digits are obtained in pre-processing, before the iterations. The first digit selection is skipped and integrated into the remainder and partial root initialization, and the second digit selection in done in V2 to have a single LUT for all the remaining iterations. These two iterations produce 6 bits of the final root, then number of cycles in the iterative part is $$it\_sqrt\_dp = \left\lceil \frac{54-6}{6} \right\rceil = 8 \quad (29)$$
$$it\_sqrt\_sp = \left\lceil \frac{25-6}{6} \right\rceil = 4$$
$$it\_sqrt\_hp = \left\lceil \frac{12-6}{6} \right\rceil = 1$$

In single-precision the number of bits produced after 4 iterations is 30, 6 bits in pre-processing plus 24 bits in digit-iterations; so there are 5 extra bits. To get rid of these extra bits, the second radix-8 iteration in the last digit-iteration cycle is skipped and 2 additional bits are removed from the root and incorporated to the remainder before rounding.

Hence, in the main body 102 of the pipeline, several multiplexers are added:

- a 2:1 multiplexer 120 in stage D2 is added to select between the outputs of stages D1 and D2, allowing stage D2 to be skipped when a HP square root operation is to be performed. This reflects the difference between the 2 cycles needed for divide and 1 for square root as shown in equations (28), (29).
- a multiplexer (not shown in FIG. 9) is added within the combined divide/square-root processing circuitry to allow the outputs of the first sub-iteration in stage D4 to be selected and output as the iteration result (skipping the second sub-iteration in stage D4), when a SP square root operation is to be performed. This avoids the extra 3 bits of the second sub-iteration being generated and the 2 additional bits generated in the first sub-iteration can also be discarded as mentioned above.
- a 2:1 multiplexer 122 is added at stage D9 to select between the outputs of stages D8 and D9, allowing stage D9 to be skipped when a DP square root operation is to be performed. This reflects the difference between the 9 cycles needed for divide and the 8 cycles for square root.
- a 3:1 multiplexer 124 at stage 9 selects between the outputs received from stages D2, D4 and D9 (with or without the skipping for square root mentioned above), with the selection by multiplexer 124 based on a control signal indicating the floating point precision for the current operation, which is controlled by instruction decoder 6 depending on the type of instruction decoded to control the divide/square-root operation.

Hence, the instruction decoder 6 acts as control circuitry which controls the pipeline to cause at least one divide/square-root iteration pipeline stage, which is used to perform at least one iteration of the digit-recurrence divide or square root operation when generating a result with a higher precision, to be bypassed when performing the digit-recurrence divide or square root operation to generate a result with a lower precision (by controlling multiplexer 124 to select the output of an earlier stage when the bypass is to be applied).

Also, the instruction decoder 6 controls the divide/square-root pipeline to cause at least one divide/square-root iteration pipeline stage, which is used to perform at least one iteration when the digit-recurrence divide operation is performed, to be wholly or partially skipped or to discard some bits of its result output, when performing the digit-recurrence square root operation (by controlling multiplexers 120, 122 and the unillustrated internal multiplexer within stage D4 that allows the second sub-iteration of stage D4 to be skipped and bits discarded).

Post-Processing (W0)

As said before, the post-processing is the rounding of the result and a right shift in case of a subnormal result. Any known floating-point rounding technique can be used here. Note that the result can be subnormal only in division, there are no subnormal results in a square root. Post-processing is done in one cycle in both division and square root.

Accommodating Two Operations and Three Precisions in the Same Pipeline—On-the-Fly Conversion As mentioned above, as the number of digit-iteration cycles in DP and HP square root in one less than in division (see equations (28) and (29)). To keep the same latency and to collect the result in the same cycle in both operations an empty cycle has been added for square root; that is, the inputs to D2 and D9 pass to the outputs without any further transformation. In addition, in a SP square root the second radix-8 iteration in the D4 cycle is skipped. Also, the latency is different of each precision. While the DP unrounded result is obtained in D9, the unrounded HP and SP results are obtained in cycles D2 and D4 respectively. Then, the ops for the W0 cycle save the signals coming out from D2, D4 or D9 depending on the precision.

To have an efficient digit iteration cycle implementation, the two operations share most of the logic, including the on-the-fly conversion circuitry 42 for update of the partial quotient or root. However, before the first digit cycle D1 the pre-processing has already produced 6 fractional bits in case of square root or the integer digit in case of division. A shared quotient/root updating logic needs to have the same new fractional digit concatenation position for division and square root.

Therefore, 6 zeroes are added to the fractional part of the quotient Q[i], QM[i] in pre-processing stage V2 in case of division; the new fractional bits qi produced in every subsequent iteration are then concatenated after these zeroes (at the same position at which the corresponding bits would be concatenated for the square root operation, as indicated by the mask):

1:000 000 q1q2q3 q4q5q6 . . .

At the post-processing stage W0, these zeroes are removed before rounding to have the unrounded quotient:

1:q1q2q3 q4q5q6 . . .

The addition of these zeroes does not affect the final quotient accuracy because, as shown in equation (4), the partial root is not used in the digit-recurrence division equations.

Hence, for a divide operation the pre-processing stage V2 provides the first divide/square-root iteration pipeline stage D1 with a partial result value in which selected bit positions are set to dummy bit values (0 in this example), where those selected bit positions correspond to bit positions at which the at least one pre-processing stage V1, V2, when performing the digit-recurrence square root operation, would insert at least one additional result digit not generated for the digit-recurrence divide operation. At the post-processing stage W0, these dummy bit values are eliminated.

Timing Control, Latency and Throughput

The microarchitecture of the pipelined unit is shown in FIG. 9. The unit is composed of 12 stages; this is the latency of the slower operation, the double-precision division: 2 pre-processing cycles (V1, V2), 9 digit-iteration cycles (D1-D9), and 1 post-processing cycle (W0). For a given floating-point precision, division and square root operations have the same latency:

Half precision, 5 cycles: V1-V2-D1-D2-W0
Single precision, 7 cycles: V1-V2-D1-D2-D3-D4-W0
Double precision, 12 cycles: V1-V2-D1-D2-D3-D4-D5-D6-D7-D8-D9-W0

(note that even when a cycle is skipped for square root at D2 or D9, the latency is still the same as the input to 3:1 multiplexer 124 comes after the flip-flops at the input to stage D2 or D9). Having the same latency for both operations can simplify timing control.

In addition, the latency is the same regardless whether or not there are subnormal operands or result: the normalization (if required) is carried out in V1, and the subnormal quotient right shift is done in W0 after rounding.

Timing control circuitry 130 is provided to control the timings at which divide and square root operations can start. While timing control circuitry 130 is shown as a separate unit in FIG. 9, in other examples the decoder 6 can act as the timing control circuitry 130.

The divide/square-root unit 24 is fully pipelined; that means a new operation can be started every cycle for a throughput of 1 when all the operations are for the same precision, which is the most common case. Hence, the control circuitry 130 can control the divide/square-root pipeline to perform a first digit-recurrence divide or square-root operation and a second digit-recurrence divide or square-root operation with a later divide/square-root iteration pipeline stage of the divide/square-root pipeline performing a later iteration of the first digit-recurrence divide or square-root operation in parallel with an earlier divide/square-root iteration pipeline stage performing an earlier iteration for the second digit-recurrence divide/square-root operation.

However, when there are mixed precision division or square roots a restriction shows up: two operation cannot be at the same stage at the same time. As shown in FIG. 10 there are some forbidden starting cycles for SP and HP operations because the latency depends on the precision. For example, a SP div/sqrt cannot start 5 cycles after a DP because in that case both operations would collide in W0.

Hence, the timing control circuitry 130 may, as shown in FIG. 10, control circuitry to prevent a lower-precision digit-recurrence divide/square-root operation performed to generate a result with a lower precision from starting a predetermined number of cycles after a higher-precision digit-recurrence divide/square-root operation performed to generate a result with a higher precision, the predetermined number of cycles corresponding to a difference between a number of cycles taken to reach the at least one post-processing stage for the higher-precision digit-recurrence divide/square-root operation and a number of cycles taken to reach the at least one post-processing stage for the lower-precision digit-recurrence divide/square-root operation.

The predetermined number of cycles differs depending on the precisions used. As shown in FIG. 10, the predetermined number is:

5 cycles when the lower precision is SP and the higher precision is DP;

7 cycles when the lower precision is HP and the higher precision is DP; and 2 cycles when the lower precision is HP and the higher precision is SP.

There is no problem in starting the lower precision operation after the higher precision operation when the number of cycles between the operations is either greater or less than the predetermined number, as in that case there will be no collision for the post-processing stage W0.

With this approach, a significant bandwidth improvement can be provided by using a shared pipelined divide/square root operation, with an area reduction due to the sharing of common logic, providing a better balance between performance and circuit area.

Nevertheless, a pipelined approach could also be used for implementations which have separate square root and divide units, for one or both of the square root and divide units.

Also, while FIG. 9 applies the pipelined approach to radix-64 digit recurrence divide and square root, a pipelined approach could also be used for other values of the radix.

Also, while FIG. 9 shows a pipelined approach supporting all of HP, DP, SP, other examples may only support a subset of these precisions or could support other floating-point precisions, so may use a different number of pipeline stages.

On-the-Fly Conversion

As previously explained, a part of the digit recurrence method might involve conversion from redundant representation to regular binary representation (non-redundant representation). Since the output digits from the digit recurrence method are produced one at a time, it would be useful if the conversion could be performed one digit at a time so as to avoid a latency that could occur if all the digits must be converted at once. This conversion is performed using on-the-fly conversion circuitry 42.

Briefly, the on-the-fly conversion for square root keeps two partial root words, S[i] and SM[i] (S[0]=1.0 and SM[0]=0.0), with SM[i]=S[i]−$r^{-i}$, and the updating rules shown below, $$S[i+1] = \begin{cases} (S[i], s_{i+1}) & \text{if } s_{i+1} \ge 0 \\ (SM[i], (r - |s_{i+1}|)) & \text{if } s_{i+1} < 0 \end{cases} \quad (30)$$

$$SM[i+1] = \begin{cases} (S[i], s_{i+1} - 1) & \text{if } s_{i+1} > 0 \\ (SM[i], (r-1) - |s_{i+1}|) & \text{if } s_{i+1} \le 0 \end{cases} \quad (31)$$

Where (X, Y) means the concatenation of X and Y, i.e. XY. Note that, in effect, SM[i] (in binary) is equivalent to S[i] (in binary) with 1 subtracted from the least significant bit position. So if S[0]=111 then SM[0]=110.

FIG. 11 summarizes how S[i] and SM[i] are updated for each digit in a radix-8 operation. In the figure {Sx[i], ααα} means the concatenation of the ααα bits to the actual value of S[i] or SM[i]. Note that no arithmetic operation is involved, only concatenation.

FIG. 12 shows an example of on-the-fly conversion of a radix-8 root. The digit sequence is −1, 1, −2, −4, 2, 0, −1; Note that the final value of SM[i] is S[i]−1.

As previously shown, for the square root operation, the calculation of the next remainder rem[i+1] involves the $s_{i+1}$×S[i] multiplication (see equation (3)). In a radix-8 implementation $s_{i+1}$={+4, +3, +2, +1, 0, −1, −2, −3, −4} and therefore the 2×, 3× and 4× multiples of S[i] are needed. The 2× and 4× terms are easily obtained by left-shifting S[i] by 1 or 2 bits, but then calculation of 3×S[i] is much more complex and this has been a limiting factor for the practical utilization of radix-8 square root algorithms.

Note that in other implementation with a smaller radix, term 3× is not needed because of the digit set, {+1, 0, −1} in radix 2, and {+2, +1, 0, −1, −2} in radix 4.

The present invention keeps additional partial root words that represent S3[i] and S3M[i], thereby preventing the calculation from taking place as 3×S[i], either by performing a multiplication by three or by adding S to a multiplication of S by two. In the case of each of S3 and S3M, the concatenation to be performed is:

$$3 \times s_{i+1} \in \{+12, +9, +6, +3, 0, -3, -6, -9, -12\}$$

FIG. 13 shows how the concatenation is carried out. Note that 4 bits are needed to represent 3×$s_{i+1}$={+12, +9, −9, −12}; that means the concatenation of these digit values produces a carry which is propagated to the previous digit. The 4-bit 3×$s_{i+1}$ is therefore decomposed into a 3-bit digit (3×s[i+1]) mod 8, taking values in {+6, +4, +3, +1, 0, −1, −3, −4, −6} and a positive or negative carry $c_{i+1}$={+1, −1}.

From FIG. 13, if $s_{i+1}$={+4, +3, +2, +1, 0, −1, −2, −3, −4}, then the 3-bit digits to be concatenated to get 3×S[i] are (3×s{i+1}) mod 8={+4, +1, +6, +3, 0, −3, −6, −1, −4}, respectively. The concatenation process to obtain S3[i] and S3M[i] is therefore as follows:

1. Increment/decrement the actual partial root if |$s_{i+1}$|={4, 3}. The actual 3× multiple of the partial root, S3[i], and its decremented counterpart, S3M [i], are rebuilt by changing the previous digit $s_i$ to $s_i$+1 or $s_i$−1 depending on the carry, $$S3\_inc[i] = S3[i] + 8^{-i}$$

$$S3M\_dec[i] = S3M[i] - 8^{-i}$$

Note that a carry need not be propagated beyond the previous digit $s_i$ because three bits are used to express each digit to be concatenated and yet the full range of values that can be expressed by these three bits is not used, with only a maximum value of +6 being added as a digit.

2. Concatenation of the 3-bit digit. The 3-bit digit concatenation is defined by, $$S3[i+1] = \begin{cases} (S3\_inc[i], & (3 \times s_{i+1})\text{mod}8) & \text{if } s_{i+1} = \{+4, +3\} \\ (S3[i], & (3 \times s_{i+1})) & \text{if } s_{i+1} = \{+2, +1, 0\} \\ (S3M[i], & 8 - |3 \times s_{i+1}|) & \text{if } s_{i+1} = \{-2, -1\} \\ (S3M\_dec[i], & 8 - |3 \times s_{i+1}|\text{mod}8) & \text{if } s_{i+1} = \{-3, -4\} \end{cases} \quad (32)$$

$$S3M[i+1] = \begin{cases} (S3\_inc[i], & ((3 \times s_{i+1})\text{mod}8) - 1) & \text{if } s_{i+1} = \{+4, +3\} \\ (S3[i], & (3 \times s_{i+1}) - 1) & \text{if } s_{i+1} = \{+2, +1\} \\ (S3M[i], & 8 - |3 \times s_{i+1}|) - 1 & \text{if } s_{i+1} = \{0, -1, -2\} \\ (S3M\_dec[i], & 8 - |3 \times s_{i+1}|\text{mod}8) - 1 & \text{if } s_{i+1} = \{-3, -4\} \end{cases} \quad (33)$$

In the equations above the incremented actual root S3_inc [i] is used for digits +3 and +4, and the decremented actual root minus 1, S3M_dec[i], is used for digits −3 and −4. For the remaining digit values, the actual root S3[i] or the actual root minus 1, S3M [1], is used. Here, the modulo operation x mod y provides the remainder when x is divided by y. For instance, 5 mod 8=5, 11 mod 8=3, −5 mod 8=−5, and −12 mod 8=−4.

FIG. 14 shows an example of the on-the-fly conversion of the 3× root multiple. The digit sequence is −1, +1, −2, −4, +2, 0, −1. The final S3[i] result in the table is 3× the final S[i] result in FIG. 12. At sub-iteration i=0, the initial values of S3 is 11 (which is 3 multiplied by the initial value of S[0]=1) and the initial value of S3M is 10 (which is 3−1=2). At sub-iteration i=1, the digit −1 is added. 3 multiplied by −1 is −3, which equates to the concatenation of the digit −3 for S3 and −2 for S3M. Referring to equations (32) and (33), we can see that the value of S3[i+1] is the concatenation of S3M[i] and 101 (i.e. 5) while the value of S3M[i+1] is the concatenation of S3M[i] and 100 (i.e. 4).

At sub-iteration i=2, the digit of 1 is to be added. 3 multiplied by 1 is 3. Again, referring to equations (32) and (33), we can see that S3[i+1] for the case of si+1=1 is created by the concatenation of S3[i] and 011 (i.e. 3) while S3M[i+1] is created by the concatenation of S3[i] and 010 (i.e. 2) thereby resulting in S3[2]=10.101011 and S3M[2]=10.101010. At sub-iteration i=3, the digit of −2 is to be added. 3 multiplied by −2 is −6. In the case of S3, the concatenation is performed on the previous value of S3M. Since we are operating in radix-8, the use of S3M[i] to create S3[i+1] means that the value of S3[i+1] is 8 lower than it should be. Since we are aiming to subtract 6, this means that we must now add +2 (8−6=+2). Therefore, as shown in FIG. 14, the concatenation is S3M and 2 (010) Similarly, in the case of S3M, the concatenation is performed on the previous value of S3M. Therefore, as shown in FIG. 14, the concatenation is S3 and 1 (001 in binary). At sub-iteration i=4, the digit to be concatenated is −4. 3 multiplied by −4 is −12. This is a more complicated situation because −12 cannot be expressed using only 3 digits and so a negative carry is performed. Having performed the negative carry, the remaining subtraction to be performed is −4 (−12=−8−4). We therefore use the value of S3M_dec, which essentially subtracts 16 (8 from being a decremented value and 8 from being derived from S3M). The resulting addition to be performed is 4 (16−12=4), and so the concatenation that is performed is on the value of S3M_dec and 100 (which is 4 in binary) to give 010 000 100. For the value of S3M, the same value is used but the concatenation is for the value one less (i.e. 4−1=3), and so the concatenation is performed between S3M_dec and 011 (which is 3 in binary). The process for the digits 2, 0, and −1 used in iterations 5, 6, and 7 should be clear from the above explanation.

Figure 15:
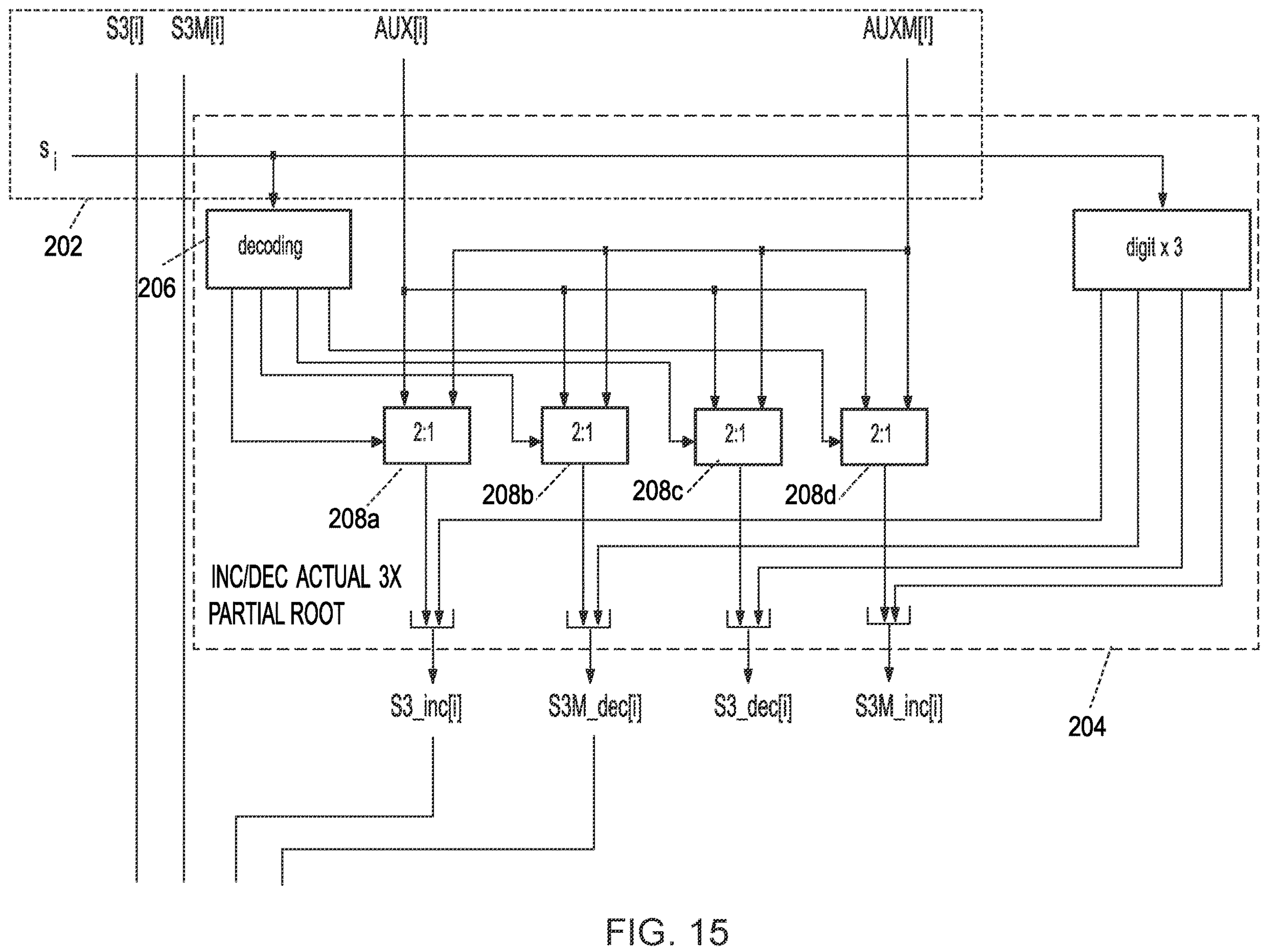
FIG. 15 illustrates circuitry for performing on-the-fly conversion of 3× multiples.
Figure 15:
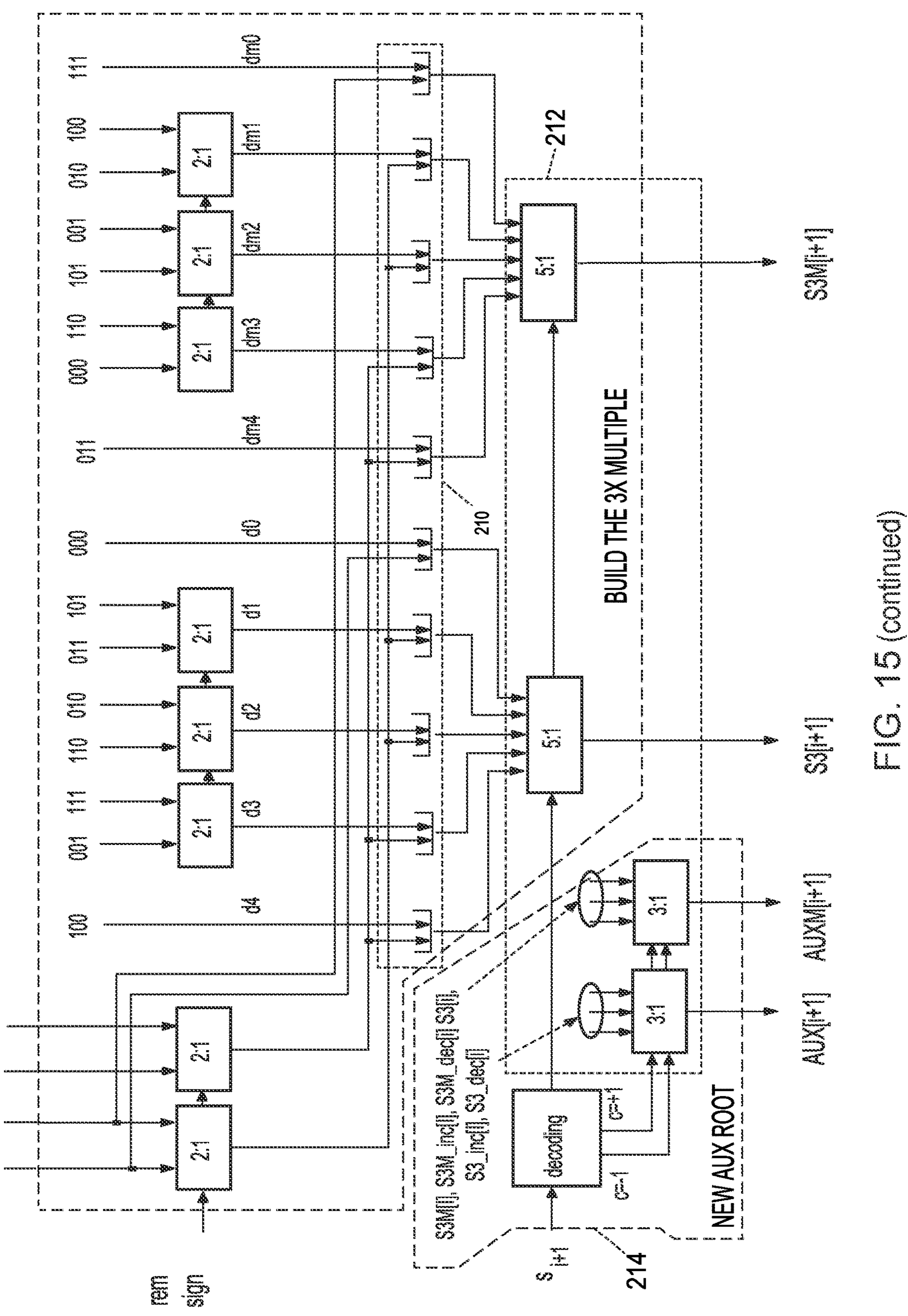

FIG. 15 shows the implementation of the 3× partial root multiple on-the-fly conversion, which forms part of the on-the-fly conversion circuitry 42. Not shown is the circuitry for generating the partial root values S[i] and SM[i] since this can be achieved by simple adjustment (using the tables provided in the Figures) of circuitry illustrated in, for instance US patent publication 2020-0293281. At each sub-iteration (except a first sub-iteration), values of S3M[i], AUX[i], and AUXM[i] from a previous sub-iteration are received by receiver circuitry 202. The implementation has three parts:

- increment/decrement of the actual 3× partial root S3[i], S3M [i] using adjustment circuitry 204,
- calculation of the next 3× partial root S3[i+1], S3M[i+1], and
- calculation of the new auxiliary 3× partial root AUX[i+1], AUXM[i+1].

The auxiliary 3× partial root is defined as:

$$AUX[i+1]=\begin{cases}\text{S3\_inc}[i] & \text{if carry}=+1\\ \text{S3\_dec}[i] & \text{if carry}=-1\\ S3[i] & \text{if carry}=0\end{cases}\tag{34}$$

$$AUXM[i+1]=\begin{cases}\text{S3M\_inc}[i] & \text{if carry}=+1\\ \text{S3M\_dec}[i] & \text{if carry}=-1\\ S3M[i] & \text{if carry}=0\end{cases}\tag{35}$$

and is provided because of how the increment/decrement of the 3× partial root is carried out. Note that when there is no carry to the previous digit, AUX[i+1]=S3[i] and AUXM[i+1]=S3M[i]. However, for some particular digit sequence the decremented/incremented S3[i] and SM3[i] are provided. In particular, the values AUX and AUXM enable extended carries beyond the immediately previous set of bits. For example, consider:

$$S3[i]=001\ 111\ 100$$
$$S3M[i]=001\ 111\ 011$$
$$\text{where } s_{i+1}=-3,\ s_{i+2}=+3$$

That is, there is carry propagation to the actual 3× partial root. According to equations (32) and (33) the concatenation of $3\times s_{i+1}$ produces:

$$S3[i+1]=001\ 111\ 010\ 111$$
$$S3M[i+1]=001\ 111\ 010\ 110$$

Then the concatenation of $3\times s_{i+2}$ produces:

$$S3[i+2]=001\ 111\ 011\ 000\ 001$$
$$S3M[i+2]=001\ 111\ 011\ 000\ 000$$

That is, because the digit +3 causes a carry to take place, the preceding set of digits are incremented. However, if those digits are already saturated (in this case, the digits in question for S3 are 111) then a further carry to the next set of bits takes place. In other words, S3[1+2] is obtained by concatenating $(3\times s_{i+2})$ mod 8 to the incremented S3[i+1]; but note that increasing S3[i+1] not only increments the last concatenated digit value, 111→000, but also increments S3M[i]_dec from 001 111 010 to 001 111 011, or equivalently S3M[i] is still need to produce S3[i+2]. Note that in this example, it should not be necessary to carry back further than this. This is because 111 is concatenated to S[i] (digit $s_{i+1}=-3$) to get S[i+1], and the conversion of the next digit $s_{i+2}$ produces a positive carry ($s_{i+2}=+4$, +3). This carry propagates through one digit. Theoretically, the carry would propagate further than 2 digits if there were several blocks of '111' in a row and the partial root had to be incremented. For instance, if S3[i]=0001 011 111 111 and the next digit was +3. In such a case, the carry would propagate to the third previous digit. However, such a pattern cannot be produced by the concatenation process being described here.

Therefore, S3_inc[i] and S3M_inc[i] are preserved for the calculation of S3[i+2] and S3M[i+2] when the carry propagated to the previous digit is carry=+1, and S3_dec[i] and S3M_dec[i] when carry=−1. This situation occurs when there is a carry +1 or −1 in the concatenation of two consecutive root digits and for specific values in the 3× partial root.

Turning back to FIG. 15, the adjustment circuitry 204 is used to produce $S3_{inc[i]}$, $S3_{dec[i]}$, $S3M_{inc[i]}$, and $S3M_{dec[i]}$ from AUX[i] or AUXM[i]. Whether AUX[i] or AUXM[i] is selected depends on the previous digit $s_i$ as shown in FIG. 16. Decoding circuitry 206 therefore considers the previous digit $s_i$ and provides a signal to multiplexers 208*a*, 208*b*,

208c, 208d to select between AUX[i] and AUXM[i]. The value of the previous digit $s_i$ is then concatenated with outputs from the digit ×3 circuitry in order to give a corrected value of S3_inc[i] and S3M_dec[i]. The digit ×3 circuitry produces four output values as follows:

When $s_i$>=0:

$3s_i$ mod 8+1

$3s_i$ mod 8

$3s_i$ mod 8−1

$3s_i$ mod 8−2

And when $s_i$<0:

8−(|$3s_i$| mod 8)+1

8−(|$3s_i$| mod 8)

8−(|$3s_i$| mod 8)−1

8−(|$3s_i$| mod 8)−2

For example, if $s_i$=+1 then the outputs are 4, 3, 2, and 1 whereas if $s_i$=−2 then the outputs are 3, 2, 1, and 0

Then the new 3× partial roots S3[i+1] and S3M[i+1] are produced by concatenating bits corresponding to the new signed digit $s_{i+1}$ to S3[i], S3M[i] or S3_inc[i] or S3_dec[i]. This is achieved using concatenation circuitry 210. Note that the sign of the remainder is used to reduce the number of 2:1 multiplexers whose outputs feed into the concatenation circuitry 210 in a similar manner to that described with reference to FIG. 4—that is, the remainder sign is used to select between a positive and a negative digit, e.g. a selection is made between the digits +3 and −3 for S[i] in one multiplexer and for the digits +3 and −3 for SM[i] in another multiplexer. A positive remainder will select a positive or zero root-digit, while a negative remainder selects a negative or zero root-digit. The digits to be concatenated for each digit are given by equations (32) and (33). For example, for digit +3, we concatenate 001, which is (3×3) mod 8. Meanwhile, for −1, we concatenate 111, which is 8−|3×−3|=−1 (or 111 in binary).

Having performed the concatenation circuitry, output circuitry 212 in the form of a set of multiplexers outputs the selected value for S3[i+1] and S3M[i+1] along with the updated aux root values AUX[i+1] and AUXM[i+1], which are produced by the AUX generation circuitry 214, which decodes the latest new digit si+1 to determine whether there is a carry or not and then uses that information to select the appropriate values to output as AUX[i+1] and AUXM[i+1] as shown in FIG. 16. Each of the AUX[i+1], AUXM[i+1], S3[i+1], S3M[i+1] are received back by the receiving circuitry 202 in a further iteration or sub-iteration.

LUTs for Selection Constants

At each stage of the digit recurrence operation, a digit selection operation SEL (see equation 2). The digit selection function in radix-8 division or square-root digit-recurrence algorithms performs a comparison of the actual remainder (or a part of it) with a set of eight selection constants or coefficients. The coefficient set is selected using the most-significant part of the divisor or partial square-root. The eight coefficients in the selected set are compared with the most-significant part of the remainder and the outcome of the eight comparisons are used to determine the next quotient or root digit.

These coefficient sets are stored in a look-up table (LUT), which is addressed with the most-significant bits of the divisor in a division operation or most-significant part of the partial root in a square-root operation. The LUT size for radix-8 division is 32×72-bit and the size for the radix-8 square root is 33×80-bit. In a unit having support for division and square root two different LUTs are needed, one for division and another one for square root. Hence, the total LUT size in such an unit would be 32×72+33×80=4944 bits.

In these examples, a number of ways of reducing the size of the total LUT are proposed. Merging of some of the columns can be performed. In addition, the square-root coefficients can be computed by adding a small offset to the division coefficients; consequently, the square-root LUT can be replaced by a smaller table and some logic. In addition, some optimizations are made to further reduce the division LUT size. Consequently, the total LUT size can be reduced to 33×42+33×18=1980 bits, representing a reduction of approximately 60% of the required storage space.

The selection function involves the comparison of the remainder estimate (most significant bits of the remainder) with a set of 8 selection constants or coefficients, one constant per possible value of the digit $p_{i+1}$. So, $$p_{i+1} = k \Longleftrightarrow cte(k) \le \widehat{rem}[i] < cte(k+1) \quad (36)$$

where cte(k) and cte(k+1) the selection constants for digit values k and k+1, respectively, with kΣ{−3, −2, −1, 0, +1, +2, +3, +4} (in radix-8). In practice, it is not necessary to keep a selection constant for digit value −4 since if the remainder estimate does not correspond with the selection constants for the other digits (−3 to +4) then the selected digit must be −4. It has been found that only the 10 (division) or 11 (square root) most-significant bits of the remainder need to be considered to get a remainder estimation accurate enough fort digit selection.

In division digit recurrence, the set of selection constants used to get the next digit depends on the divisor; whereas in square root it depends on the partial result. The 6 most-significant bits of the divisor or the 7 most significant bits of the partial root are used to pick out the set of 8 selection constants for all the iterations of the current division. Different divisor or partial root values pick out different constant sets.

In the case of division, the selection constants are 10-bit wide but the most-significant bits is 0. On the other hand, note that the most-significant bit of the divisor is always 1, because the operands are normalized before selecting the constants. Therefore, the selection constants are stored in a 32×72-bit division look-up table (LUT).

In the case of square root, the selection constants are 11-bit wide. The partial square-root is in [0.5, 1]. Therefore, taking into account that the partial root estimation has 1 integer bit and 6 fractional bits, and that the minimum value of the partial root is 0.5, the selection constants are stored in a 33×80-bit square-root LUT, with 32 entries for R[i]Σ[0.5, 1) and 1 entry for R[i]=1.

Therefore, in a unit with support for division and square root (fdivsqrt unit) two LUTs are typically used, a 32×72-bit division LUT and 33×80-bit square root LUT. The total LUT size is 32×72+33×80=4944 bits.

In this technique a method for reducing the total LUT size in a fdivsqrt unit is proposed. The LUT reduction is based on the two items below.

1. It has been detected that the square root constants, sqrt_ct, can be obtained from the division constants, div_ct, by adding a 4-bit offset to a base constant base_ct=[2×div_ct/16]×16. Note that base_ct is the div_ct with the 4 least-significant bits set to 0. The 4-bit offset can be negative or positive. This way, instead of storing the square root constants we only need to store the offsets in an offset LUT.

2. Some symmetries in the division LUT and in the offset LUT allows to get a further reduction in the LUT total size.

FIGS. 17 and 18 show the raw division and square root LUTs. The figures show the constants set for each value of the divisor and partial root estimation; each set is composed of the constants for the selection of digits $p_i$={+4, +3, +2, +1, 0, −1, −2, −3}, for a total of 8 constants in the set, div_ct={md(4),md(3),md(2),md(1),md(0),md(−1),md(−2), md(−3)} for division and sqrt_ct={ms(4),ms(3),ms(2),ms (1),ms (0),ms(−1),ms(−2),ms(−3)} for a square root.

The value of each comparison constant can be chosen from a narrow interval. In these examples, the values have been carefully chosen to make each LUT symmetrical, meaning that the absolute values of the constants in the columns for digits +4 and −3, +3 and −2, +2 and −1, and +1 and 0 are the same (other than in a few exceptions). As will be shown later this selection helps to reduce the LUT sizes.

The first two divisor interval constants md(4) and md(−3) are out-of-bounds. That is, the first two digits cannot be 4 or −3. This could be fixed by doubling the number of divisor intervals but such an approach is very expensive because it means doubling the LUT size. Instead the $6^{th}$ fractional bit of the divisor is used to select the subinterval and correct the 2 least-significant bits of md(4) and md(−3).

As for the size of the LUTs, the maximum and minimum values in the division LUT are 222 and −222 respectively; division constants values are therefore in the range [222; −222] and 9 bits are required to represent all the values in such a range. Similarly, for square root the constants are in range [447; −446] and so 10 bits are required.

Offset LUT

Comparing the division and square root comparison constants shown in FIGS. 17 and 18, the square root comparison constants can be obtained, as $$ms(k) = (\lfloor 2\times md(k)/16\rfloor \times 16) + \text{offset}(k), \quad \text{with } k = 4, 3, 2, 1, 0, -1, -2, -3 \tag{37}$$

That is, the division constant md(k) is multiplied by 2, the 4 least significant bits are cleared to 0, and 4-bit offset, offset(k) is added. Let us call m_base(k)=$\lfloor$2×md(k)/16$\rfloor$×16 then $$ms(k) = \text{m\_base}(k) + \text{offset}(k), \text{ with } k = 4, 3, 2, 1, 0, -1, -2, -3 \tag{38}$$

Note that when the offset has the same sign as the base constant m_base(k), addition involves replacing the 4 least-significant bits of m_base(k) by the 4-bit offset. Where the offset is not the same sign as the base constant, addition is carried out.

As another example consider the calculation of ms(2) for $\widehat{R[i]}$=0.100100 (row 4 in FIG. 17). Taking the constants in row 4 of FIGS. 17 and 18, m_base(2)=$\lfloor$2×md(2)/16$\rfloor$×16=$\lfloor$2×54/16$\rfloor$×16=96. In this case, offset(2) happens to be 12. Note that the signs of m_base(2) and offset(2) are equal, the square root constant is obtained by replacing the 4 least-significant bits by the offset: m_base(2)=000110_0000 and offset(2)=1100 then ms(2)=000110_1100=108.

However, in a few cases the signs of m_base(k) and offset(k) are different. For example for the calculation of ms(3) with $\widehat{R[i]}$=0.100011, row 3 in FIGS. 17 and 18, m_base(3)=$\lfloor$2×90/16$\rfloor$×16=176 and then ms(3)=176−1=175. Since the offset is negative, i.e. offset(3)=−1, the square root constant is obtained by means of a subtraction (or an addition of a negative number).

FIG. 19 shows the offsets for the calculation of the square root constants. The case where the sign of the offset is different to the sign of the division constant are highlighted. The square root and division comparison constants have been carefully chosen to make this table symmetrical with respect to the columns, meaning that the absolute value of the constants in columns +4 and −3, +3 and −2, +2 and −1, and +1 and 0 are the same (with opposite signs). There are two cases where this rule is broken: in rows 4 and 13 the offset for digits +4 and −3 do not have the same absolute value. These cases are processed separately and can be detected for via, for instance, offset correction indication circuitry 252.

Symmetries

Focusing first on division LUT note that:

1. The absolute value of the constants can be stored instead of the signed value. This helps to reduce the LUTs sizes.
2. The absolute value of the constants for digits $p_i$=+1 and $p_i$=0 are the same (with opposite signs, and specifically with digit $p_i$=+1 being positive and $p_i$=0 being negative), so these two columns can be replaced by just 1 column.
3. The absolute value of the constants for digits $p_i$=+2 and $p_i$=−1 are the same (with opposite signs, and specifically with digit $p_i$=+2 being positive and $p_i$=−1 being negative) except for row 0 and 17. These two columns are stored as only 1 column and the value for rows 0 and 17 is corrected later in, for instance, division correction indication circuitry 250 and division constant correction circuitry 248. Note that m(2)=50, m(−1)=−48 in row 0 and m(2)=73, m(−1)=−72 in row 17. To fuse these two columns the saved values are 48 in row 0 and 72 in row 17, and the final m(2) value is corrected by changing the least-significant bit (row 17) or the bit to the left of the least-significant bit (row 0).
4. The most significant bit of the absolute value of the constants for digits $p_i$=+2 and $p_i$=−1 is zero. This bit need not be stored in the LUT.
5. The two most-significant bits of the absolute value of the constants for digits $p_i$=+1 and $p_i$=0 are zero. These bits are not stored in the LUT.
6. Constants for digits $p_i$=+3, $p_i$=+2, $p_i$=+1, $p_i$=0, and $p_i$=−1 are even so the least significant bit is not stored in the LUT.
7. Consequently, the optimized division LUT has only 6 columns, because of the column fusion indicated in items 2 and 3 above. In addition, the number of bits per column has been also reduced.

The offset LUT is shown in FIG. 19. This table can be optimized as well:

1. The offset for digits $p_i$={+2, +1, 0, −1} has the same sign as m_base; that is, the offset is positive for digits +2 and +1 and negative for digits 0 and −1 (including the 0 as negative or positive where appropriate).
2. The LUT is symmetrical with respect to the columns: the offset absolute value for digits +4 and −3, for digits +3 and −2, for digits +2 and −1, and for digits +1 and 0 are the same, except for the two cases indicated earlier. Consequently, only the absolute value of the offset is stored in the LUT and when the offset is used to get the square root comparison constants, its sign is set according to the digit value, except for those cases where the offset sign is different to the m_base sign (values highlighted in FIG. 19).

3. The sign for those exception values is stored in a new column in the LUT.

Then, the offset LUT has only 5 columns, 4 columns as a result of column fusion in items 1 and 2, plus an additional column for the signs.

It will be appreciated that, in alternative to the above, a square-root LUT could be provided, with constants for the division operation being derived by looking up values in the division LUT and performing offsets. In such a situation, many of the same techniques described above can be applied in order to reduce the size of either the floating point LUT or a division offsets table. For example, it is clear from FIG. 18 that the magnitude of constants for digits +4 and −3 are the same (with the digits having opposite signs—generally positive for the +4 digit and negative for the −3 digit). Similarly, the magnitude of the constants for digits +3 and −2 are the same (again with opposite digits—typically positive for +3 and negative for −2). Similarly, the magnitude of the constants for digits +2 and −1 are the same (again with opposite signs—typically positive for +2 and negative for −1).

The final division and offset tables with the optimizations described in previous sections are shown in FIG. 20. The table is divided into parts, the division LUT to the left and the square root offset LUT to the right. Note the number of columns has been reduced because of the column fusion. The resulting fused columns are labelled with the value of the two involved digits. Thus, for example column labelled as (+2, −1) means the fusion of the columns corresponding to digits $p_i$=+2 and $p_i$=−1 in the raw table.

On the other hand, note that the last row in the table of FIG. 20 is only for square root (row 32 in FIG. 19).

The address (left-most column in the table) is accessed differently for division and square root. In division the 6 most-significant bits of the divisor form the address, although the first bit will be 1. In case of square root, the 7 most-significant bits of the partial root R [i] are used to address the table, with values ranging from 0.5 (0.100000 in binary) to 1.0 (1.000000 in binary). Note that 6 bits are used for the address because the square root LUT has 33 rows.

The contents of the LUT are shown as hexadecimal values. Note that the number of bits actually required for each column is specified in the table and so although hexadecimal values are shown, the full range of values might not be possible. For instance, the constant values for digit $p_i$=+3 in this division LUT, only needs 7 bits because the most-significant hexadecimal digit takes only takes values of {2, 3, 4} which correspond to the binary values {0010, 0011, 0100}, and therefore is not necessary to store the most-significant bit. Similarly for columns (+2, −1) and (+1, 0).

The offset LUT (the right part) in FIG. 20, stores the offset absolute values in columns (+4, −3), (+3, −2), (+2, −1), and (+1, 0), whereas the 2-bit values in column sign are the offset signs for offsets in columns (+4, −3) and (+3, −2). Note that the offsets in columns (+2, −1) and (+1, 0) are positive. A sign bit of 1 means the offset and its corresponding m_base have different signs.

As explained previously, the last row in the table, with address 100000, is meaningful only for square root. Using the same base as for row 011111 the comparison constants for this partial root estimation are obtained with the offsets indicated in the table.

Consider the following example for the division and square root comparison constants calculation. For division the constant set is obtained from the LUT by adding a leading 0. For example, in a division operation with divisor=1.00110x . . . x, the LUT address is 01_00110 and then the LUT returns $$\begin{aligned} \text{LUT\_div}(01\_00110) &= \{87, 30, 1d, 09, 60, 86\} \\ &= \{1000\_0111, 011\_0000, 01\_1101, 0\_1001, \\ &\quad 011\_0000, 1000\_0110\} \end{aligned}$$

Note that the number of bits for each constant in the set depends on what digit the constant is for. So, taking into account the rules for LUT size reduction listed previously for division the set of comparison constants for this particular divisor value is $$\begin{aligned} md(4) &= 1000\_0111 \to 00\_1000\_0111 \equiv 135 \\ md(3) &= 0110\_0000 \to 00\_0110\_0000 \equiv 96 \\ md(2) &= 0011\_1010 \to 00\_0011\_1010 \equiv 58 \\ md(1) &= 0001\_0010 \to 00\_0001\_0010 \equiv 18 \\ md(0) &= 0001\_0010 \to 11\_1110\_1110 \equiv -18 \\ md(-1) &= 0011\_1010 \to 11\_1100\_0110 \equiv -58 \\ md(-2) &= 0110\_0000 \to 11\_1010\_0000 \equiv -96 \\ md(-3) &= 1000\_0110 \to 11\_0111\_1010 \equiv -134 \end{aligned}$$

The bits added to get the final constant are highlighted. Note that from the LUT the absolute value of the constants is obtained; in a later step the sign of m(0), m(−1), m(−2), and m(−3) are 2' complemented to get the final constant set.

As for the square root constants for this same row, note that the sign field is 01; that means that the sign of the offset for the calculation of ms(+3) and ms(−2) is different to the base constant sign and, therefore, the calculation of these two constants needs a subtraction. From the table, $$\text{LUT\_offset}(01\_00110) = \{1, a, e, 2, 6\}$$

and the offsets are below; the offsets having a sign different to the base constant sign are highlighted $$\text{offset}(k) = \{+10, -2, +2, +6, -6, -2, +2, -10\} \text{ for } k = 4, 3, 2, 1, 0, -1, -2, -3$$

The base constants are $$\text{m\_base}(k) = \{1\_0000\_0000, 0\_1100\_0000, 0\_0111\_0000, 0\_0010\_0000, 0\_0010\_0000, 0\_0111\_0000, 0\_1100\_0000, 1\_0000\_0000\} \text{ and then,}$$

$$\begin{aligned} &ms(4) = 001\_0000\_1010 \to 266 \\ &ms(3) = 000\_1100\_0000 - 000\_0000\_0010 \to 190 \\ &ms(2) = 000\_0111\_0010 \to 114 \\ &ms(1) = 000\_0010\_0110 \to 38 \end{aligned}$$

As the positive and negative parts of the sqrt LUT are symmetrical, the remaining constants are obtained by 2' complementing the constants above $$\{ms(0), ms(-1), ms(-2), ms(-3)\} = \{-38, -114, -192, -266\}$$

Figure 21:
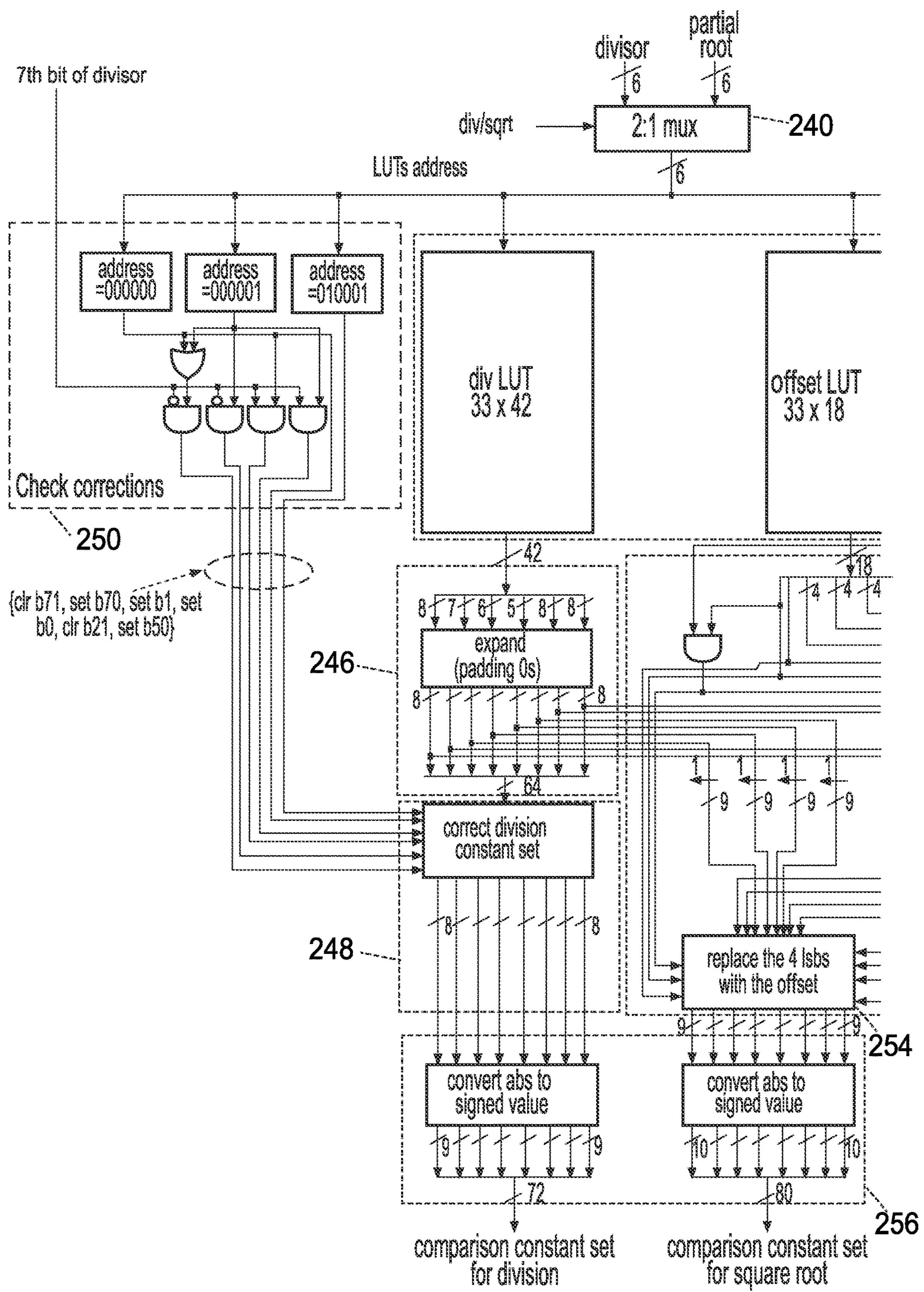
FIG. 21 illustrates circuitry for obtaining the comparison constant set for divide and square root operations.
Figure 21:
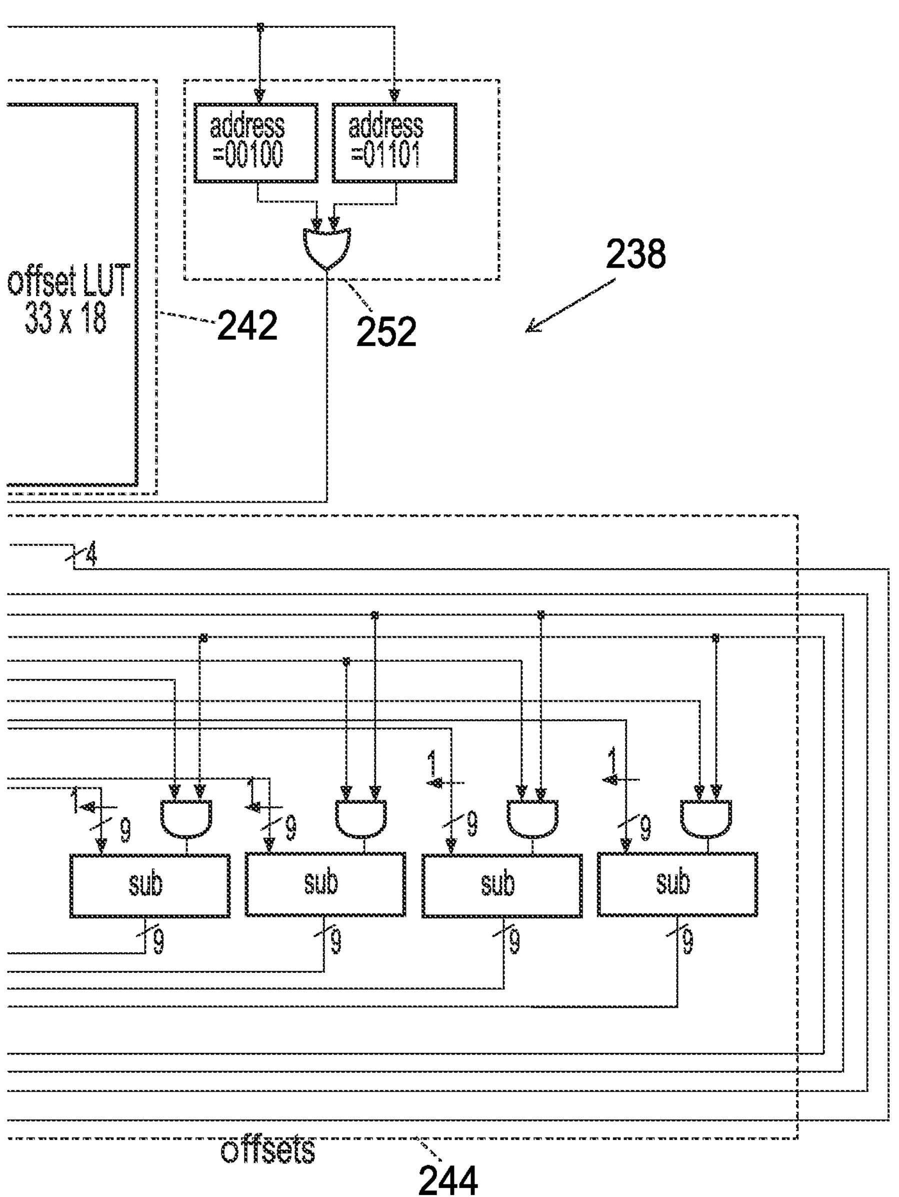

FIG. 21 shows a selection constant generator 238, which is used to generate the selection constants that are used by, for instance, the digit selection comparators 32. Bits of the divisor and the partial root are received by a multiplexer 240. A div/sqrt selection signal is provided that selects the divisor when the selection constants for division are required and selects the partial root when the selection constants for square root are required. Thereafter, the selected bits are used to access the relevant values in storage circuitry 242, which is made up of the division LUT and a (square root) offset LUT.

The output from the division LUT is passed to padding circuitry 246, which pads the bits by adding 0s to the constants that are output. The padding that is performed is described in, for instance, points 2-6 in respect of the division LUT above. The resulting constants are passed to conversion circuitry 244, discussed below and also to division constant correction circuitry 248. The division constant correction circuitry 248 receives the padded (expanded) division selection constants as well as output from the division correction indication circuitry 250, which indicates whether the data being retrieved from the division LUT is one of the exceptional cases where the absolute values of the constants are not the same (point 3 in respect of the division LUT above). That is, it checks for (i) constants md(4) and md(−3) when the divisor estimate is 0 or 1 and (ii) differences in the constant absolute value for digits $p_i$=+2 and $p_i$=−1 when the divisor estimate is 0 or 17. These corrections require setting bits 70, 50, 1, and 0, and clearing bits 71 and 21 in the selected constants set. The corrections are carried out by the division constant correction circuitry 248.

The output from the offset LUT is passed to conversion circuitry 244 together with output from offset correction indication circuitry 252, which indicates whether the constants being accessed are one of the exceptions where the LUT offsets do not have the same value (e.g. rows 4 and 13). If so, a correction is made within the conversion circuitry 244 to the correct value. The correction circuitry 244 also receives the padded (expanded) division constants from the padding circuitry 246. Replacement circuitry 254 is used to add the offset using concatenation or subtraction as previously discussed. In particular, when the offset sign and the constant base sign are different the subtraction is carried out. The subtraction is enabled by checking the sign field in the offset LUT. The replacement of the 4 least-significant bits for the 4-bit offset is only done when the signs are equal.

For both the division constants and the LUT constants, signing circuitry 256 is provided to convert the absolute values into signed values for digits $p_i$=0, −1, −2, −3 is changed.

Computer-Readable Code for Fabrication

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may be define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A data processing apparatus to convert a plurality of signed digits representing an input value in redundant representation, the data processing apparatus comprising:

receiver circuitry to receive, at each of a plurality of iterations, a signed digit from the plurality of signed digits, and previous intermediate data, wherein the previous intermediate data is from a previous iteration;

concatenation circuitry to perform a concatenation of bits corresponding to the signed digit and bits of the previous intermediate data to produce updated intermediate data; and output circuitry to provide the updated intermediate data as previous intermediate data of a next iteration, wherein the previous intermediate data from the previous iteration comprises S3[i] in non-redundant representation, which is at least part of the input value multiplied by 3 in non-redundant representation.

2. The data processing apparatus according to claim 1, wherein the previous intermediate data from the previous iteration further comprises S3[i−1].

3. The data processing apparatus according to claim 1, wherein the previous intermediate data from the previous iteration further comprises S3M[i], which is the at least part of the input value multiplied by three and minus one in non-redundant representation.

4. The data processing apparatus according to claim 3, wherein the previous intermediate data from the previous iteration further comprises S3M[i−1].

5. The data processing apparatus according to claim 3, wherein the concatenation performed by the concatenation circuitry comprises concatenations on each of S3[i] and S3M[i] to produce the updated intermediate data comprising S3[i+1] and S3M[i+1].

6. The data processing apparatus according to claim 5, wherein bits corresponding to the unsigned digit are concatenated to one of S3[i] and S3M[i] to produce S3[i+1] and the other of S3[i] and S3M[i+1] to produce S3M[i+1]; and the one of S3[i] and S3M[i] is determined based on whether the signed digit is greater than 0 or less than 0.

7. The data processing apparatus according to claim 6, further comprising:

adjustment circuitry configured to perform a selective adjustment on at least one of S3[i] and S3M[i] prior to the concatenation, based on a magnitude of the signed digit and on whether the signed digit is positive or negative.

8. The data processing apparatus according to claim 7, wherein when the selective adjustment is performed, the selective adjustment causes S3M[i] to be decremented prior to the concatenation when the signed digit is negative; and when the selective adjustment is performed, the selective adjustment causes S3[i] to be incremented prior to the concatenation when the signed digit is positive.

9. The data processing apparatus according to claim 7, wherein the selective adjustment is performed when the magnitude of the signed digit multiplied by three exceeds a radix in which the signed digits are represented.

10. The data processing apparatus according to claim 1, wherein the data processing apparatus is configured to convert the plurality of signed digits representing the input value in redundant representation without the use of addition circuitry.

11. The data processing apparatus according to claim 1, further comprising:

digit recurrence circuitry to perform a digit recurrence operation to produce the plurality of signed digits, wherein in each of the plurality of iterations, one of the plurality of signed digits is provided to the receiver circuitry.

12. The data processing apparatus according to claim 11, wherein the digit recurrence circuitry is configured to operate in a square-root mode of operation in which the digit recurrence operation is a square-root operation.

13. The data processing apparatus according to claim 12, wherein the digit recurrence circuitry is further configured to operate in a division mode of operation in which the digit recurrence operation is a division operation; and the previous intermediate data from the previous iteration further comprises S[i], which is the at least part of the input value in non-redundant representation and SM[i], which is the at least part of the input value minus one in non-redundant representation, wherein after the plurality of iterations, the output circuitry is further configured to output S[i].

14. The data processing apparatus according to claim 13, wherein the concatenation circuitry is configured, in the division mode of operation, to suppress the generation of S3[i].

15. The data processing apparatus according to claim 11, wherein the digit recurrence operation has a radix of at least 8.

16. The data processing apparatus according to claim 1, wherein possible values of the signed digit include at least one of: +3 and −3.

17. A data processing method of using a data processing apparatus to convert a plurality of signed digits representing an input value in redundant representation, comprising steps of:

receiving, using receiver circuitry, at each of a plurality of iterations, a signed digit from the plurality of signed digits, and previous intermediate data, wherein the previous intermediate data is from a previous iteration;

concatenating, using concatenation circuitry, bits corresponding to the signed digit and bits of the previous intermediate data to produce updated intermediate data; and providing, using output circuitry, the updated intermediate data as previous intermediate data of a next iteration, wherein the previous intermediate data from the previous iteration comprises S3[i] in non-redundant representation, which is at least part of the input value multiplied by 3 in non-redundant representation.

18. A computer-readable medium to store computer-readable code for fabrication of a data processing apparatus to convert a plurality of signed digits representing an input value in redundant representation, the data processing apparatus comprising:

receiver circuitry to receive, at each of a plurality of iterations, a signed digit from the plurality of signed digits, and previous intermediate data, wherein the previous intermediate data is from a previous iteration;

concatenation circuitry to perform a concatenation of bits corresponding to the signed digit and bits of the previous intermediate data to produce updated intermediate data; and output circuitry to provide the updated intermediate data as previous intermediate data of a next iteration, wherein the previous intermediate data from the previous iteration comprises S3[i] in non-redundant representation, which is at least part of the input value multiplied by 3 in non-redundant representation.

* * * * *